(12) United States Patent
Chakrabarti et al.

(10) Patent No.: US 11,010,309 B2
(45) Date of Patent: May 18, 2021

(54) COMPUTER SYSTEM AND METHOD FOR EXECUTING ONE OR MORE SOFTWARE APPLICATIONS, HOST COMPUTER DEVICE AND METHOD FOR A HOST COMPUTER DEVICE, MEMORY DEVICE AND METHOD FOR A MEMORY DEVICE AND NON-TRANSITORY COMPUTER READABLE MEDIUM

(71) Applicant: Intel Corporation, Santa Clara, CA (US)

(72) Inventors: Somnath Chakrabarti, Portland, OR (US); Mona Vij, Hillsboro, OR (US); Matthew Hoekstra, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 324 days.

(21) Appl. No.: 16/114,241

(22) Filed: Aug. 28, 2018

(65) Prior Publication Data

US 2019/0042478 A1 Feb. 7, 2019

Related U.S. Application Data

(60) Provisional application No. 62/673,161, filed on May 18, 2018, provisional application No. 62/673,160, (Continued)

(51) Int. Cl.
*G06F 12/14* (2006.01)
*G06F 21/79* (2013.01)
(Continued)

(52) U.S. Cl.
CPC ...... *G06F 12/1408* (2013.01); *G06F 12/0835* (2013.01); *G06F 21/602* (2013.01);
(Continued)

(58) Field of Classification Search
CPC ............ G06F 12/1408; G06F 12/0835; G06F 21/602; G06F 21/62; G06F 21/71; G06F 21/79
(Continued)

(56) References Cited

U.S. PATENT DOCUMENTS 4,107,773 A * 8/1978 Gilbreath ................ G06F 7/483
708/104
8,239,447 B2 * 8/2012 Garg ................... H04L 49/9031
709/203

(Continued)

*Primary Examiner* — Noura Zoubair
*Assistant Examiner* — Phuc Pham
(74) *Attorney, Agent, or Firm* — 2SPL Patent Attorneys PartG mbB; Yong Beom Hwang

(57) ABSTRACT

A computer system for executing one or more software applications includes a host computer device configured to execute the one or more software applications. The computer system further includes one or more memory devices configured to cryptographically protect volatile memory of the one or more memory devices. The one or more memory devices are configured to provide access to the cryptographically protected volatile memory for the one or more software applications. The host computer device is configured to execute the one or more software applications by executing a portion of the one or more software applications associated with the cryptographically protected volatile memory using a processor of the one or more memory devices.

23 Claims, 32 Drawing Sheets

Related U.S. Application Data filed on May 18, 2018, provisional application No. 62/673,158, filed on May 18, 2018.

(51) Int. Cl.
  *G06F 21/71* (2013.01)
  *G06F 21/62* (2013.01)
  *G06F 21/60* (2013.01)
  *G06F 12/0831* (2016.01)

(52) U.S. Cl.
  CPC .............. *G06F 21/62* (2013.01); *G06F 21/71* (2013.01); *G06F 21/79* (2013.01); *G06F 2212/1052* (2013.01); *G06F 2221/2141* (2013.01)

(58) Field of Classification Search
  USPC ........................................................ 713/193
  See application file for complete search history.

(56) References Cited

U.S. PATENT DOCUMENTS

| | | | | |
|---|---|---|---|---|
| 8,656,465 B1* | 2/2014 | Fong-Jones | ......... | G06F 21/6281 726/5 |
| 9,122,588 B1* | 9/2015 | Mondal | ............... | G06F 12/0871 |
| 9,177,122 B1* | 11/2015 | Trier | .......................... | G06F 8/65 |
| 9,710,395 B1* | 7/2017 | Garibay | .............. | G06F 9/45558 |
| 2004/0128394 A1* | 7/2004 | Knauerhase | ............ | H04L 67/18 709/229 |
| 2005/0050290 A1* | 3/2005 | Delaney | .............. | G06F 12/0653 711/170 |
| 2006/0239075 A1* | 10/2006 | Williams | ................ | G11C 16/10 365/185.17 |
| 2011/0208864 A1* | 8/2011 | St. Laurent | ............. | H04L 41/28 709/226 |
| 2011/0307724 A1* | 12/2011 | Shaw | ....................... | G06F 21/78 713/323 |
| 2013/0238851 A1* | 9/2013 | Chang | ................. | G06F 12/0895 711/113 |
| 2014/0136783 A1* | 5/2014 | Kumar | .................... | G06F 9/528 711/119 |
| 2014/0245021 A1* | 8/2014 | Nagai | ................. | H04L 63/0823 713/181 |
| 2014/0298211 A1* | 10/2014 | Mehta | .................... | G06Q 30/02 715/760 |
| 2015/0039909 A1* | 2/2015 | Tseng | .................... | G06F 21/805 713/193 |
| 2015/0121086 A1* | 4/2015 | Smith | ................... | H04L 9/0894 713/189 |
| 2015/0154131 A1* | 6/2015 | Hagspiel | ................ | G06F 12/084 711/122 |
| 2015/0207624 A1* | 7/2015 | Laver | .................... | H04L 9/0866 713/2 |
| 2015/0301643 A1* | 10/2015 | Hafidh | .................... | A63F 13/25 345/174 |
| 2016/0018995 A1* | 1/2016 | Vadalamani | .......... | G06F 3/0659 711/123 |
| 2016/0055107 A1* | 2/2016 | Ambroladze | .......... | G06F 13/28 710/308 |
| 2017/0255569 A1* | 9/2017 | Sartorius | ............. | G06F 12/1027 |
| 2017/0353305 A1* | 12/2017 | Glickman | ............. | H04L 9/0861 |
| 2018/0012020 A1* | 1/2018 | Prvulovic | .................. | G06F 1/28 |
| 2018/0285264 A1* | 10/2018 | Kayiran | .............. | G06F 12/0817 |
| 2019/0266098 A1* | 8/2019 | Torchalski | .......... | G06F 12/0891 |

\* cited by examiner

COMPUTER SYSTEM AND METHOD FOR
EXECUTING ONE OR MORE SOFTWARE
APPLICATIONS, HOST COMPUTER DEVICE
AND METHOD FOR A HOST COMPUTER
DEVICE, MEMORY DEVICE AND METHOD
FOR A MEMORY DEVICE AND
NON-TRANSITORY COMPUTER READABLE
MEDIUM

FIELD

Examples relate to a computer system and method for executing one or more software applications, to a host computer device and a method for a host computer device, to a memory device and a method for a memory device and to a non-transitory computer readable medium.

BACKGROUND

The development of security mechanisms for software applications is a major field of research.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
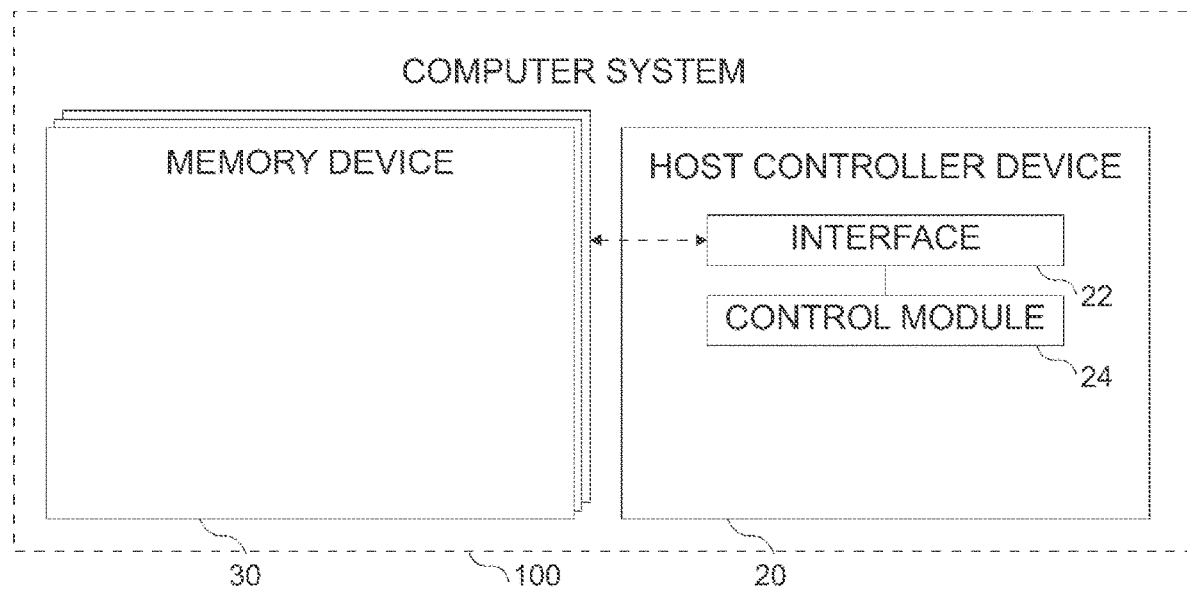
FIGS. 1a and 1b show block diagrams of examples of a host computer device.
Figure 1B:
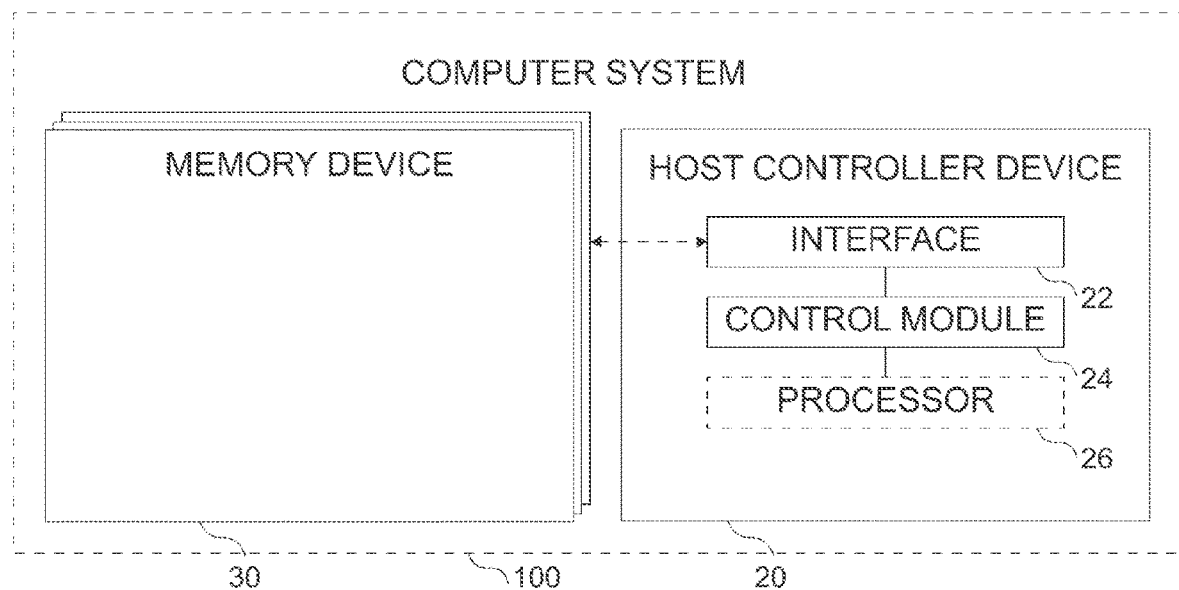

FIGS. 1a and 1b show block diagrams of examples of a host computer device 20 or host computer apparatus 20 for a computer system 100. The components of the host computer apparatus 20 are defined as component means, which correspond to the respective structural components of the host computer device 20. Examples further provide a computer system 100 comprising the host computer apparatus or host computer device 20.

The computer system 100 further comprises one or more memory devices 30 or memory apparatuses 30 configured to cryptographically protect volatile memory of the one or more memory devices 30. The components of the one or more memory apparatuses 30 are defined as component means, which correspond to the respective structural components of the one or more memory devices 30. The one or more memory devices are further configured to provide access to the cryptographically protected volatile memory for one or more software applications of the host computer device 20. The host computer device/apparatus comprises an interface 22 (e.g. a means for communicating 22 of the host computer apparatus 20) for communicating with the one or more memory devices 30. The host computer device/apparatus 20 further comprises a control module 24 (e.g. a means for controlling 24 of the host computer apparatus 20) configured to execute the one or more software applications by executing a portion of the one or more software applications associated with the cryptographically protected volatile memory using a processor 38 (e.g. a processing means 38) of the one or more memory devices 30/apparatuses 30. The control module 24 is coupled with the interface 22 and/or with a processor 26 as shown in FIG. 1b). In some examples, the control module 24 may comprise the processor 26.

Using processors of the one or more memory devices to execute a portion of the one or more software applications may enable using processor features of said processors, e.g. the cryptographic protection of the volatile memory, that might not be available at a processor of the host computer device.

At least some examples relate to an execution of one or more software applications using a host computer device and one or more memory devices. The one or more software applications may be software applications that require access to cryptographically protected memory. For example, the one or more software applications may be based on Intel® Software Guard Extensions (SGX). The one or more software applications may use Intel® Software Guard Extensions (SGX). For example, a portion of each software application of the one or more software applications may require access to the cryptographically protected memory. For example, software applications of the one or more software applications comprise a first software application portion and a second software application portion ("the portion of the one or more software applications executed using a processor of the one or more memory devices"). The first software application portion may be associated with volatile memory of the host computer device 20. For example, the host computer device may comprise the volatile memory. The second software application portion may be associated with the cryptographically protected volatile memory of the one or more memory devices 30. The control module 24 may be configured to execute the second software application portion using the processor of the memory device comprising the cryptographically protected volatile memory associated with the second software application portion. This may enable using a larger memory and/or a higher processing capability of the host computer device for major parts of the one or more software applications, while still being able to use the cryptographical protection of the volatile memory. For example, for each of the one or more software applications, the second portion may be assigned to or associated with a (single) memory device of the one or more memory devices, and may be executed using the processor of the memory device it is assigned to or associated with. Alternatively, the second portion of a software application may be executed using processors of more than one of the memory device, e.g. to use a combined cryptographically protected volatile memory.

A memory device of the one or more memory devices may be characterized by being capable of cryptographically protecting (its) volatile memory. For example, a memory device or memory apparatus of the one or more memory devices/memory apparatuses may be a memory extension device or memory extension apparatus. For example, the one or more memory devices may be one or more memory extension devices. For example, a memory device may be a system comprising a processor capable of cryptographically protecting volatile memory, volatile memory, and an interface for communicating with the host computer device. The processor (e.g. a control module) of the system may execute software, e.g. an operating system, which is configured to coordinate (e.g. exchange data) between the first portion of a software applications and the second portion of the software applications. For example, a memory device may be hosted on an add-in card, e.g. a PCIe card. The add-in card may comprise the one or more memory devices. For example, a Visual Computer Accelerator (VCA) card may comprise three Intel® Xeon® X3 processors and associated volatile memory. Each Xeon® E3 processor, together with the associated volatile memory, may form a memory device. The VCA card may thus comprise three memory devices. Alternatively or additionally, the one or more memory devices may be co-processors of the host computer device.

The one or more memory devices are configured to cryptographically protect volatile memory of the one or more memory devices. Cryptographically protecting the volatile memory may correspond to providing access to (only) at least a portion of a software application associated with the cryptographically protected volatile memory, and impeding access to the cryptographically protected volatile memory for other software applications and/or for an operating system of the memory device using cryptographic means. For example, software applications other than the portion of a software application associated with the cryptographically protected volatile memory may be prevented from gaining access to a decrypted version of the cryptographically protected volatile memory and/or from manipulating the cryptographically protected volatile memory.

The one or more memory devices are further configured to provide access to the cryptographically protected volatile memory for one or more software applications of the host computer device 20. For example, the control module 24 may be configured to provide the access to the cryptographically protected volatile memory for the one or more software applications in conjunction with the one or more memory devices. For example, both the host computer device and the one or more memory devices may execute a driver for mutually providing access to the respective volatile memory of the host computer device and of the one or more memory devices. The control module 24 may be configured to implement read and/or write access to volatile memory of the one or more memory devices associated with the one or more software applications. This may enable the exchange of data between the portions of the one or more software applications. For example, the volatile memory for which read and/or write access is implemented by the control module may be unprotected volatile memory (e.g. not the cryptographically protected volatile memory) of the environmental modeling data associated with the one or more software applications. In at least some examples, the control module 24 may be configured to implement the write access to the volatile memory of the one or more memory devices associated with the one or more software applications based on a write combine cache policy. A write combine cache policy may increase a data throughput of data written to the one or more memory devices. For example, a write combine cache policy may combine a plurality (e.g. up to 32) of write accesses to the volatile memory of the one or more memory devices, e.g. within a time interval. If the time interval has passed or if a maximal number of write accesses is reached, the combined write accesses may be transmitted to the one or more memory devices. The control module may be configured to implement the read access to the volatile memory of the one or more memory devices associated with the one or more software applications based on a write through cache policy. This may enable a fast propagation of data changes. For example, changes of the volatile memory at the one or more memory devices may be instantly propagated to the host computer device (e.g. "written through"). If the volatile memory is changed at a memory device, the changes may be written to the volatile memory of the memory device and (instantly) transmitted to the host computer device, e.g. without combining multiple changes. For example, the control module 24 may be configured to provide a local cache of data written to volatile memory of the one or more memory devices associated with the one or more software applications to a further portion (e.g. the first portion) of the one or more software applications executed by a processor of the host computer device 20. The local cache may enable a fast access to the data at the host computer device, and may help reduce a number of read transactions over a potentially slow (PCIe) interface. For example, if the volatile memory is changed at a memory device, the changes may be written to the volatile memory of the memory device and an indication of the change may be (instantly) transmitted to the host computer device, e.g. to force an update the local cache or to invalidate at least a part of the local cache. Before the changes of the volatile memory of the one or more memory devices may be accessed by the further portion of the one or more software applications at the host computer device, the local cache may be updated.

For example, the control module 24 may be configured to store code and data of the one or more software applications within volatile memory of the one or more memory devices associated with the one or more software applications. This may be required to enable an execution of the portion of the one or more software applications at the one or more memory devices. The control module 24 may be configured to provide data of the one or more software applications (e.g. code and data of the one or more software applications) to the one or more memory devices 30 by writing the data to the one or more memory devices 30 using direct memory access (DMA). This may enable a seamless transfer of data, which may be provided by a transparent driver at the host computer device. For example, the control module 24 may be configured to provide one or more memory windows (e.g. one or more DMA windows) for access to volatile memory of the one or more memory devices associated with the one or more software applications to a further portion (e.g. the first portion) of the one or more software applications executed by a processor of the host computer device 20. The memory windows may enable a transparent access to the data for the one or more software applications. For example, the control module 24 may be configured to provide transparent memory access to volatile memory of the one or more memory devices associated with the one or more software applications to a further portion (e.g. the first portion) of the one or more software applications executed by a processor 26 of the host computer device 20. For example, the transparent memory access may be based on the one or more memory windows. The one or more software applications may use the one or more memory windows for accessing the (remote) volatile memory. The one or more software applications may use the one or more memory windows similar to using volatile memory of the host computer device, while accessing the contents of the volatile memory of the one or more memory devices. Accessing the one or more memory windows may (thus) provide a transparent memory access to the volatile memory of the one or more memory devices for the further portion of the one or more software applications executed by the processor 26 of the host computer device. For example, the volatile memory accessible via the transparent memory access/the one or more memory windows may be unprotected volatile memory (e.g. not the cryptographically protected volatile memory) of the environmental modeling data associated with the one or more software applications. This may help avoid having to change the one or more software applications for execution on the computer system. In at least some examples, the control module 24 may be configured to provide the one or more memory windows with separate read and write access. A cache semantic of the read access may be different from a cache semantic of the write access. This may enable a high throughput while maintaining an integrity of the data. For example, the read access may be based on a write through cache policy, and the write access may be based on a write combine cache policy.

In at least some examples, the control module 24 is configured to provide further data of the one or more software applications to the one or more memory devices 30 by providing a direct memory access (DMA) address of the further data to the one or more memory devices 30. Providing the DMA address may enable the one or more memory devices to fetch the further data when it is required at the one or more memory devices, e.g. without interrupting a currently processed portion of a software application. For example, the further data may be a result and/or processed data of the one or more software applications being exchanged between the two portions of the one or more software applications. For example, the further data may be data that is non-time-critical, e.g. that may be accessed by the (second) portion of the one or more software applications when it is convenient for the (second) portion of the one or more software applications. For example, the control module 24 may be configured to provide the further data of the one or more software applications to the one or more memory devices 30 by providing the direct memory access address of the further data to the one or more memory devices 30 via an asynchronous buffer. For example, the asynchronous buffer for providing the further data to the one or more memory devices may be located at the one or more memory devices, and the control module may be configured to write to or pass a message to the asynchronous buffer at the one or more memory devices. An asynchronous buffer might not interrupt the processing of a software application at the one or more memory devices.

Figure 2A:
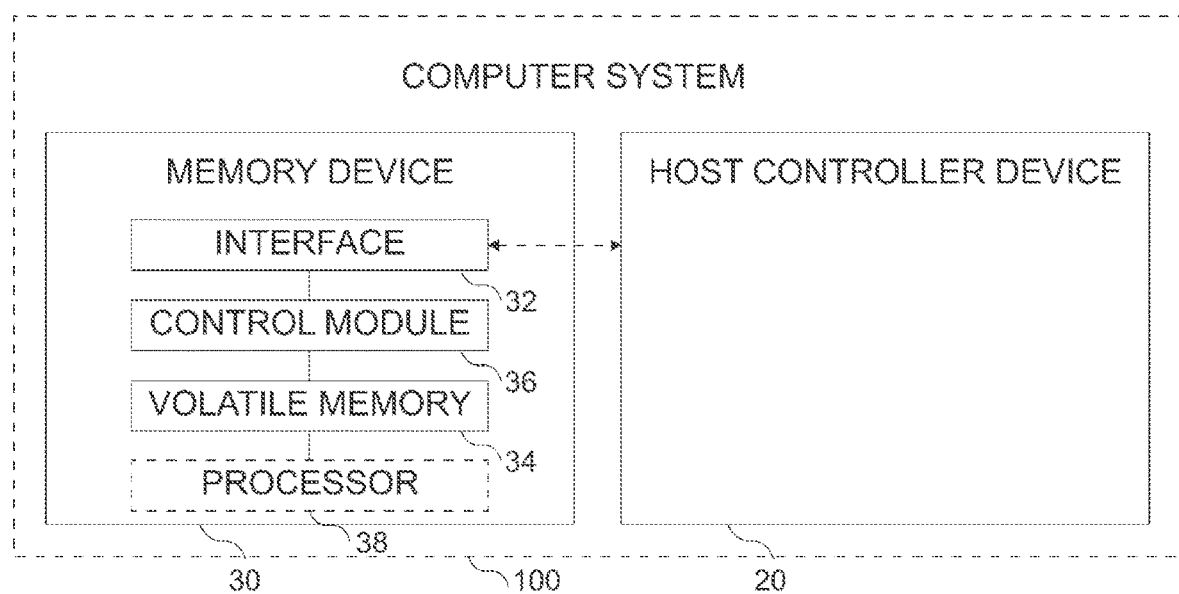
FIG. 2a shows a block diagram of an example of a memory device.

The interface 22 and/or the means for communicating 22 (and/or the interface 32 or means for communicating 32 introduced in connection with FIG. 2a) may correspond to one or more inputs and/or outputs for receiving and/or transmitting information, which may be in digital (bit) values according to a specified code, within a module, between modules or between modules of different entities. For example, the interface 22 may be configured to communicate via a Peripheral Component Interconnect Express interface of the host computer device 20 with the one or more memory devices 30. This may enable using the one or more memory devices on one or more add-in cards plugged into the host computer. For example, the communication between the host computer device and the one or more memory devices may comprise exchanging data between the first and second portion of the one or more software applications.

In examples the control module 24 or the means for processing 24, the control module 36 and/or means for controlling 36 introduced in connection with FIG. 2a, the processor/processing means 26 and/or the processor/processing means 38 may be implemented using one or more processing units, one or more processing devices, any means for processing, such as a processor, a processing circuit, a computer or a programmable hardware component being operable with accordingly adapted software. For example, the control module 24; 36 and/or the means for processing 24; 36 may be a processing circuit. In other words, the described function of the control module/means for controlling 24; 36 may as well be implemented in software, which is then executed on one or more programmable hardware components. Such hardware components, e.g. the processor/processing means 26; 38, may comprise a general-purpose processor, a Digital Signal Processor (DSP), a micro-controller, etc. The control module 24 or means for controlling 24 may comprise or may be based on a processor 26/processing means 26 of the host computer device. The control module 36 or means for controlling 36 may comprise or may be based on a processor/processing means 38 of the memory device 30 introduced in connection with FIG. 2a. In at least some examples, the host computer device 20 (e.g. the control module 24 or means for controlling 24) comprises a general-purpose processor 26 incapable of cryptographically securing volatile memory. Using the one or more memory devices to provide this functionality may enable executing software applications requiring access to cryptographically protected memory at least partially at the host computer device. The processor 38 or processing means of a memory device of the one or more memory devices may be capable of cryptographically securing the volatile memory of the memory device. This may enable the cryptographic protection of the volatile memory.

The control module is configured to execute the one or more software applications by executing a portion of the one or more software applications associated with the cryptographically protected volatile memory using a processor 38 of the one or more memory devices 30. For example, the control module may be configured to provide (binary) code and/or data of the (second) portion of the one or more software applications to the one or more memory devices to execute the one or more software applications using a processor of the one or more memory devices. For example, the control module may be configured to instruct the one or more memory devices to execute the (second) portion of the one or more software applications using a processor of the one or more memory devices.

In at least some examples, the host computer device 20 comprises a network connection interface for communicating via a local network connection. For example, the interface 22 may be configured to communicate via the local network connection. For example, the network connection interface may be or comprise an Ethernet or Fibre Channel interface. The local network connection may be a wired local network connection, e.g. an Ethernet-based local network connection or a Fibre-Channel-based local network connection. The one or more memory devices 30 may be exposed as individual devices via the local network connection.

For example, the control module may be configured to expose the one or more memory devices as individual devices via the local network connection. For example, each memory device may communicate based on an individual identifier, e.g. based on an individual Internet Protocol (IP) v4 or v6 address and/or based on an individual Media Access Control (MAC) address. This may enable full functionality of the one or more memory devices, which may be required for executing the portions of the one or more software applications, or for executing other software on the one or more memory devices.

More details and aspects of the computer system, the host computer device or apparatus and/or the one or more memory devices are mentioned in connection with the proposed concept or one or more examples described above or below (e.g. FIG. 1c to 17). The host computer device or apparatus and/or may comprise one or more additional optional features corresponding to one or more aspects of the proposed concept or one or more examples described above or below.

Figure 1C:
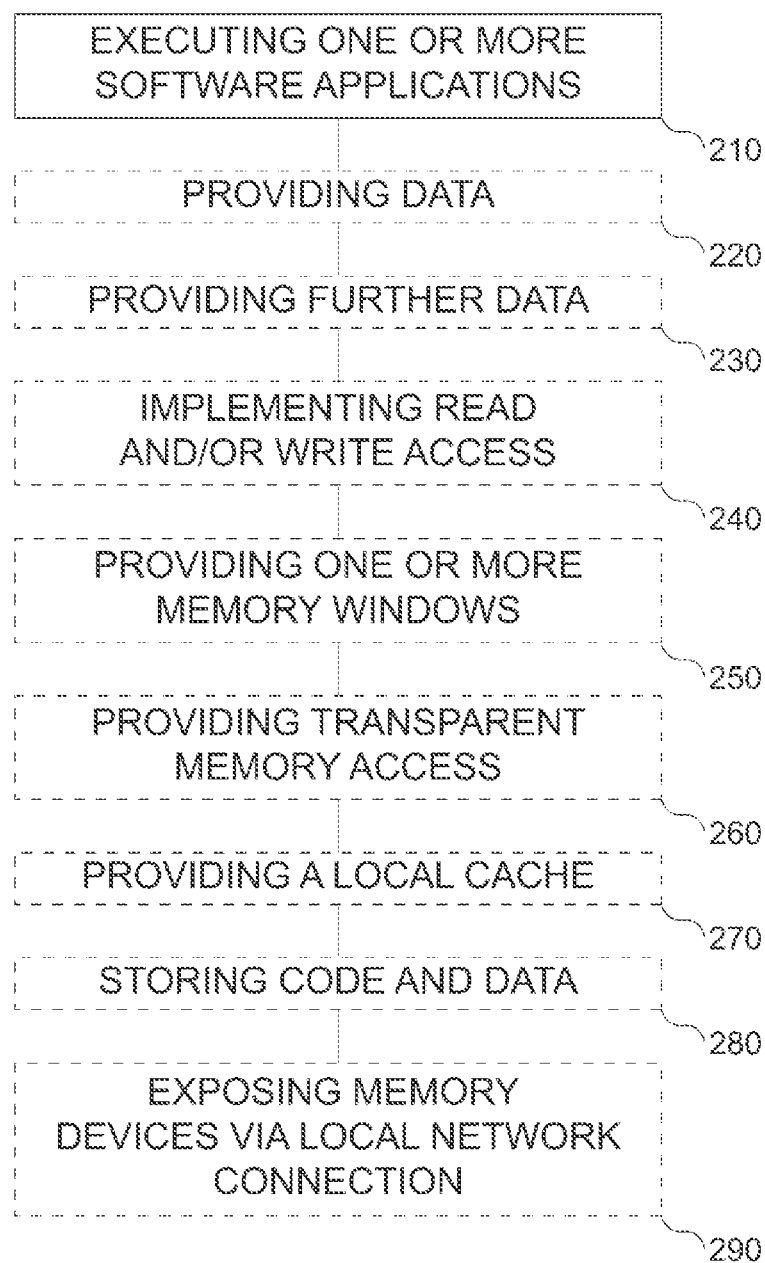
FIG. 1c shows a flow chart of a method for a host computer device.

FIG. 1c shows a flow chart of a method (further denoted "host computer method") for a host computer device (or host computer apparatus) for a computer system. The computer system further comprises one or more memory devices (or memory apparatuses) for cryptographically protecting volatile memory of the one or more memory devices, and for providing access to the cryptographically protected volatile memory for one or more software applications of the host computer device. The host computer method comprises executing 210 the one or more software applications. The one or more software applications are executed by executing a portion of the one or more software applications associated with the cryptographically protected volatile memory using a processor of the one or more memory devices.

For example, software applications of the one or more software applications may comprise a first software application portion and a second software application portion. The first software application portion may be associated with volatile memory of the host computer device and. The second software application portion may be associated with the cryptographically protected volatile memory of the one or more memory devices. The host computer method may comprise executing 210 the second software application portion using the processor of the memory device comprising the cryptographically protected volatile memory associated with the second software application portion.

In at least some examples, the host computer method may comprise providing 220 data of the one or more software applications to the one or more memory devices by writing the data to the one or more memory devices using direct memory access.

For example, the host computer method may comprise providing 230 further data of the one or more software applications to the one or more memory devices by providing a direct memory access address of the further data to the one or more memory devices.

In various examples, the host computer method may comprise providing the further data of the one or more software applications to the one or more memory devices by providing the direct memory access address of the further data to the one or more memory devices via an asynchronous buffering means.

For example, the host computer method may comprise implementing 240 read and/or write access to volatile memory of the one or more memory devices associated with the one or more software applications. The host computer method may comprise implementing the write access to the volatile memory of the one or more memory devices associated with the one or more software applications based on a write combine cache policy. The host computer method may comprise implementing the read access to the volatile memory of the one or more memory devices associated with the one or more software applications based on a write through cache policy.

In some examples, the host computer method may comprise providing 250 one or more memory windows for access to volatile memory of the one or more memory devices associated with the one or more software applications to a further portion of the one or more software applications executed by a processor of the host computer device. The host computer method may comprise providing the one or more memory windows with separate read and write access. A cache semantic of the read access may be different from a cache semantic of the write access.

For example, the host computer method may comprise providing 260 transparent memory access to volatile memory of the one or more memory devices associated with the one or more software applications to a further portion of the one or more software applications executed by a processor of the host computer device.

In various examples, the host computer method may comprise providing 270 a local cache of data written to volatile memory of the one or more memory devices associated with the one or more software applications to a further portion of the one or more software applications executed by a processor of the host computer device.

For example, the host computer method may comprise storing 280 code and data of the one or more software applications within volatile memory of the one or more memory devices associated with the one or more software applications.

In at least some examples, the host computer device may comprise a network connection interface for communicating via a local network connection. The method may comprise exposing 290 the one or more memory devices as individual devices via the local network connection.

More details and aspects of the host computer method are mentioned in connection with the proposed concept or one or more examples described above or below (e.g. FIG. 1a to 1b, 2a to 17). The host computer device or apparatus and/or may comprise one or more additional optional features corresponding to one or more aspects of the proposed concept or one or more examples described above or below.

FIG. 2a shows a block diagram of an example of a memory device 30 or of a memory apparatus 30 for a computer system 100. The components of the memory apparatus 30 are defined as component means, which correspond to the respective structural components of the memory device 30. Examples further provide a computer system 100 comprising the memory device or memory apparatus 30. For example, the memory device/memory apparatus may be a memory extension device/memory extension apparatus.

The computer system 100 further comprises a host computer device 20 or host computer apparatus 20 configured to execute one or more software applications. The components of the host computer apparatus 20 are defined as component means, which correspond to the respective structural components of the host computer device 20. The memory device 30 or memory apparatus 30 comprises an interface 32 or means for communicating 32, suitable for communicating with the host computer device 20/host computer apparatus 20. The memory device 30 or memory apparatus 30 further comprises volatile memory 34. The memory device 30 or memory apparatus 30 further comprise a control module 36 or means for controlling 36. The control module 36 is configured to cryptographically protect the volatile memory 34. The control module 36 is configured to provide access to the cryptographically protected volatile memory 34 for the one or more software applications. The control module 36 is configured to execute a portion of the one or more software applications associated with the cryptographically protected volatile memory 34 using a processor 38 or processing means 38 of the memory device 30. The control module 36 is coupled with the interface 22, the volatile memory and the processor 38. In some examples, the control module 36 may comprise the processor 38.

Using processors of the one or more memory devices to execute a portion of the one or more software applications may enable using processor features of said processors, e.g. the cryptographic protection of the volatile memory, that might not be available at a processor of the host computer device.

In at least some examples, the interface 32 may be configured to communicate with the host computer device 20 via a Peripheral Component Interconnect Express interface 32 of the host computer device 20. This may enable using the one or more memory devices on one or more add-in cards plugged into the host computer. For example, the interface 32 (and/or the interface 22 introduced in connection with FIGS. 1a/1b) may be configured to communicate via a PCIe communication protocol. The memory device and the host computer device may exchange data via the PCIe of the host computer device.

The memory device further comprises volatile memory 34. For example, the volatile memory 34 may be or may comprise random access memory (RAM), e.g. dynamic RAM (DRAM). For example, the volatile memory 34 may comprise or may be based on a volatile memory module, e.g. a Dynamic Random Access Memory (DRAM) module, for example a DDR4 or DDR5 DRAM module or a DDR4 or DDR5 DRAM DIMM (Dual In-line Memory Module).

The control module 36 is configured to cryptographically protect the volatile memory 34. Cryptographically protecting the volatile memory may correspond to providing access to (only) at least a portion of a software application associated with the cryptographically protected volatile memory, and impeding access to the cryptographically protected volatile memory for other software applications and/or for an operating system of the memory device using cryptographic means. For example, software applications other than the portion of a software application associated with the cryptographically protected volatile memory may be prevented from gaining access to a decrypted version of the cryptographically protected volatile memory and/or from manipulating the cryptographically protected volatile memory. For example, the control module 36 may be configured to protect the cryptographically protected volatile memory 34 based on Software Guard Extensions SGX. The control module 36 may be configured to provide one or more software guard extension enclaves for the one or more applications. The one or more software guard extension enclaves may comprise the cryptographically protected volatile memory 34. SGX may be used to provide protected volatile memory, which is inaccessible to other software applications. For example, the cryptographically protected volatile memory may be based on and/or comprise in the one or more software guard extension enclaves.

The control module 36 is configured to execute a portion of the one or more software applications associated with the cryptographically protected volatile memory 34 using a processor 38 or processing means 38 of the memory device 30. In general, software applications of the one or more software applications may comprise a first software application portion and a second software application portion. The first software application portion may be associated with volatile memory of the host computer device 20 and the second software application portion may be associated with the cryptographically protected volatile memory 34 of the memory device 30. The control module 36 is configured to execute the second software application portion. The second software application portion may be further associated with further (unprotected) volatile memory of the memory device. For example, the one or more software applications may be split into the first portion and the second portion by the host computer device, and the second portion and data associated with the second portion may be transmitted/transferred to or stored at the memory device, e.g. within volatile memory of the memory device.

The control module 36 is configured to provide access to the cryptographically protected volatile memory 34 for the one or more software applications. For example, the control module 36 may be configured to provide an exchange of data between the first portion of the one or more software applications and a second portion of the one or more software applications. The data may be exchanged by giving the portion of the one or more software applications being executed on the memory device access to volatile memory of the host computer device. For example, the control module 36 may be configured to implement read and/or write access to volatile memory 34 of the host computer device 20 for the portion of the one or more software applications being executed using the processor 38 of the memory device 30. This may enable the exchange of data between the portions of the one or more software applications. For example, the read and/or write access may be based on Direct Memory Access (DMA). The control module 36 may be configured to provide data of the one or more software applications to the host computer device 20 by writing the data to the host computer device 20 using direct memory access. This may enable a seamless transfer of data, which may be provided by a transparent driver at the host computer device. For example, the control module 24 may be configured to provide one or more memory windows for access to volatile memory of the host computer device 20. The memory windows may enable a transparent access to the data for the one or more software applications. For example, the control module 36 may be configured to read data directly from the volatile memory of the host computer device (using DMA) and/or to write data directly to the volatile memory of the host computer device (using DMA). The control module 24 may be configured to provide the one or more memory windows with separate read and write access. A cache semantic of the read access may be different from a cache semantic of the write access. This may enable a high throughput while maintaining an integrity of the data. For example, the read access may be based on a write through cache policy, and the write access may be based on a write combine cache policy.

For example, the control module 36 may be configured to implement the write access to the volatile memory 34 of the host computer device 20 based on a write combine cache policy. A write combine cache policy may increase a data throughput of data written to the one or more one or more memory devices. For example, a write combine cache policy may combine a plurality (e.g. up to 32) of write accesses to the volatile memory of the one or more memory devices, e.g. within a time interval. If the time interval has passed or if a maximal number of write accesses is reached, the combined write accesses may be transmitted to the one or more memory devices. The control module 36 may be configured to implement the read access to the volatile memory 34 of the host computer device 20 based on a write through cache policy. This may enable a fast propagation of data changes. For example, changes of the volatile memory at the host computer device may be instantly propagated to the host computer device (e.g. "written through"). If the volatile memory is changed at the host computer device, the changes may be written to the volatile memory of the host computer device and (instantly) transmitted to the memory device, e.g. without combining multiple changes. For example, the control module 36 may be configured to provide a local cache of data written to volatile memory of the host computer device associated with the one or more software applications. The local cache may enable a fast access to the data at the memory device, and may help reduce a number of read transactions over a potentially slow (PCIe) interface. For example, if the volatile memory is changed at the host computer device, the changes may be written to the volatile memory of the host computer device and an indication of the change may be (instantly) transmitted to the memory device, e.g. to force an update the local cache or to invalidate at least a part of the local cache. Before the changes of the volatile memory of the host computer device may be accessed by the further portion of the one or more software applications at the memory device, the local cache may be updated.

In at least some examples, the control module 36 is configured to provide further data of the one or more software applications to the host computer device 20 by providing a direct memory access address of the further data to the host computer device 20. For example, the further data may be a result and/or processed data of the one or more software applications being exchanged between the two portions of the one or more software applications. For example, the further data may be data that is non-time-critical, e.g. that may be accessed by the first portion of the one or more software applications when it is convenient for the first portion of the one or more software applications. Providing the DMA address may enable the one or more memory devices to fetch the further data when it is required at the host computer device, e.g. without interrupting a currently processed portion of a software application. The control module 36 may be configured to provide the further data of the one or more software applications to the host computer device 20 by providing the direct memory access address of the further data to the host computer device 20 via an asynchronous buffer. For example, the asynchronous buffer for providing the further data to the host computer device may be located at the host computer device, and the control module may be configured to write to or pass a message to the asynchronous buffer at the host computer device. An asynchronous buffer might not interrupt the processing of a software application at the host computer device.

In at least some examples, the host computer device 20 comprises a network connection interface for communicating via a local network connection. For example, the interface 22 may comprise the network connection interface. In at least some examples, network connections may be tunneled via the interface 22. The network connection interface may be virtual network connection interface, e.g. it may be tunneled via PCIe to the host computer device and configured to connect via a network connection interface of the host computer device. The control module 36 may be configured to communicate via the local network connection via the host computer device 20. In at least some examples, the memory device may be exposed as an individual device via the local network connection. For example, the memory device (e.g. the network connection interface of the memory device) may be assigned an individual identifier, e.g. an IP v4 or v6 address of an individual MAC address. This may enable full functionality of the one or more memory devices, which may be required for executing the portions of the one or more software applications, or for executing other software on the one or more memory devices.

More details and aspects of the memory device are mentioned in connection with the proposed concept or one or more examples described above or below (e.g. FIG. 1a to 1c, 2b to 17). The memory device may comprise one or more additional optional features corresponding to one or more aspects of the proposed concept or one or more examples described above or below.

Figure 2B:
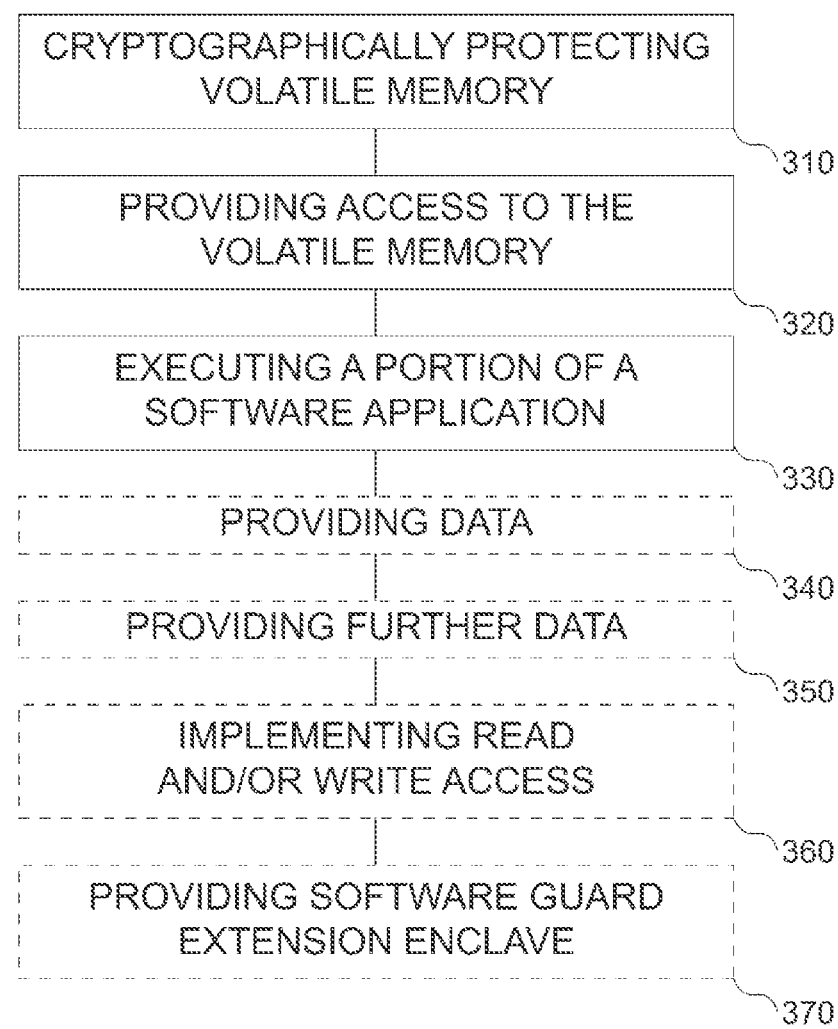
FIG. 2b shows a flow chart of a method for a memory device.

FIG. 2b shows a flow chart of a method for a memory device (in the following denoted memory method). The computer system further comprises a host computer device for executing one or more software applications. The memory method comprises cryptographically protecting 310 volatile memory of the memory device. The method further comprises providing 320 access to the cryptographically protected volatile memory for the one or more software applications. The method further comprises executing 330 a portion of the one or more software applications associated with the cryptographically protected volatile memory using a processor of the memory device.

For example, software applications of the one or more software applications may comprise a first software application portion and a second software application portion. The first software application portion may be associated with volatile memory of the host computer device. The second software application portion may be associated with the cryptographically protected volatile memory of memory device. The memory method may comprise executing 330 the second software application portion.

The memory method may comprise providing 340 data of the one or more software applications to the host computer device by writing the data to the host computer device using direct memory access.

The memory method may comprise providing 350 further data of the one or more software applications to the host computer device by providing a direct memory access address of the further data to the host computer device. The method may comprise providing the further data of the one or more software applications to the host computer device by providing the direct memory access address of the further data to the host computer device via an asynchronous buffer.

The memory method may comprise implementing 360 read and/or write access to volatile memory of the host computer device for the portion of the one or more software applications being executed using the processor of the memory device. The memory method may comprise implementing the write access to the volatile memory of the host computer device based on a write combine cache policy. The memory method may comprise implementing the read access to the volatile memory of the host computer device based on a write through cache policy.

The memory method may comprise protecting 310 the cryptographically protected volatile memory based on Software Guard Extensions. The memory method may comprise providing 370 one or more software guard extension enclaves for the one or more applications. The one or more software guard extension enclaves may comprise the cryptographically protected volatile memory.

More details and aspects of the memory method are mentioned in connection with the proposed concept or one or more examples described above or below (e.g. FIG. 1a to 2a, 2c to 17). The memory device may comprise one or more additional optional features corresponding to one or more aspects of the proposed concept or one or more examples described above or below.

Figure 2C:
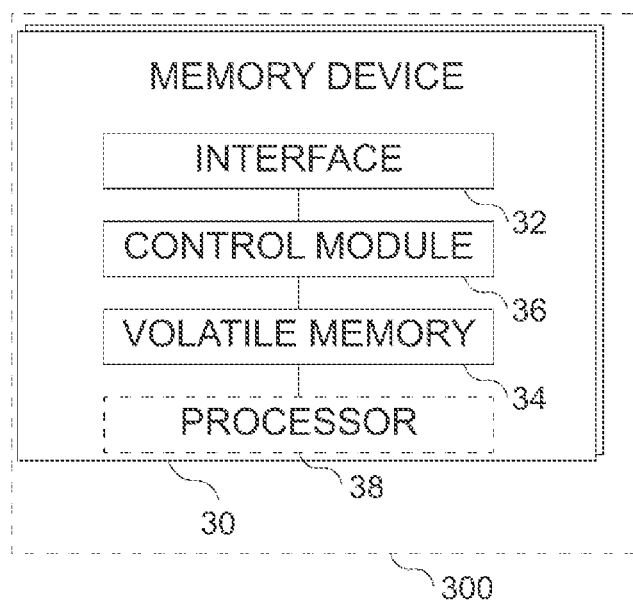
FIG. 2c shows a block diagram of an example of a Peripheral Component Interconnect Express card comprising a plurality of memory devices.

FIG. 2c shows a block diagram of an example of a Peripheral Component Interconnect Express card (i.e. add-in card) 300 comprising a plurality of memory devices 30 or memory apparatuses 30. The PCIe/add-in card may host (i.e. comprise) a plurality of memory devices/apparatuses 30, e.g. three memory devices/apparatuses 30. For example, the interfaces of the plurality of memory devices may share the same communication interface, e.g. the same PCIe interface.

More details and aspects of the add-in card are mentioned in connection with the proposed concept or one or more examples described above or below (e.g. FIG. 1a to 2b, 3a to 17). The add-in card may comprise one or more additional optional features corresponding to one or more aspects of the proposed concept or one or more examples described above or below.

Figure 3A:
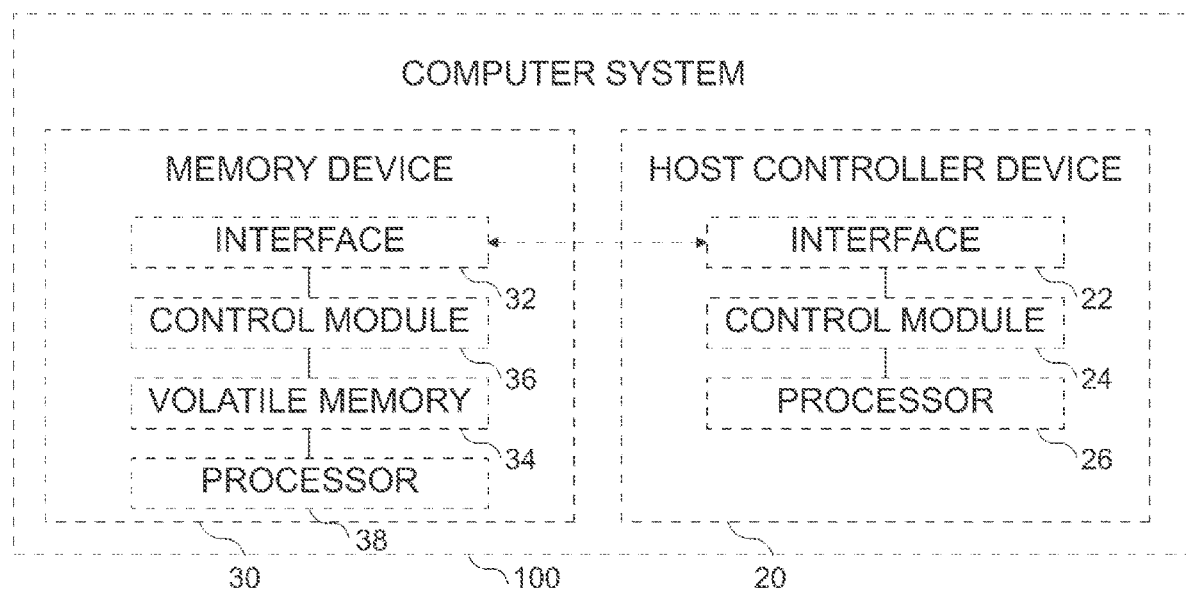
FIG. 3a shows a block diagram of an example of a computer system comprising a host computer device and one or more memory devices.

FIG. 3a shows a block diagram of an example of a computer system 100 for executing one or more software applications. The computer system comprises a host computer device 20 or host computer apparatus 20 and one or more memory devices 30 or memory apparatuses 30. The components of the host computer apparatus 20 and/or of the one or more memory apparatuses 30 are defined as component means, which correspond to the respective structural components of the host computer device 20 and/or one or more memory devices 30.

The host computer device 20 (or host computer apparatus 20) is configured to execute the one or more software applications. The one or more memory devices 30 (or memory apparatuses 30) are configured to cryptographically protect volatile memory of the one or more memory devices 30, and to provide access to the cryptographically protected volatile memory for the one or more software applications, The host computer device 20 is configured to execute the one or more software applications by executing a portion of the one or more software applications associated with the cryptographically protected volatile memory using a processor (or processing means) of the one or more memory devices 30.

Figure 3B:
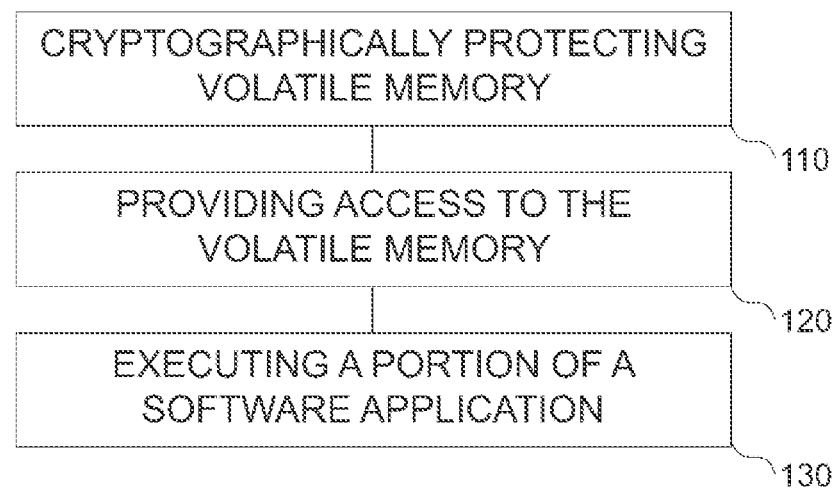
FIG. 3b shows a flow chart of an example of a method for a computer system.

FIG. 3b shows a flow chart of an example of a method for executing one or more software applications in a computer system for a computer system. The computer system comprises a host computer device or host computer apparatus and one or more memory devices or one or more memory apparatuses (e.g. the host computer device/apparatus and memory devices/apparatuses introduced in connection with FIGS. 1-2).

The computer system method comprises the one or more memory devices cryptographically protecting 110 volatile memory of the one or more memory devices. The computer system method comprises the one or more memory devices providing access 120 to the cryptographically protected volatile memory for the one or more software applications. The computer system method comprises the host computer device executing 130 the one or more software applications by executing a portion of the one or more software applications associated with the cryptographically protected volatile memory using a processor (or processing means) of the one or more memory devices.

More details and aspects of the computer system are mentioned in connection with the proposed concept or one or more examples described above or below (e.g. FIG. 1a to 2c, 4 to 17). The memory device may comprise one or more additional optional features corresponding to one or more aspects of the proposed concept or one or more examples described above or below.

The Intel® Visual Compute Accelerator (Intel® VCA) is a PCIe (Peripheral Component Interconnect Express) card built to address the surging growth of video creation and delivery, data center and cloud graphics, and new immersive media experiences.

Built for Telecommunication Service Providers, OTT (Over-The-Top) content providers, and IT (Information Technology) administrators, Intel® VCA may offer advanced workload acceleration for server systems based on the Intel® Xeon® processor E5 family. Designed to deliver graphics-intensive workloads such as 3D CAD and cloud gaming applications, three Intel® Xeon® E3 processors are built around a graphics processor.

In examples, VCA cards may also be used as Secure Compute Accelerator Cards (e.g. comprising the one or more memory devices). Each VCA card has 3 Xeon® E3 CPUs (each with 4 cores). If Software Guard Extensions (SGX) are enabled (in the VCA Basic Input Output System, BIOS), each instance of E3 (e.g. each memory device) may run its own SGX enabled Operation System (OS). A VCA card may occupy 1 PCIe x16 Generation 3 slot. For example, mainstream 2 height unit E5 servers may support 2 cards. Server Input/Output (IO or I/O) configurations may support 10 or more cards.

Figure 4:
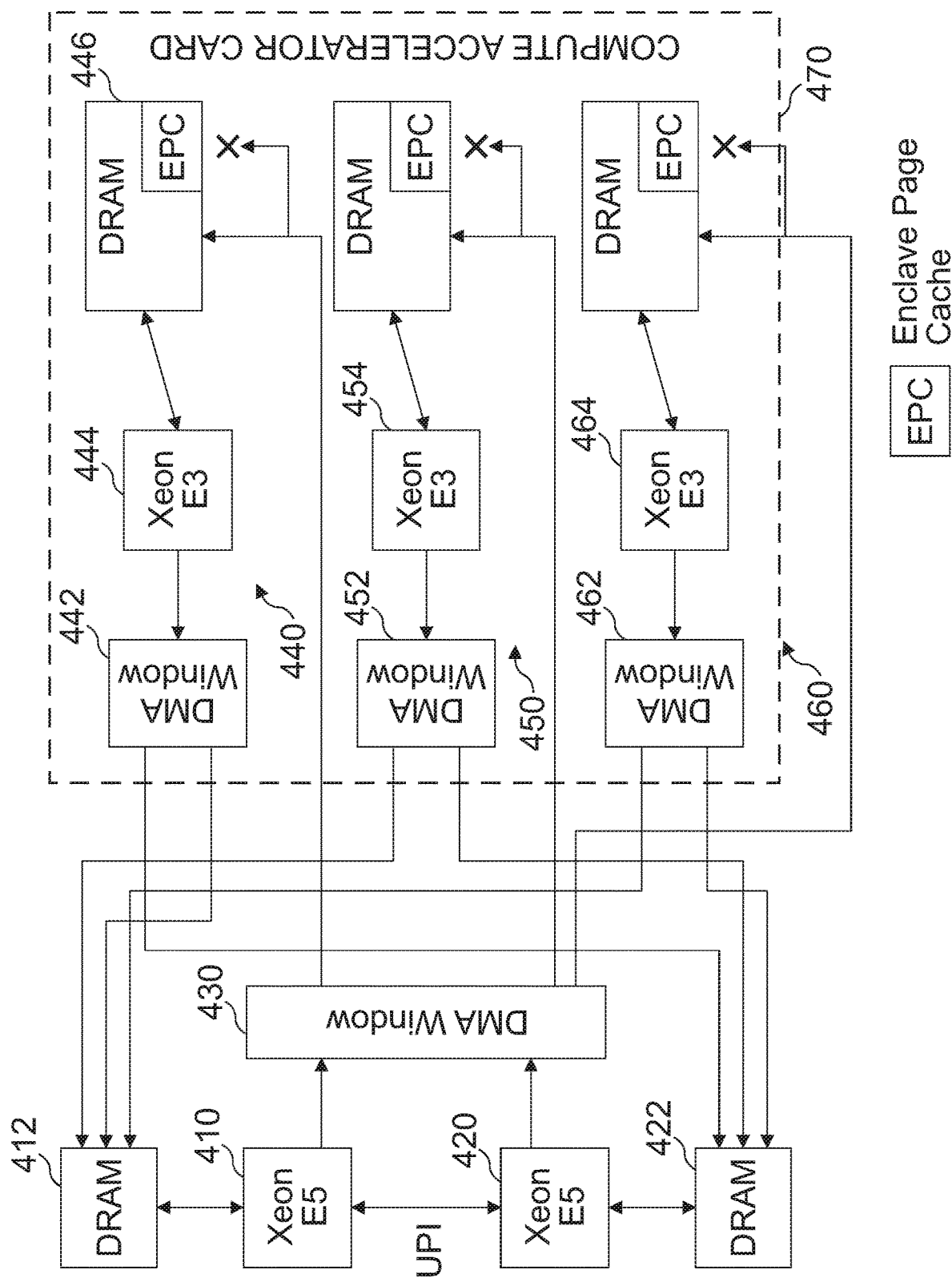
FIG. 4 shows a block diagram of an example of a computer system with a host computer device with two processors and three memory devices.

FIG. 4 shows block diagram of an example of a computer system with a host computer device with two processors and three memory devices. FIG. 4 may show a schematic diagram of a memory access programmable window. FIG. 4 shows two Xeon® E5 processors 410; 420 with associated DRAM 412; 422 (Dynamic Random Access Memory, e.g. the volatile memory of the host computer device). The two Xeon® E5 processors 410; 420 and the DRAM 412; 414 may be comprised by a host computer device as introduced in connection with FIGS. 1a to 3c. The Xeon® E5 410; 420 have access to DRAM 446; 456; 466 of memory devices 440; 450; 460 via a Direct Memory Access window 430. The memory devices 440; 450; 460 each comprise a Xeon® E4 processor 444; 454; 464 and their respective DRAM 446; 456; 466, wherein the DRAM each comprise an Enclave Page Cache (EPC, e.g. the cryptographically protected volatile memory). A Computer Accelerator Card 470 comprises the three memory devices 440; 450; 460. The Xeon® E3 processors (e.g. the control modules/processors of the memory devices) have access to the DRAM/volatile memory of the host computer device via DMA windows 442; 452; 462.

Figure 5A:
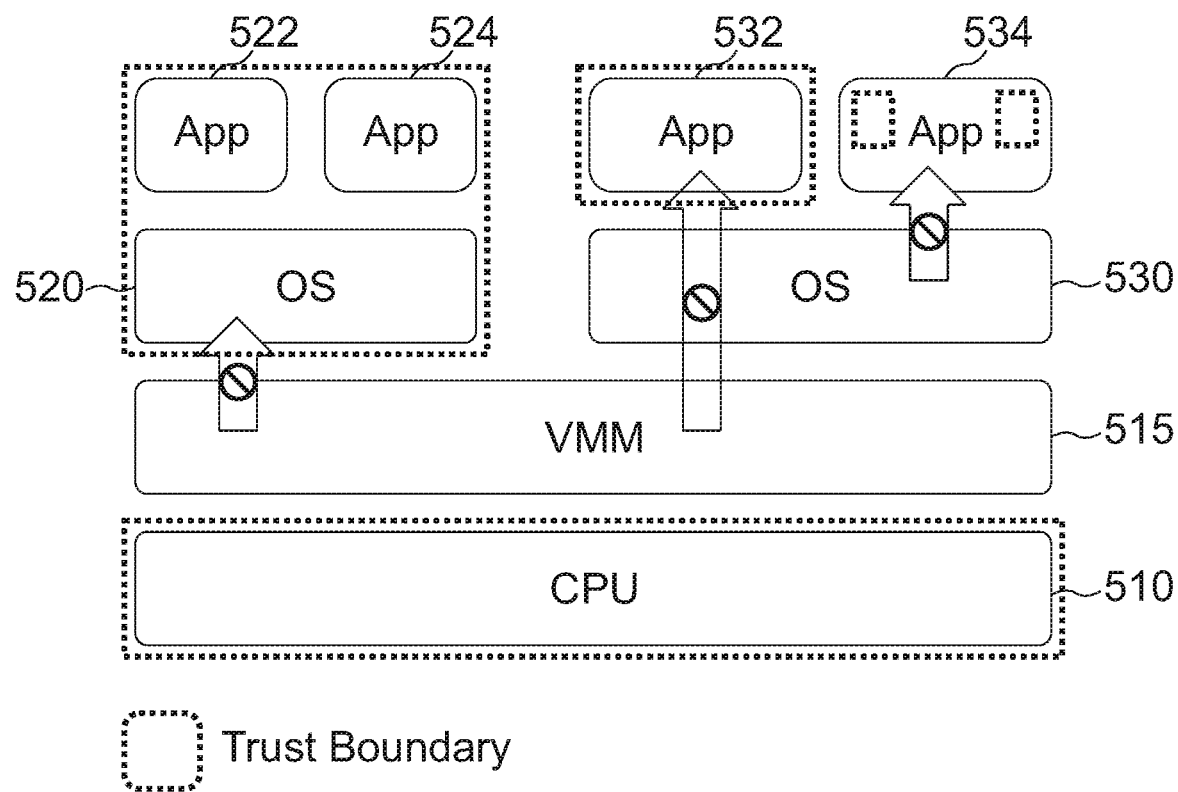
FIG. 5a shows a schematic diagram of trusted computing base boundaries.
Figure 5B:
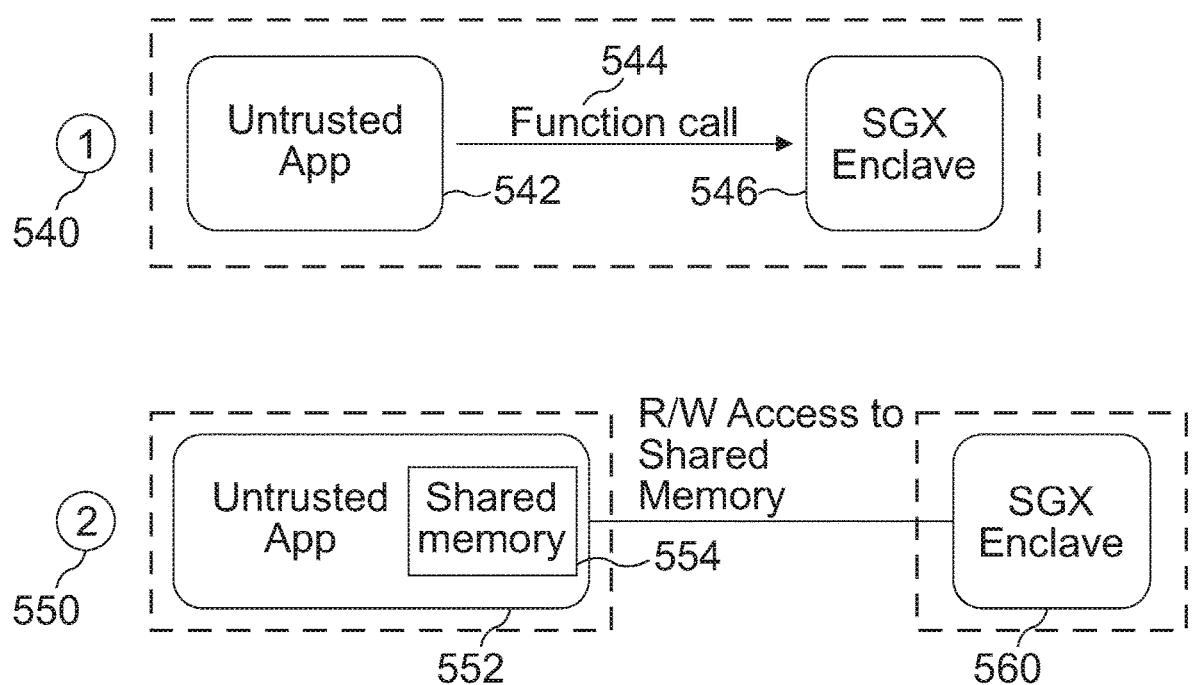
FIG. 5b shows a schematic diagram of SGX (Software Guard Extensions) programming models.

FIGS. 5a and 5b may show a summary of a trusted execution environment (TEE). FIGS. 5a and 5b may show a schematic diagram of a trusted execution environment. FIG. 5a shows a schematic diagram of trusted computing base boundaries. FIG. 5a shows a Central Processing Unit (CPU) 510, a Virtual Machine Manager Layer (VMM) 515 on top of the CPU and a first OS 520 with applications 522; 524 and second OS 530 with applications 532; 534. In FIG. 5a, possible trust boundaries, as indicated by dotted lines, comprise the CPU 510, or the first operating system 520 with its applications 522; 524, an application 532 of the second OS 530, or portions of another application 534 of the second OS. FIG. 5b shows a schematic diagram of SGX programming models. In a first approach 540, an untrusted app 542 makes a function call 544 to an SGX enclave (in the same system). In the second approach 550, the untrusted app 552 is separated from the SGX enclave 560, e.g. running on different processors. The SGX enclave 560 has read/write access to shared memory 554 of the untrusted app 552.

Figure 6A:
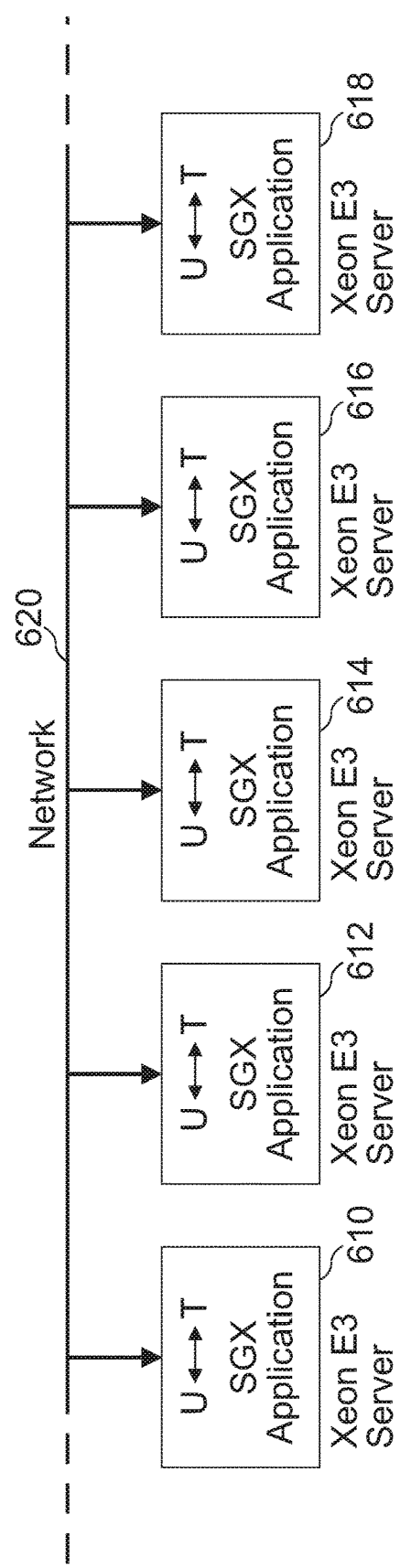
FIG. 6a shows a schematic diagram of a first approach for scaling server class SGX applications.

FIG. 6a shows a schematic diagram of a first approach for scaling server class SGX applications. In the first approach, Xeon® E3 servers 610-618 are connected via a network 620. Each E3 server may host untrusted applications (U) that have access to trusted SGX enclaves (T) within the same E3 server.

Figure 6B:
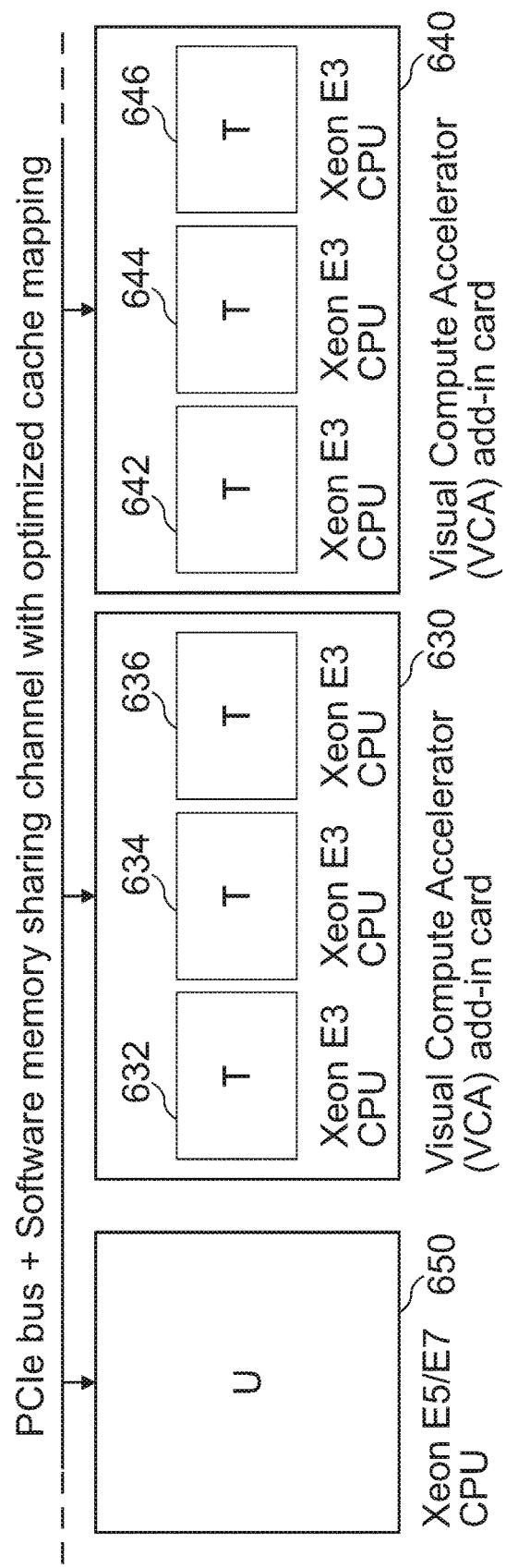
FIG. 6b shows a schematic diagram of a second approach for scaling server class SGX applications according to examples.

FIG. 6b shows a schematic diagram of a second approach for scaling server class SGX applications according to examples. FIG. 6b shows a computer system comprising a host computer device 650 (e.g. the host computer device 20) with a Xeon® E5/E7 and 6 Xeon® E3 CPUs (e.g. 6 memory devices) 632-636; 642-646 located on two VCA add in cards 630; 640 and connected via a PCIe bus 660 with software memory sharing channel with optimized cache mapping.

An application may be best suited for E5+VCA with SGX (e.g. for the computer system of examples) if:
  Most processing is done on untrusted data
  There is a shared memory buffer between trusted and
    untrusted portions of the application
  Memory working set for enclave logic does not require
    gigabytes of trusted memory
  Application throughput can be improved with scale-out
  Examples:
    In-memory databases with some encrypted columns/
      records
    Software defined networking
    Machine learning inferencing/training
    Secure Azure Functions (primary server on E5, trusted
      runtime on E3s)

Figure 7A:
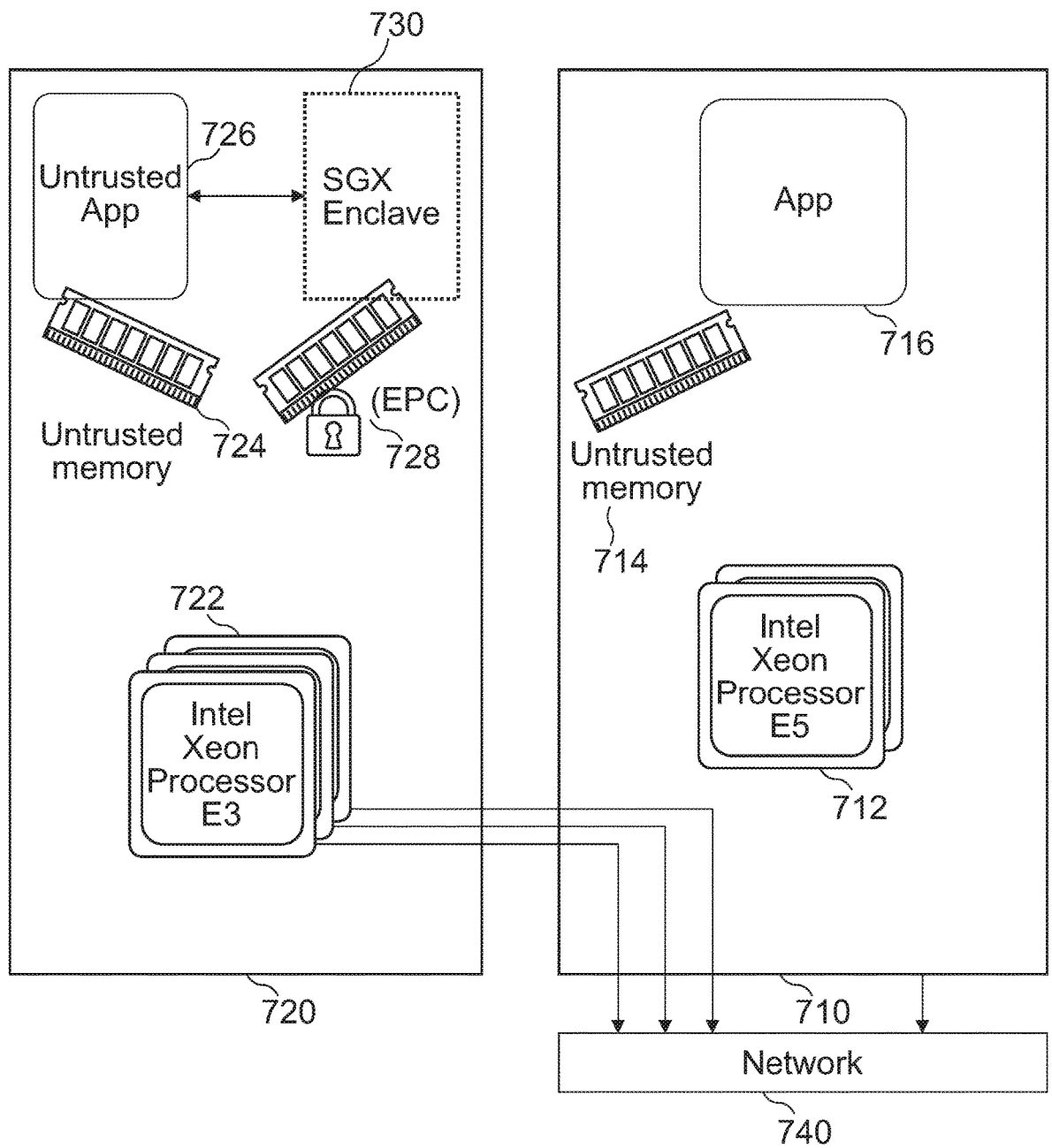
FIG. 7a shows a schematic diagram of using memory devices with a host computer device.

FIG. 7a shows a schematic diagram of using memory devices with a host computer device. FIG. 7a may show an SGX VCA Option for E3 class usages in today's datacenters. FIG. 7a shows a computer system with a host computer device 710 with E5 processors 712, untrusted memory 714, executing an application 716. FIG. 7a further shows an extension card 720 comprising a plurality of Xeon® E3 processors (e.g. memory devices) 722, untrusted memory 724 for executing an untrusted application 726 and EPC 728 (e.g. the cryptographically protected volatile memory) comprising an SGX enclave 730. The E3 processors 722 access a network 740 via the host computer device 710, while the E5 processors 712 access the network directly. This option may enable all current E3 based SGX solutions to run in the E5 cloud environment:

SGX enabled KMS (Key Manager Service), soft HSM (Hardware Security Module)

SGX enabled Blockchain

Secure NFV (Network Functions Virtualization) applications: Router, Firewall, IDS/DPI (Intrusion Detection System/Deep Packet Inspection), Monitor, VPN (Virtual Private Network)

Secure In-Mem DB (In-Memory Database) applications: Redis, MemCached

Figure 7B:
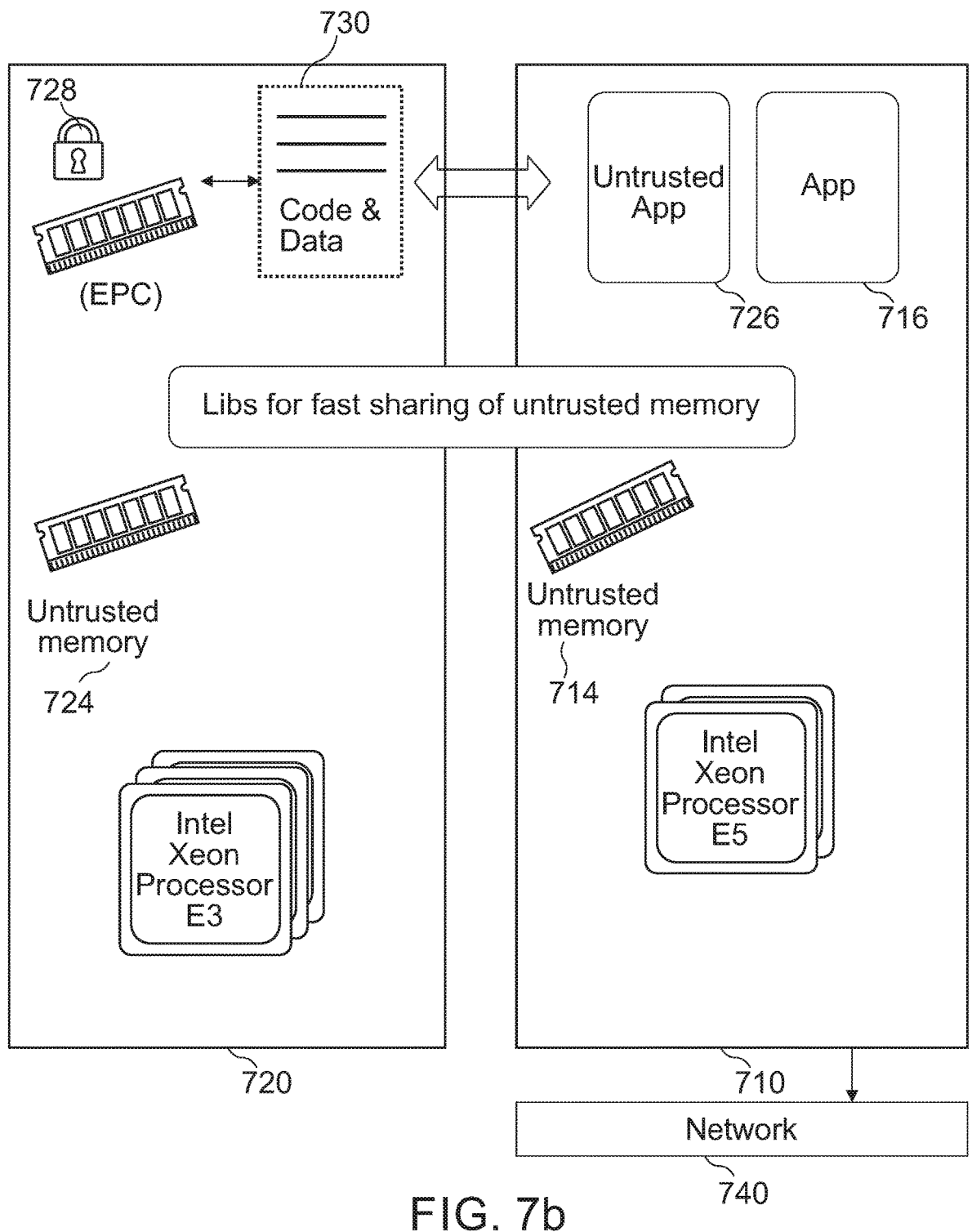
FIG. 7b shows a schematic diagram of using memory devices with a host computer using libraries for fast sharing of untrusted memory.

FIG. 7*b* may show a schematic diagram of using memory devices with a host computer using libraries for fast sharing of untrusted memory. FIG. 7*b* may show a schematic diagram of a computer system with a host computer device and three memory devices. Differently to FIG. 7*a*, the untrusted application 726 is executed by the E5 processor 712, with code and data being processed in the EPC on the E3 processors 722. (Only) the E5 processor might access the network in this scenario. In FIG. 7*b*, libraries are used for fast sharing of untrusted memory. FIG. 7*b* may show a further SGX VCA Option for E5 class usages in today's datacenters.

The computer system (host computer device+memory devices) may be exposed as 1 E5 platform with a security offload card. This may provide a path to server class SGX usages. It may provide a simpler scale out model to keep up with E5 threads. It may provide an approach for increasing a density within a CSP (Cloud Service Provider) environment, as it shares the E5's power and real estate only. It might require support for new libraries for sharing of untrusted memory.

A fast memory sharing library may be used to share large amount of E5 untrusted memory. This may enable a large class of high performance SGX applications. This approach may provide a simpler and efficient scale out model, wherein the same large untrusted shared memory accessed is accessed by more E3s. This option may enable high performance and server class variants of current E3 based SGX solutions, high performance SGX enabled Blockchain applications, high throughput multiuser SGX enabled KMS/soft HSM, Secure NFV applications: Router, Firewall, IDS/DPI, Monitor, VPN, secure In-Mem DB applications: Redis, MemCached and/or secure analytics and machine learning.

Figure 7C:
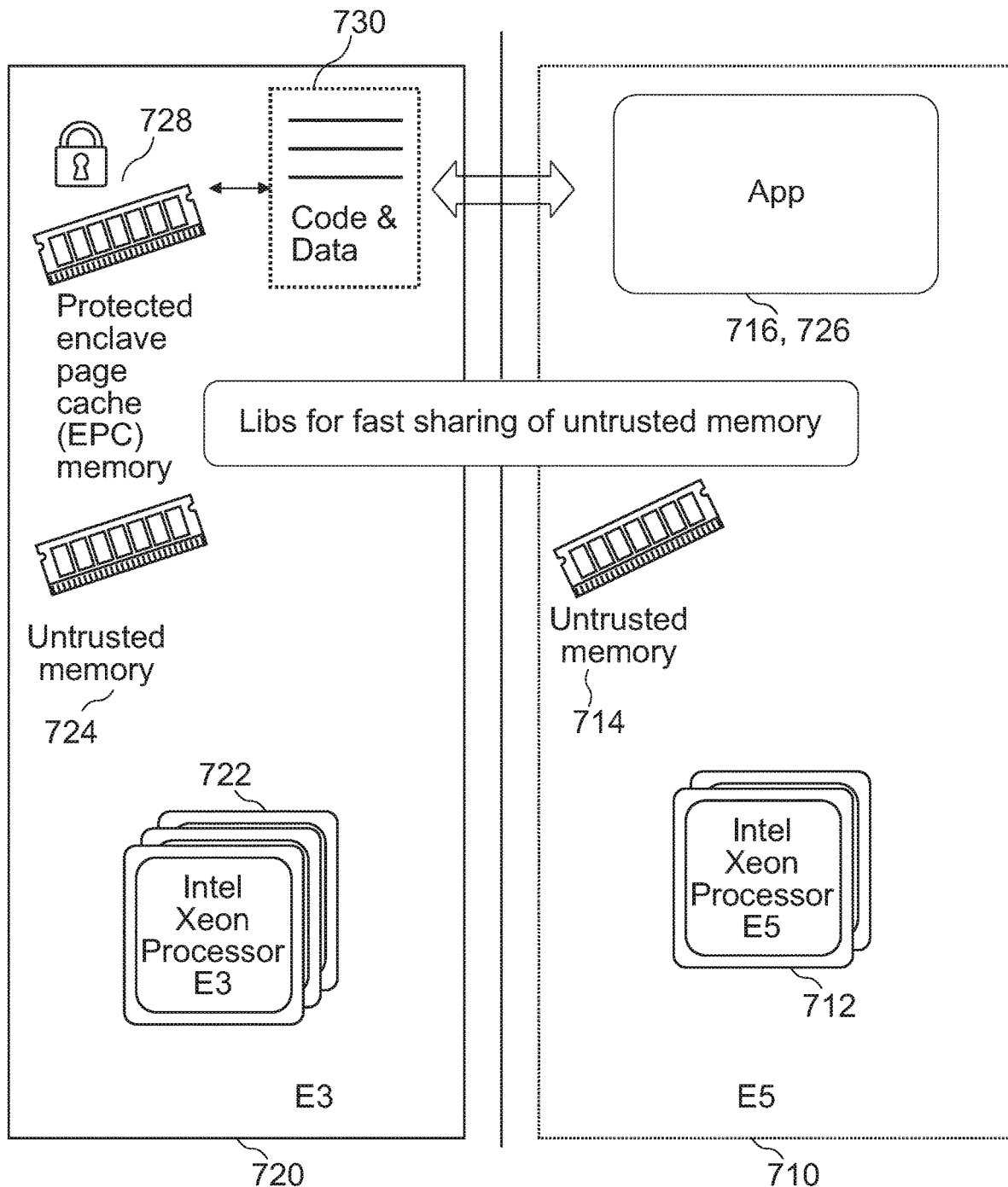
FIG. 7c shows a schematic diagram of an exemplary example of using memory devices with a host computer using libraries for fast sharing of untrusted memory.

FIG. 7*c* shows a schematic diagram of an exemplary example of using memory devices with a host computer using libraries for fast sharing of untrusted memory. In FIG. 7, only the application 726 might be executed by the E5 processor. In a Proof of Concept measurement with SGX-enable NFV (Network packet filtering, Examining every packet in the data path, Checking against 100K entry hash table) using Intel® Data Plane Development Kit soft routing SDK (Software Development Kit), 120 Gbps were reached with 1 VCA card, and 160 Gbps with 2 VCA card. The Performance may scale linearly with the number of E3 CPUs. In examples, such memory devices may be used for SGX enabled in-mem databases and/or Analytics and ML (Machine Learning).

Figure 8:
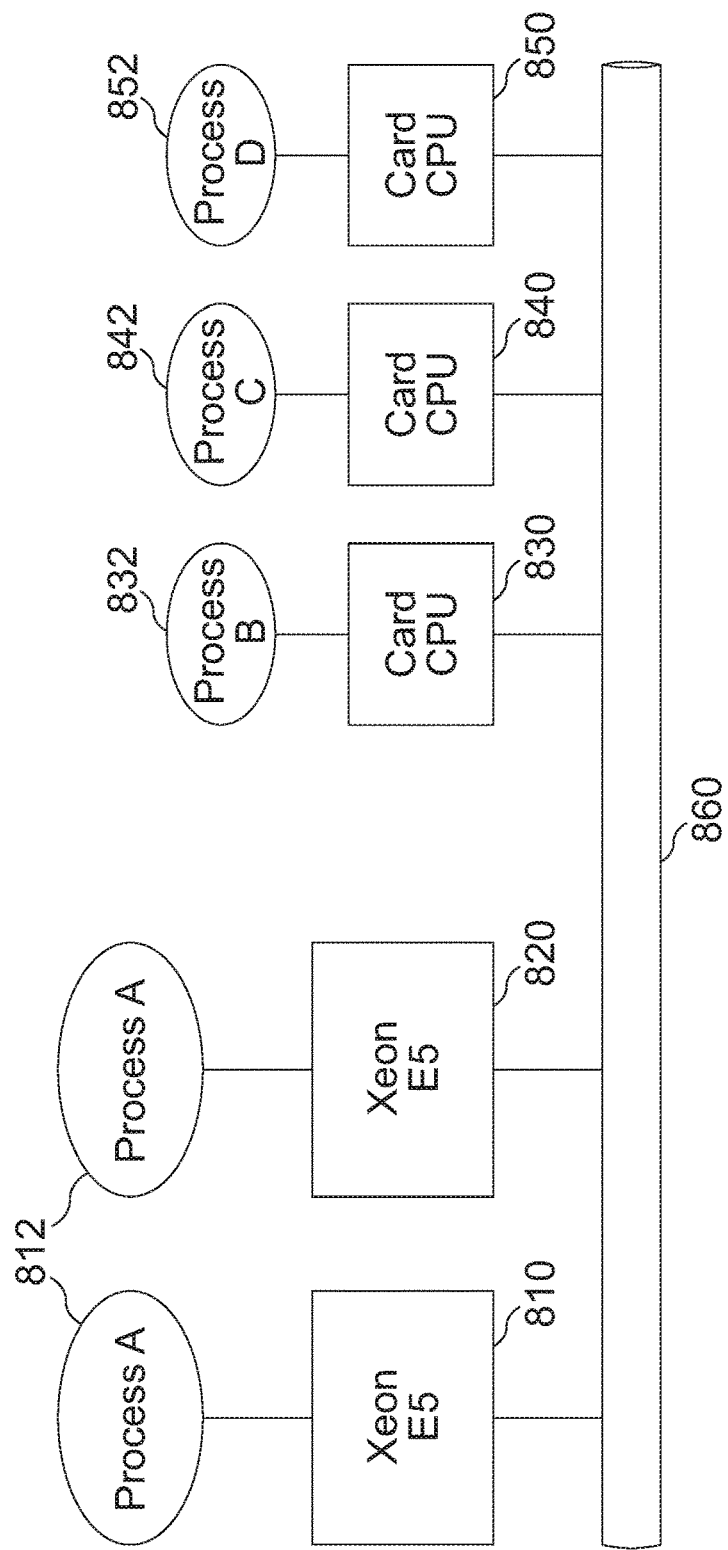
FIG. 8 shows a block diagram of a computer system with a host computer device and three memory devices.

FIG. 8 shows a block diagram of a computer system with a host computer device and three memory devices. FIG. 8 may illustrate the fast memory-sharing problem of using Shared Memory between heterogeneous processes. Process A 812 may be executed by Xeon® E5 810 and 820, and processes B, C and D 832; 842; 852 may be executed by card CPUs 830; 840; 850. The CPUs are connection via a bus 860.

Figure 9A:
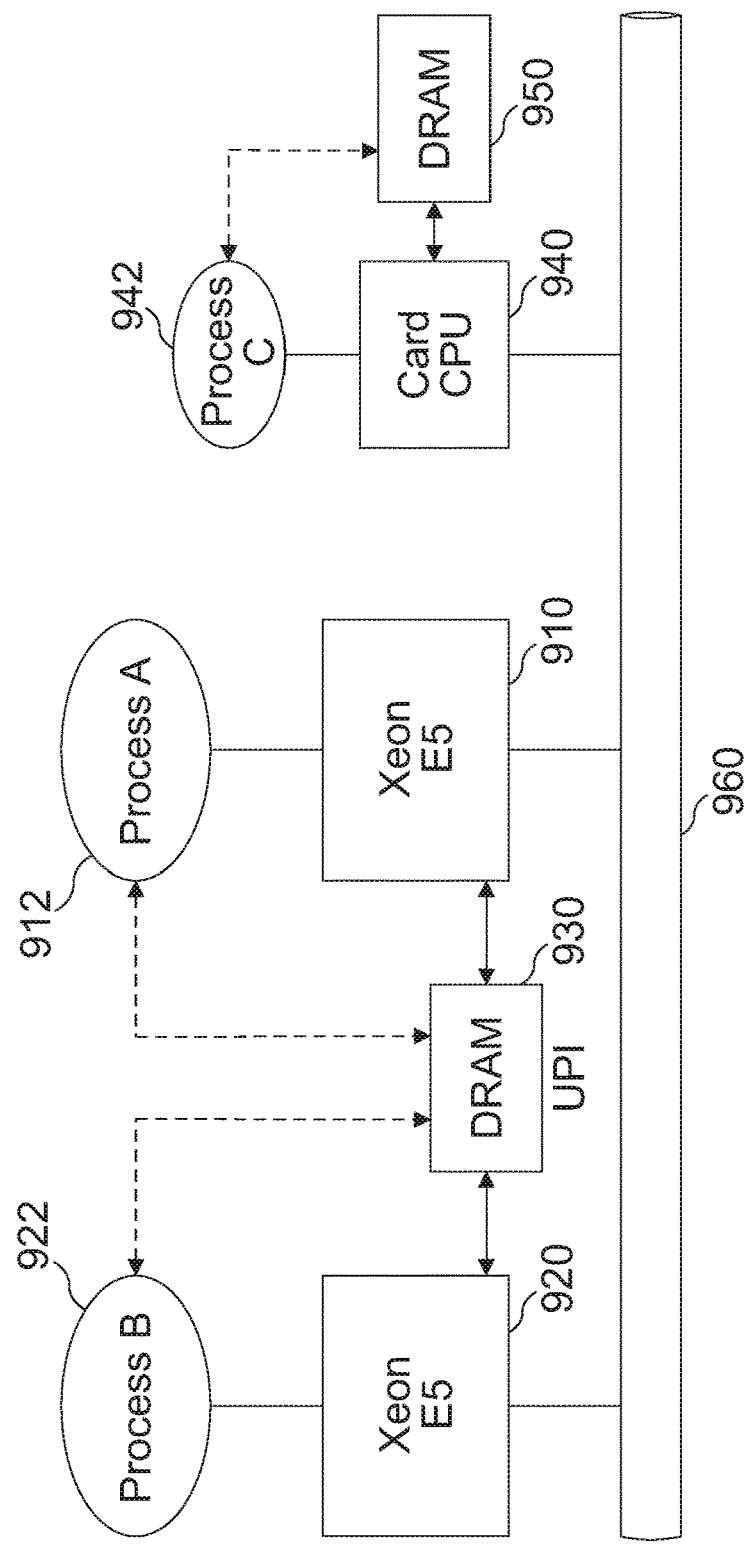
FIGS. 9a to 9c show block diagrams of a cache coherency approach for a computer system with a host computer device and three memory devices.
Figure 9B:
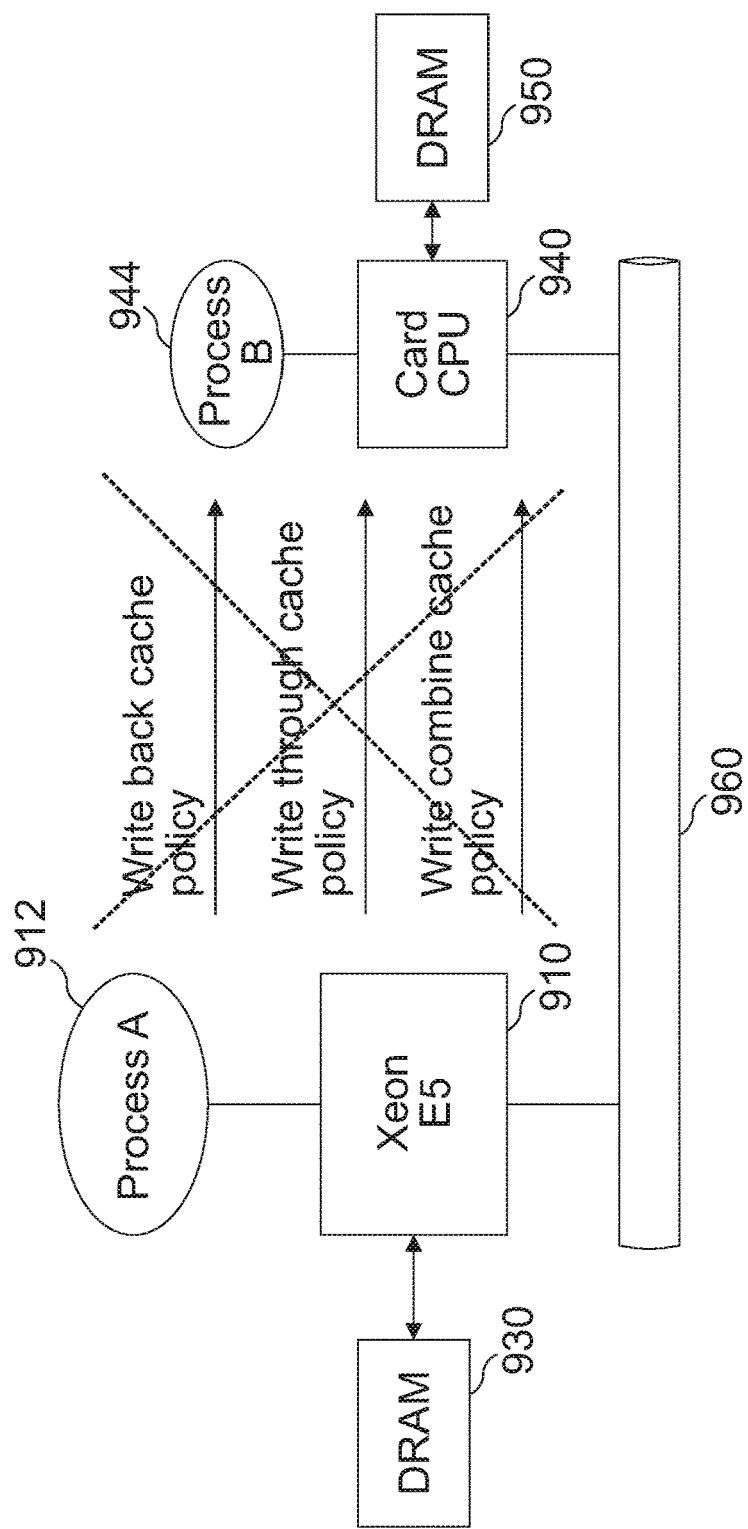
Figure 9C:
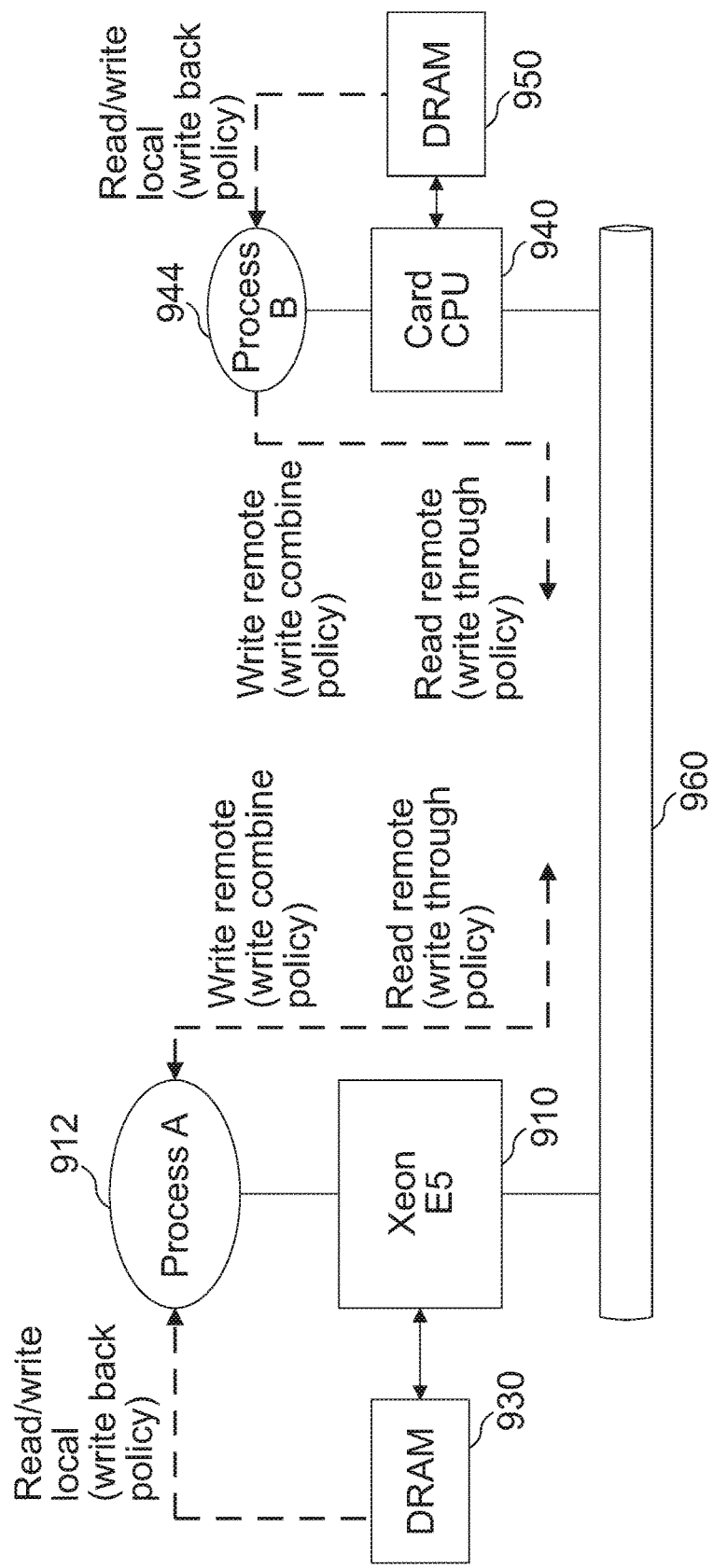
Figure 10:
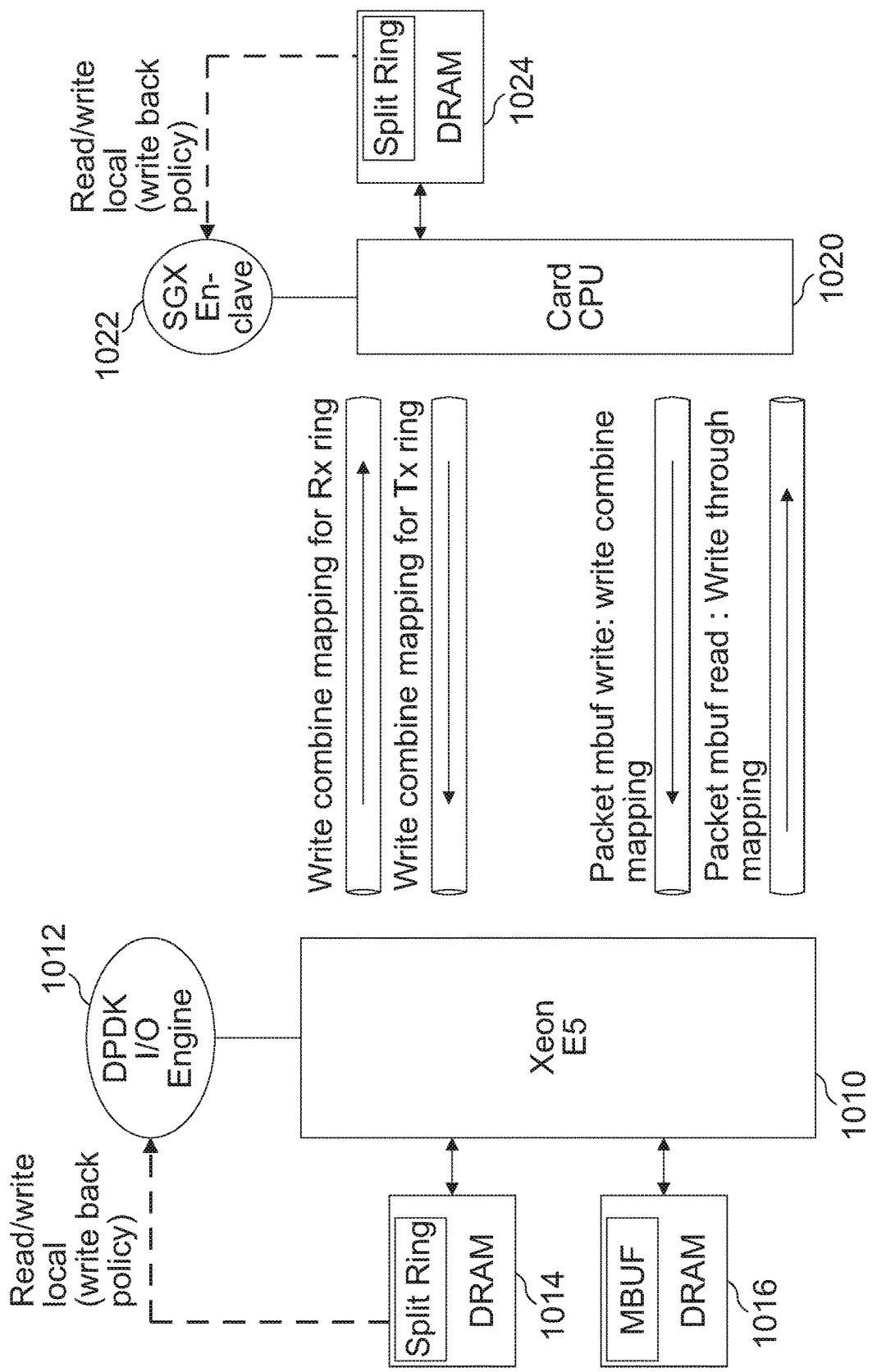
FIG. 10 shows a block diagram of a caching policy in a computer system with a host computer device and a memory device.

FIGS. 9*a* to 9*c* show block diagrams of a cache coherency approach for a computer system with a host computer device and three memory devices. FIG. 9*a* may show a schematic overview of a cache coherency issue with shared memory processes. FIG. 9*b* may show a schematic overview of how to approach the cache coherency issue with different cache policies. FIGS. 9*c* and 10 may show a schematic overview of an approach to handle the cache coherency issue. FIGS. 9*a* to 9*c* show Xeon® E5s (e.g. of a host computer device) 910; 920 executing Processes A; B 912; 922. Xeon® E5s (and Processes A; B) have access to DRAM 930, e.g. via UltraPath Interconnect (UPI). FIGS. 9*a* to 9*c* further show Card CPU 940 (e.g. a memory device) executing a process and having access to DRAM 950. The Xeon® E5s and the Card CPU are connected via an interconnect 960.

In FIG. 9*a*, Card CPU 940 executes Process C 942. FIG. 9*a* may illustrate a cache coherency issue with shared memory processes (e.g. in between processes A and B).

In FIG. 9*b*, Xeon® E5 920 is not shown. FIG. 9*b* may illustrate that using the same cache policies for all access might not solve the cache coherency issue. The cache coherency problem might be approached with different cache policies. In FIG. 9*b*, the Card CPU 940 executes process B 944.

FIG. 9*c* may shows an approach for the cache coherency problem. In the approach, Process A 912 may use a write back policy for local read write access to DRAM 930, a write combine policy for remote writes and a write through policy for remote reads. Process B 944 at the Card CPU 940 may use write back policy for local read/writes, a write combine policy for remote writes and a write through policy for remote reads.

An Application Programming Interface (API) may be provided for the one or more software applications. In the following, exemplary API calls are listed:

// API to share local memory with remote socket; is also used by library to setup async queues int share_local_memory(int socket, void *ptr, unsigned long size, int mapping_type);

// Given remote socket and local mapping index number, returns the virtual address mapped into apps address space.

void* map_remote_memory(int socket, unsigned long request_size, int mapping_number);

// Initialize and setup a queue with the remote socket for data dequeue queue_object *init_dequeue(int socket);

// Initialize and setup a queue with the remote socket for data enqueue queue_object *init_enqueue(int socket);

// Producer Side of the application will call this to push data into queue into a certain channel idx.

int s_variable_multi_enqueue(queue_object *queue_obj, void *source, unsigned int total_elements, unsigned int idx);

// Consumer side of the application will call this to take out data from queue a certain channel idx int s_variable_multi_dequeue(queue_object *queue_obj, void *source, unsigned int max_requested, unsigned int idx);

// Free up queue_object if no longer required void free_queue(queue_object *q);

FIG. 10 shows a block diagram of a caching policy in a computer system with a host computer device and a memory device. FIG. 10 may show a SGX-NFV secure packet processing architecture. FIG. 10 shows a Xeon® E5 (e.g. the host computer device) 1010 with a DPDK I/O Engine 1012 and Split Ring DRAM 1014 and MBUF (data structure used internally to carry messages) DRAM 1016. The DPDK I/O Engine 1012 accesses the Split Ring DRAM 1014 using a write back policy for local read/write access. FIG. 10 further shows Card CPU 1020 (e.g. of a memory device), with an SGX Enclave 1022 and Split Ring DRAM 1024. The SGX Enclave 1022 accesses the Split Ring DRAM 1024 using a write back policy for local read/write access. For the Split Ring DRAM, a write combine mapping is used for the Rx (Receive) ring (from E5 to Card CPU), and a write combine mapping is used for the Tx (Transmission) ring. For the MBUF memory, for a packet mbuf write (from the Card CPU to the E5) a write combine mapping is used, for a packet mbuf read (from the E5 to the Card CPU) a write through mapping is used.

Figure 11:
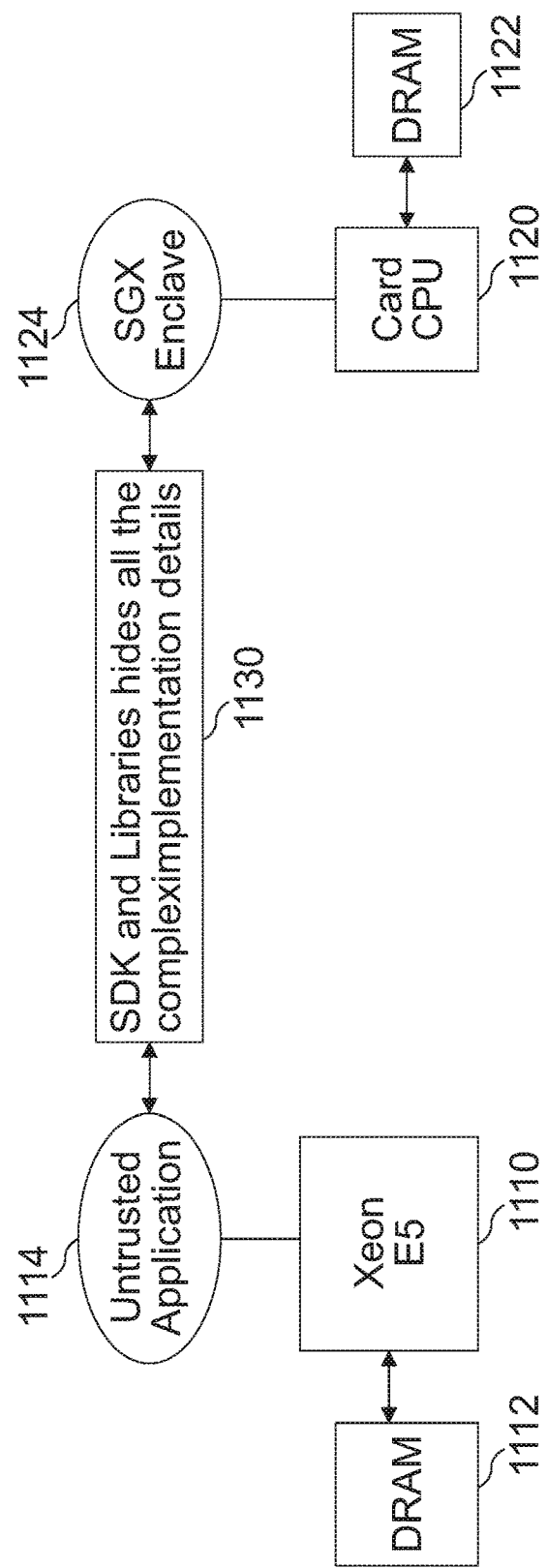
FIG. 11 shows a simplified block diagram of executing one or more software applications in a computer system comprising a host computer device and a memory device.

FIG. 11 shows a simplified block diagram of executing one or more software applications in a computer system comprising a host computer device and a memory device. FIG. 11 may show a schematic overview of how to run generic SGX applications on a Xeon® E5 platform. FIG. 11 shows a Xeon® E5 1110 with DRAM 1112 executing an untrusted application (e.g. a host computer device with volatile memory executing a software application of the one or more software applications) using a SGX enclave 1124 running on a Card CPU 1120 with DRAM 1122 (e.g. cryptographically protected memory provided by a memory device with volatile memory). An SDK (Software Development Kit) and software libraries 1130 may hide (all) the complex implantation details. FIG. 11 may illustrate running generic SGX applications on Xeon® E5 platform.

Figures 1, 12:
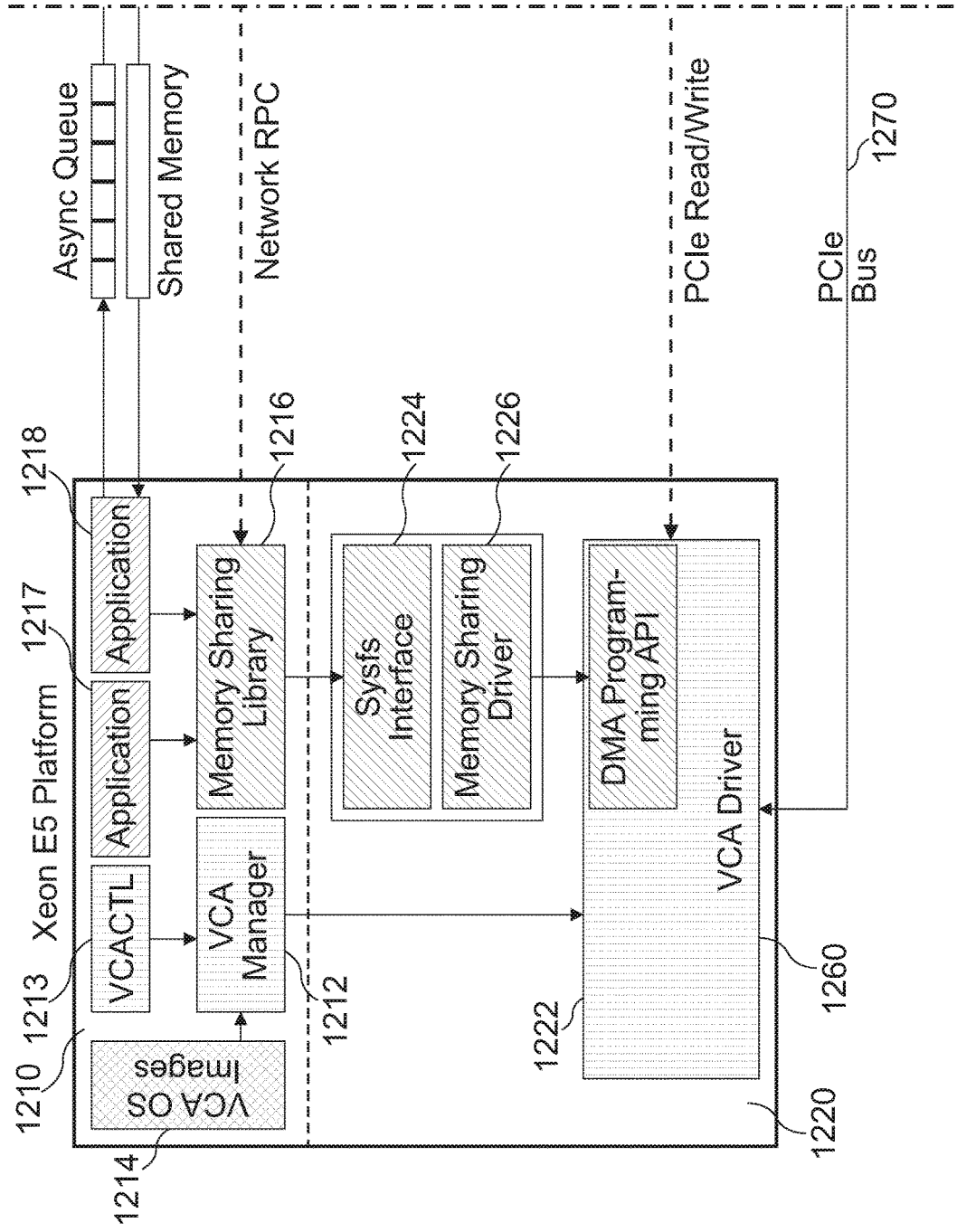
FIG. 12 shows a block diagram of a shared memory software architecture of a computer system comprising a host computer device and three memory devices.
Figures 2, 12:
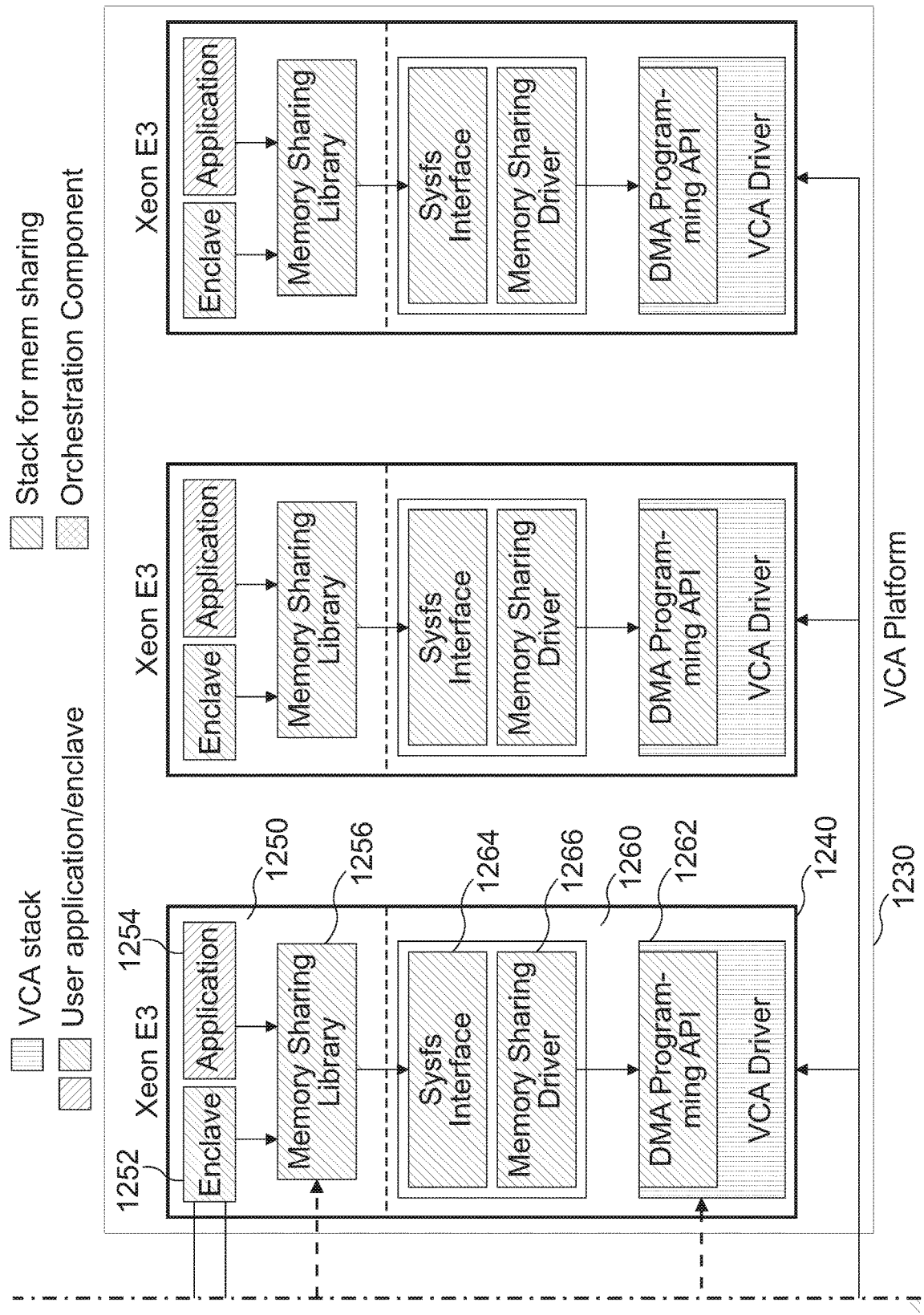

FIG. 12 shows a block diagram of a shared memory software architecture of a computer system comprising a host computer device and three memory devices. FIG. 12 may show a VCA Shared memory software architecture. FIG. 12 shows a Xeon® E5 Platform (e.g. the host computer device) 1200 with a first portion 1210 (e.g. a user level portion) and a second portion 1220 (e.g. a kernel level portion). The first portion comprises a VCA manager 1212 that is accessible via a VCA control program 1213 and that has access to VCA OS images 1214. The first portion further comprises a memory-sharing library 1216 that is accessible to a first application 1217 and to a second application 1218 of the first portion. The second portion comprises a VCA driver 1222 with a DMA programming API (Application Programming Interface), and a sysfs (system file system) interface (an interface of the Linux operating system) 1224 and a memory sharing driver 1226 that access the DMA programming API of the VCA Driver 1222. FIG. 12 further shows a VCA platform 1230 comprising three Xeon® E3 platforms (e.g. memory devices). All three Xeon® E3 platforms may be implemented similarly. The Xeon® E3 platform 1240 comprises a first portion 1250 (e.g. a user level portion) with an Enclave 1252 (e.g. the cryptographically protected volatile memory) and an application 1254 which both have access to a memory sharing library 1256 of the first portion. The memory sharing library is connected to a VCA Driver 1262 with a DMA programming API of a second portion 1260 (e.g. a kernel level portion) of the Xeon® E3 platform, via a sysfs interface 1264 and a memory sharing driver 1266, which the second portion of the E3 platform may also comprise.

Applications of the E5 platform may communicate with the portion of the applications running on the E3 platforms for example using an asynchronous queue (for passing DMA addresses) or by using shared memory. Memory sharing libraries 1216 (E5) and 1256 (E3) may communicate using network remote procedure calls (RPCs). The VCA drivers 1222 and 1262 may communicate using PCIe Read/Writes. The E5 platform may be connected to the E3 platforms via a PCIe bus 1270.

The VCA driver may set up a virtual network Interface on host (E5) and VCA (E3s) sockets. The VCA driver may also set up a virtual block device interface for booting VCA sockets with OS Images 1214. The computer system may comprise a memory sharing library abstraction layer between host and VCA sockets, the memory sharing libraries may talk over network RPC to setup memory sharing. E3 class SGX applications might continue to communicate with trusted enclave over network RPC. E5 class applications may use shared memory and asynchronous queues for low latency and direct app-enclave communication.

Figure 13:
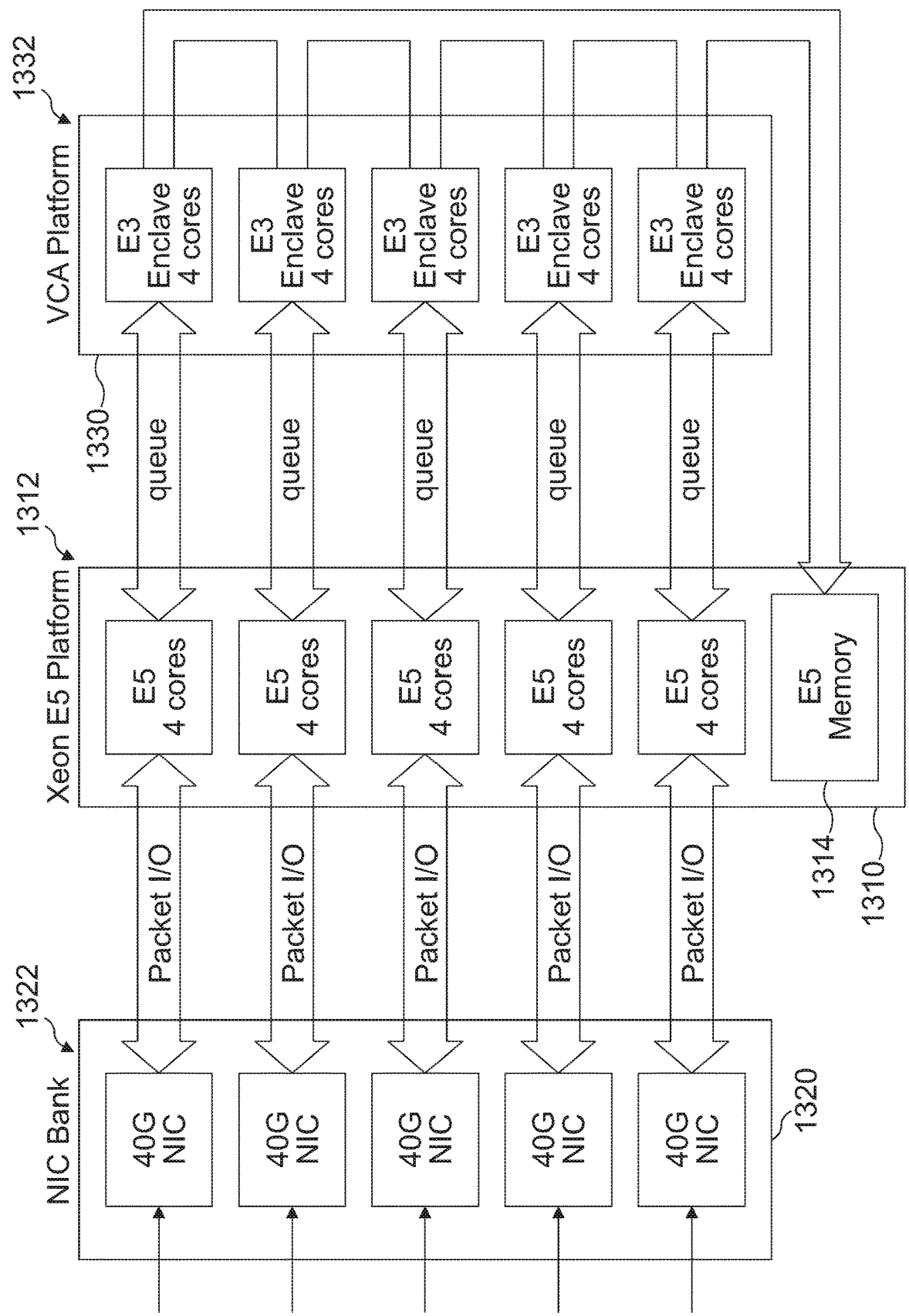
FIG. 13 shows a block diagram of a secure packet processing approach.

FIG. 13 shows a block diagram of a secure packet processing approach. FIG. 13 shows a Xeon® E5 platform (e.g. the host computer device) 1310 with E5 processors 1312 with 4 cores each and with E5 memory 1314. FIG. 13 further shows a NIC (Network Interface Card) bank 1320 (e.g. the network interface) with 40G network interface cards 1322. FIG. 13 further shows a VCA platform 1330 with E3 enclaves 1332 (e.g. memory devices). The E5 processors communicate with the E3 enclaves using queues and with the 40G NICs using packet I/O. The E3 enclaves further have access to the E5 memory. FIG. 13 may show NFV Secure packet processing.

In some examples, the computer system may comprise a plurality of host computer devices or a host computer device with a plurality of processors. The plurality of host computer devices and/or the plurality of processors may be configured to communicate with the one or more memory devices (e.g. a VCA 2 add-in card) via PCIe Gen 3 via an M.2 Riser card. For example, the plurality of host computer devices and/or the plurality of processors may be configured to communicate with the one or more memory devices via a PCIe multiplexer, e.g. to share access to the PCIe interface to communicate with the one or more memory devices.

FIGS. 14a to 14d show four configurations of computer systems for executing one or more software applications. FIGS. 14a to 14d may show SGX with VCA—possible E3/E5 configurations. In the following, the E5 processors (and the software executed on them and the associated memory) may be the host computer device, while the E3 processors (and the software executed on them and the associated memory) may be the memory devices.

Figure 14A:
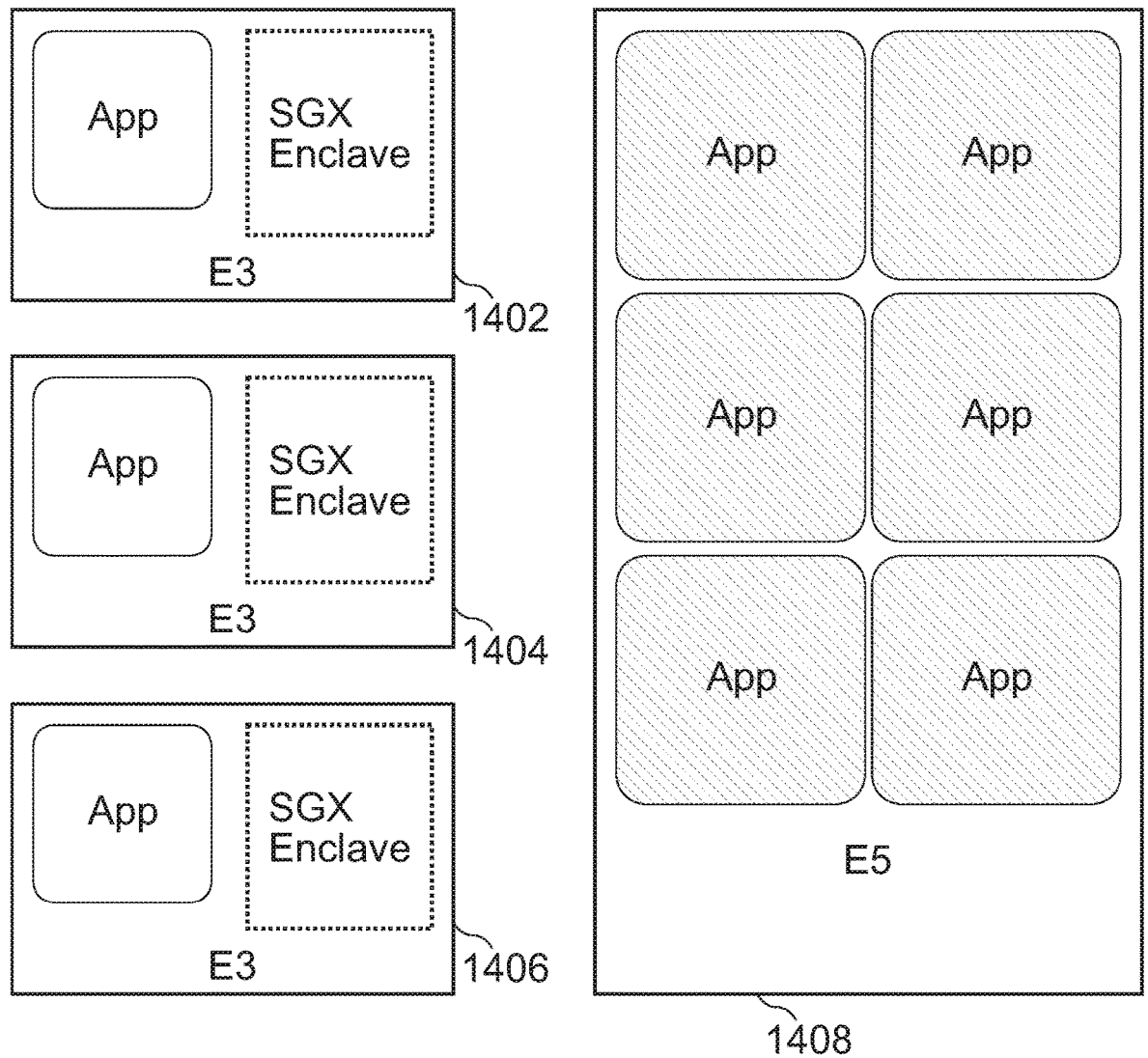
FIGS. 14a to 14d show four configurations of computer systems for executing one or more software applications.

FIG. 14a shows computer systems 1402; 1404; 1406 (E3) and 1408 (E5). Computer systems 1402-1406 are E3-based computer systems, which comprise an SGX Enclave for running trusted parts/portions of SGX applications. The untrusted parts of SGX applications are executed outside the SGX Enclave by the E3-based computer systems. Computer system 1408 is an E5-based computer system, which is capable of executing non-SGX applications. This may illustrate a computer system that requires both E5 and E3 Infrastructure (separately). SGX apps may run with limited capacity. SGX app scale out may involve network communication.

Figure 14B:
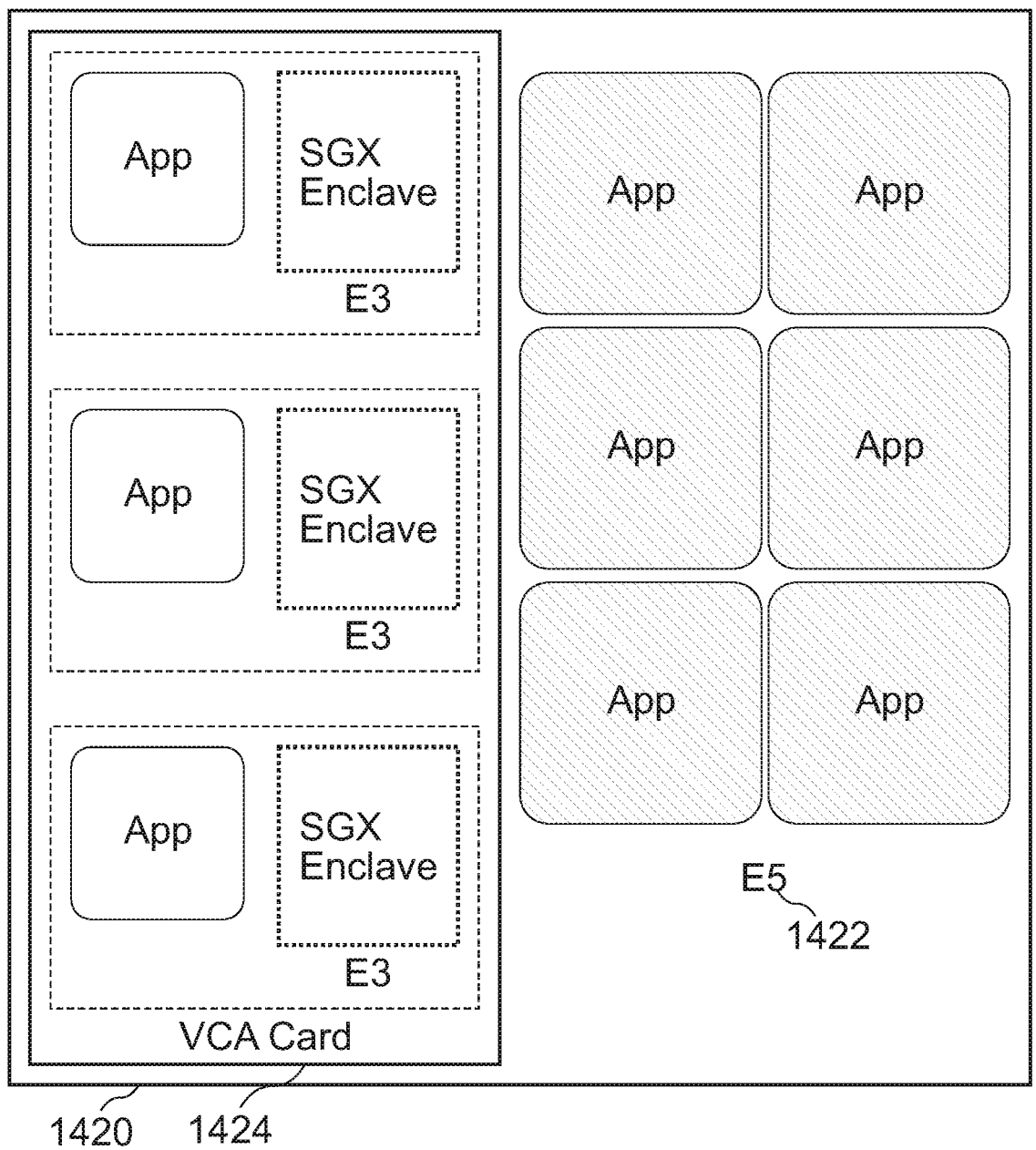

FIG. 14b shows a computer system (E5+VCA) 1420 with an E5 processor platform 1422, which is capable of executing non-SGX applications. The computer system 1420 further comprises a VCA card 1424 with three E3 processors, which each comprise an SGX Enclave for running trusted parts/portions of SGX applications. The untrusted parts of SGX applications are executed outside the SGX Enclave by the E3-based computer systems. This illustrates a computer system that might only require E5 infrastructure. SGX apps still run with limited capacity. SGX applications scale-out may still involve network communication.

Figure 14C:
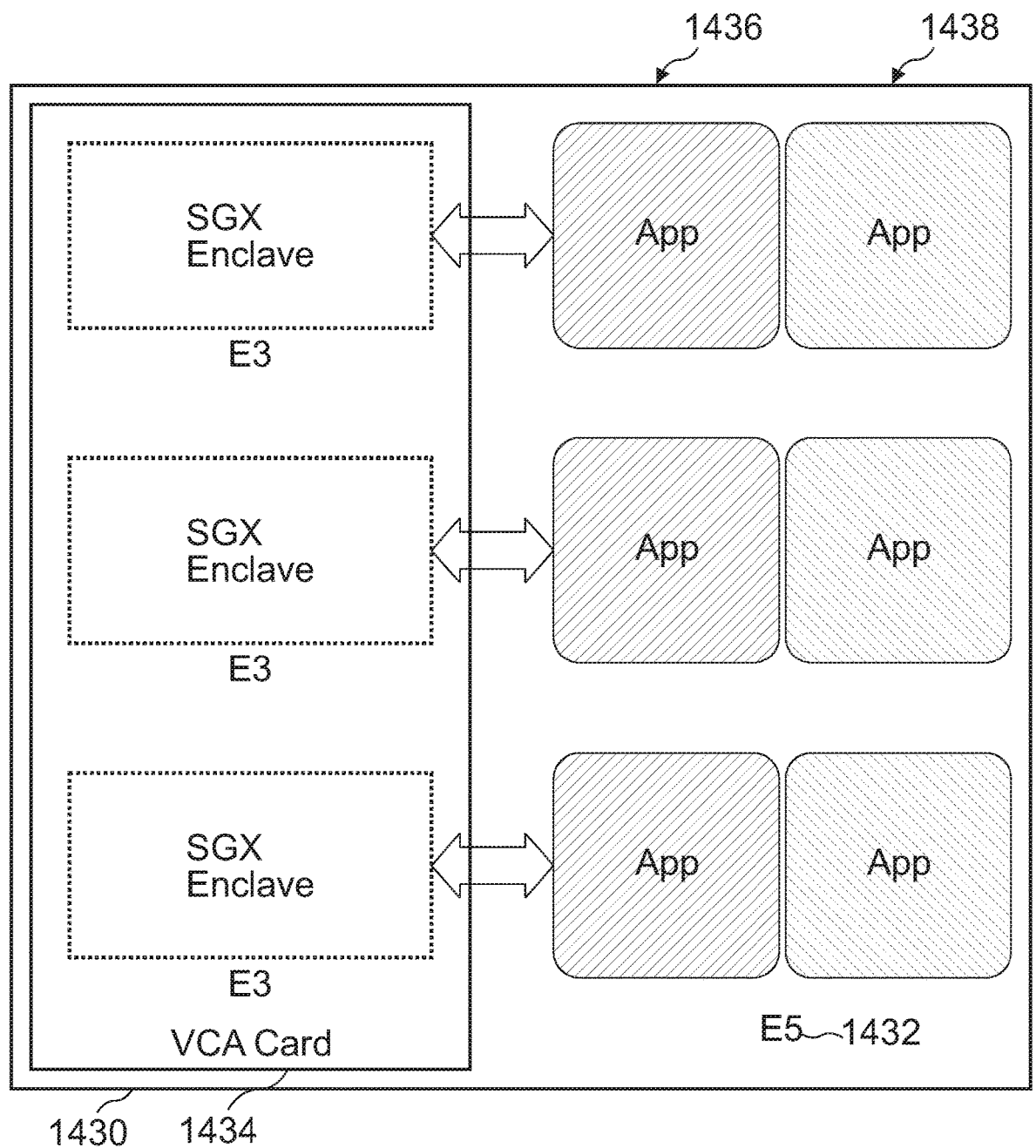

FIG. 14c shows a computer system (E5+VCA+Memory Sharing) 1430 with an E5 processor platform 1432. The computer system 1430 further comprises a VCA card 1434 with three E3 processors, which each comprise an SGX Enclave for running trusted parts/portions of SGX applications. The untrusted parts of SGX applications 1436 are executed, alongside the non-SGX applications 1438, by the E5 processor platform 1432. This illustrates a computer system that might only require E5 infrastructure. SGX apps may run with a higher capacity, an SGX app scale out may involve using more VCA cards (i.e. more E3s). FIG. 14c may show a block diagram of a computer system with a host computer device and three memory devices.

Figure 14D:
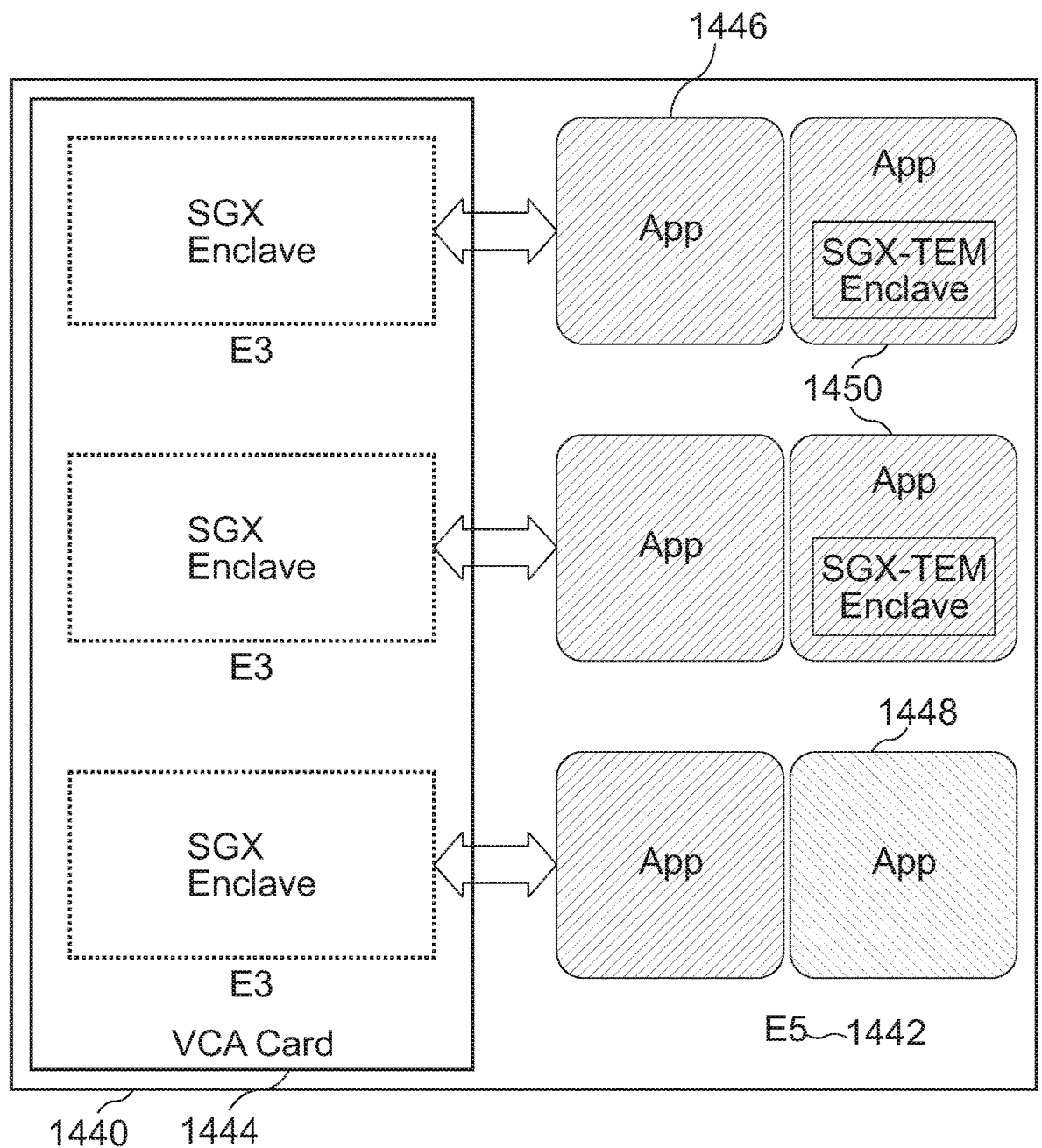

FIG. 14d shows a computer system (ICX E5+VCA+ Memory Sharing) 1440 with an E5 processor platform 1442. The computer system 1430 further comprises a VCA card 1444 with three E3 processors, which each comprise an SGX Enclave for running trusted parts/portions of SGX applications. The untrusted parts of SGX applications 1446 are executed, alongside the non-SGX applications 1448, by the E5 processor platform 1442. Some applications 1450 may comprise an SGX-TEM Enclave. This illustrates a computer system that might only require E5 infrastructure. SGX apps may run with a higher capacity. SGX-TEM apps may run with full capacity.

In some systems, E3 standalone systems may be used to execute the entire software applications, e.g. 1-socket platforms. Untrusted and trusted portions of applications may be executed in the same E3 system. The untrusted portions may be constrained by E3 cores, memory, and IO. A scalability of big-data cloud apps (e.g. db) may be limited by the E3 platform. The untrusted portions might not see the EPC memory. The trusted portions may have full visibility into the untrusted memory. At least some providers may be reluctant to deploy E3 in cloud environments, which may limits an availability of SGX. Enclave memory scaling may be limited to 128 MB EPC. A power consumption of such systems may be high.

Alternatively, a VCA add-in card may be used, e.g. with 3-sockets. The untrusted portions of the software applications may be executed on the E5/E7s, the trusted portions on the E3 add-in card. The Untrusted portions may scale to full E5/7 resources. Big-data cloud apps may scale well on E5/7. The untrusted portions might not see EPC memory on add-in. The trusted portions may have full visibility into E5/7 (untrusted) memory. The E3s used as an as add-in to E5/7 may be more acceptable in cloud environments, which may enable a dense SGX availability. Enclave memory may scale as part of E5/7 address space to a) 3×128 MB EPC and, b) with number of add-in cards. A power consumption may be low for equivalent compute power (slightly lower than General Purpose Computation on Graphics Processing Unit (GPGPU) card).

Furthermore, memory sharing over PCIe might not introduce new security risks. In the SGX model, everything outside of the enclave might be untrusted. The enclave, and associated EPC memory, may run entirely in the E3 CPU, not directly accessible by the E5. In the VCA model, everything outside of the E3, including PCIe, may be untrusted.

Compared to a stand-alone E3 server, the VCA card may provide a better performance because communication with E5 is over a virtual NIC using shared memory (14.7 Gbps vs 2 Gbps), even better if libraries are implemented for memory sharing between the E3 and E5 over PCIe.

EPCs (e.g. cryptographically protected volatile memory) from multiple E3s/VCAs might be pooled (to appear as one memory space) and used within a distributed cloud application. This may be consistent with the scalability of applications design for the cloud.

At least some examples may support a multi-tenant virtualized environment. At least some examples may be invisible to application code running on the E5, e.g. code compatible/binary compatible, e.g. after relinking with new libraries.

At least some examples might not create PCIe bottlenecks. Each E5 may support 40 lanes of PCIe, for a standard dual socket platform that is 80 lanes of PCIe total. One VCA card may use 16 lanes of PCIe, which is 20% of an 80 lane total assuming that the VCA workload constantly saturates the lanes (unlikely). Bottlenecks might not be seen until 80 lanes is exceeded. So a server might be using up to 64 lanes of PCI constantly before an impact would be observed with one card. This is unusual except for systems already hosting many GPGPUs.

Examples that are used with software applications that can scale might be useful even with small EPC sizes. For example: NFV, secure databases, blockchain, etc. These usages can use multiple VCA cards to scale out as more resources are needed overcoming the limitation of a single small EPC.

At least some examples may require drivers for supporting the execution of the portion of the one or more software applications on the memory devices.

Examples may provide an apparatus for fast memory sharing over PCIe bus between enclaves on SGX enabled accelerator cards (e.g. memory devices) and a host CPU (e.g. a host computer device).

In some systems, security sensitive applications might not be able to run in the cloud with high security guarantees. Examples may enable a broad class of security critical applications to be able to run in an adversarial cloud environment using SGX enabled Intel® VCA accelerator cards.

Here is a list of such applications that may immediately benefit from the examples:
  Blockchain based applications
  NFV based applications
  In-mem DB and object stores
  Key stores, key managers and soft HSMs (Hardware security Module)

Here we show what type of cloud applications (e.g. the one or more software applications) can now run securely and with higher trust inside an adversarial cloud/datacenter environment and also discuss all such application in details on how they can run more securely.

These applications may be very important cloud based SGX applications that can now run in an adversarial cloud and datacenter environment with high security and trust. CSPs (Cloud Service Providers) may offer secure versions of these services that customers can now attest, trust and use with higher confidence.

Blockchain based applications (smart contracts, distributed ledger, etc.) may use the SGX based secure execution environment provided by an Intel® VCA (Visual Compute Accelerator) card (e.g. the one or more memory devices) and the computer system to provide high performance and scalable crypto processing platform for the application. This way any Blockchain application may get a trusted and attested processing outcome that comes with confidentiality and integrity guarantees.

NFV (Network Function Virtualization) applications like intrusion detection systems, routers, firewalls, VPN (Virtual Private Network) gateways, DNS (Domain Name System) servers can immensely benefit from the SGX enabled Intel® VCA accelerator cards. Many NFV applications contain sensitive data and execution functions like hash tables, encryption keys, state machines, policy managers, filters etc. and protection of these sensitive parts of the application is extremely critical for cloud deployment of these applications. Examples may show that such applications can run on the SGX enabled VCA cards with high performance.

Key managers and soft HSMs (Hardware Security Module) are very popular in the cloud as they are cost effective alternatives to hard HSMs. However, soft HSM solutions may be vulnerable to root privilege attacks where a compromised OS (Operating System) or the VMM (Virtual Machine Monitor) can look into the memory of the soft HSM application and read all the secrets and keys out. With SGX enabled Intel® VCA accelerator cards (e.g. the computer system), the key managers and soft HSMs may run and keep all secrets and sensitive data safe (e.g. within the cryptographically protected memory) with high security guarantees and protect them from all malicious and privileged components on the platform.

Cloud In-memory databases and object stores is another class of application that are vulnerable to attacks from privileged malware as well as compromised OS and VMMs. These databases and object stores store huge amounts of data, mostly sensitive, belonging to different applications and users. This may be solved if the values are stored encrypted (with integrity, e.g. within the cryptographically protected memory) in untrusted memory and only decrypted inside an SGX enclave on the platform. SGX based Intel® VCA accelerator cards within the computer system may provide high performance and scalable crypto processing on current cloud platforms and In-memory databases and object stores can now run on these platforms with higher security and trust.

Examples may provide an apparatus for fast memory sharing over PCIe bus between enclaves on SGX enabled accelerator cards (e.g. memory devices) and a host CPU (e.g. a host computer device).

In some systems, cloud service providers and datacenters might not be able to run/execute SGX (Software Guard eXtensions) enabled applications since SGX technology might not be available on current generation or next generation Xeon® E5 platforms. Although the SGX feature may be available on the Xeon® E3 CPU, E3 class CPUs might not be popular in the cloud environment as it considered more of a workstation CPU than a server CPU.

Therefore, SGX applications may have limited capability running on E3 platforms and might not be able to take full advantage of all the features of the E5 platform.

Examples may enable running high performance SGX enabled applications on current and future generation Xeon® E5 servers with very low performance overhead, e.g. using SGX enabled accelerator cards (e.g. Intel® VCA2, Visual Compute Accelerator 2).

In some systems, DMA access (Direct Memory Access) over PCI (Peripheral Component Interconnect) may suffer from PCIe (PCI express) latencies and secondly, memory access over PCIe might be even less performant as there is no cache coherency happening between CPUs (Central Processing Units) on either side of the bus running the applications.

Examples may use split mode data access design where shared memory over PCIe is separately mapped for remote read and write accesses with different cache semantics (write through may offer great read caching and write combine may offer great write caching and highly efficient burst transfer over PCIe).

The accessing entity might also maintain a local write back mapped data structure. This data structure may be updated along with any remote writes and referred back instead of remote read. Moreover, with this mechanism on both sides, a full duplex memory sharing channel between the host application (e.g. the software application being executed by the host computer device) and the SGX enclave on the card (e.g. the memory device) may be achieved.

In some systems, server class SGX applications might not be run in a cloud environment as a true server class platform might not be available in the market today that has SGX on it.

Examples may enable a large class of SGX applications to be able to run on a full scale server grade platform in a cloud or a datacenter, and may thereby be able to take full advantage of all the powerful features of Xeon® E5/E7 (as host computer device) as well as run sensitive portions of the applications on trusted SGX enabled accelerators (as memory devices) in a high performant manner.

Moreover, because of the high performance shared memory access semantics, the application might easily scale up using more SGX cores and sockets on accelerator cards (or use more accelerator cards) to keep up with the performance requirements from a large number of threads on the E5 side.

Figure 15:
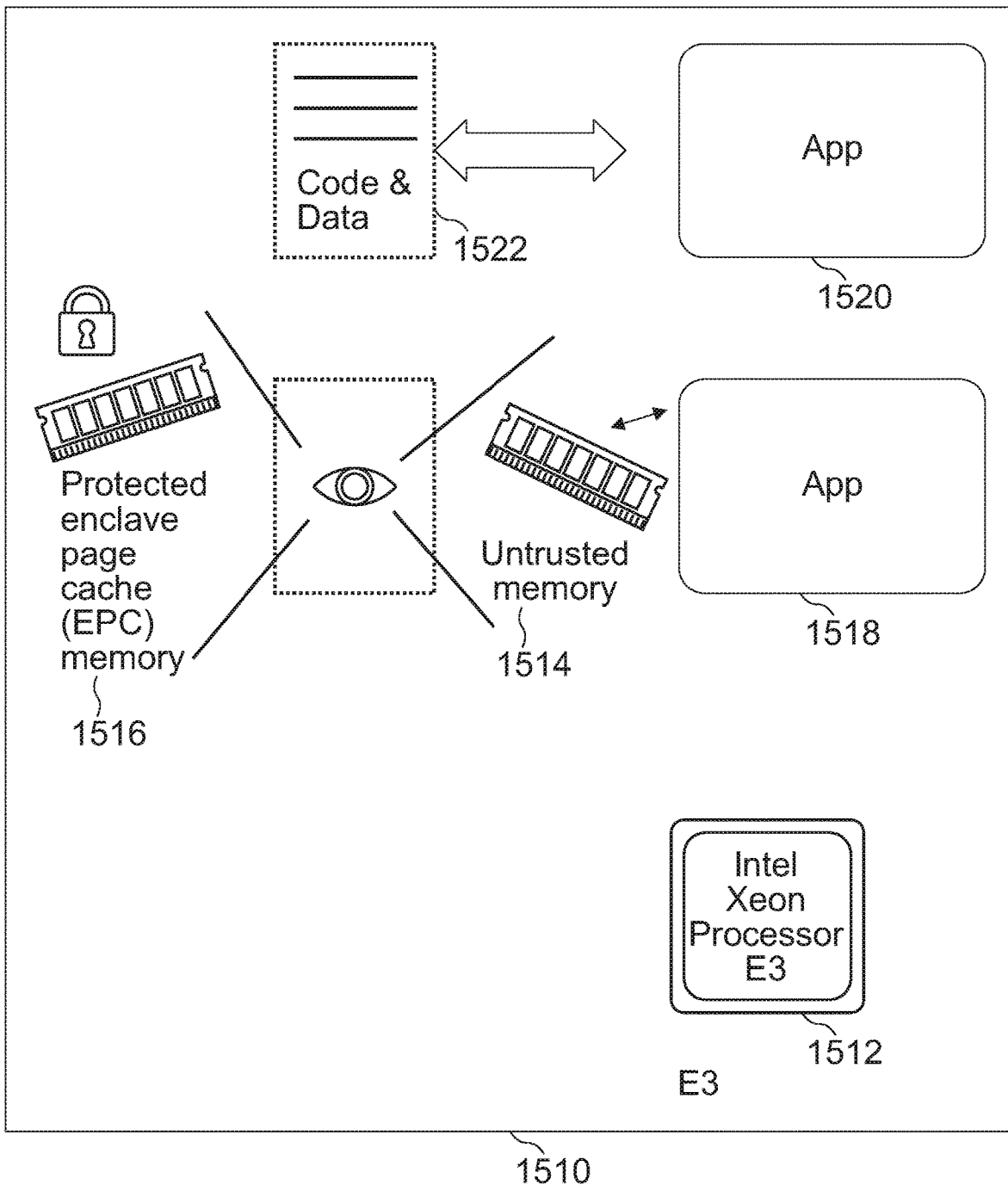
FIG. 15 shows a schematic diagram of Software Guard Extensions of a Xeon® E3 processor.

FIG. 15 shows a schematic diagram of Software Guard Extensions of a Xeon® E3 processor. FIG. 15 shows a computer system 1510 comprising a Xeon® E3 processor 1512, untrusted memory 1512 and protected enclave page cache (EPC) memory 1516. Applications 1518; 1520 may be executed with (individual) access to code and data 1522. Applications may interact with enclaves through APIs defined by the enclave write. Code running in an enclave may be able to access all of its memory, plus the application's untrusted memory. Such a computer system may be difficult to integrate into a CSP/data canter, might be single package only, might only comprise a small number of cores, might have access to a limited amount of random access memory (RAM) and to a small cache and to limited input/output capability.

Figure 16:
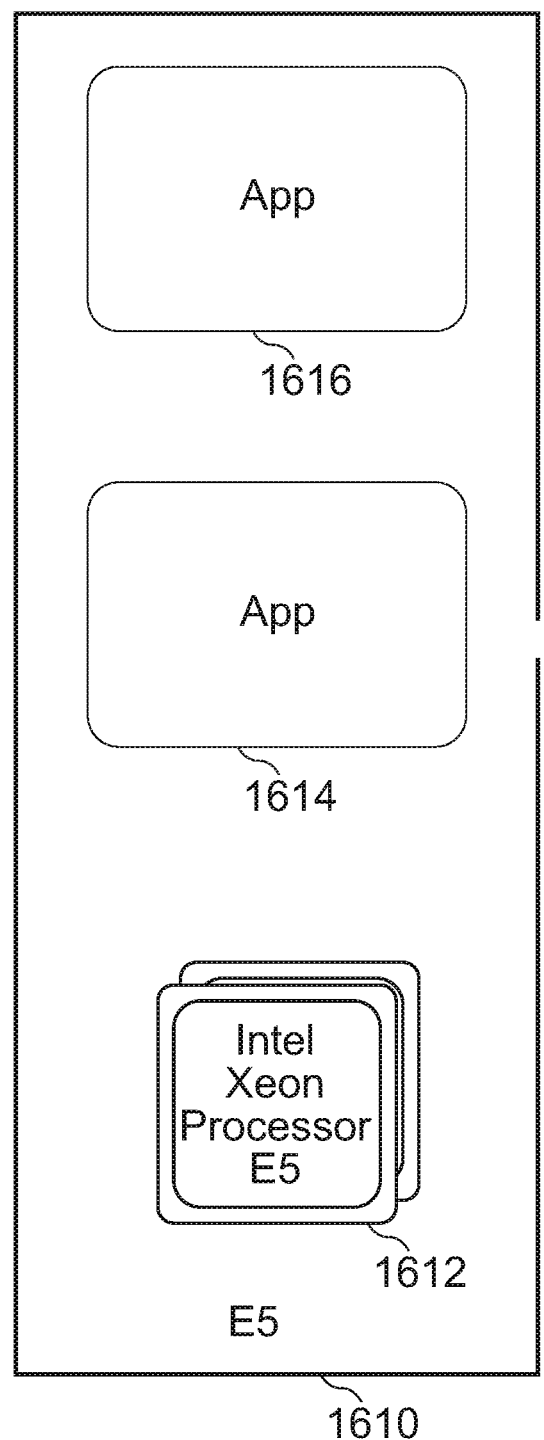
FIG. 16 shows an overview of the Xeon® E5 platform.

FIG. 16 shows an overview of the Xeon® E5 platform. FIG. 16 shows a computer system 1610 comprising one or more Xeon® E5 processors 1612, configured to execute applications 1614 and 1616. Such a computer system might be already integrated into a CSP/data center, might comprise multi package capability, may comprise a large number of cores, access to multiple terabytes of dynamic RAM, a large cache and all server input/output capabilities.

Example A1 relates to a computer system for providing access to cryptographically protected volatile memory for one or more software applications. The computer system comprises a host computer device configured to execute one or more software applications. The computer system comprises one or more memory extension devices (or one or more memory devices) configured to cryptographically protect volatile memory of the one or more memory extension devices. The one or more memory extension devices are configured to provide access to the cryptographically protected volatile memory for the host computer device. The host computer device is configured to provide one or more memory windows for access to the cryptographically protected volatile memory of the one or more memory extension devices to the one or more software applications. The host computer device is configured to implement read and/or write access to the cryptographically protected volatile memory for the one or more software applications.

Example A2 may include the subject matter of Example A1, wherein the host computer device and the one or more memory extension devices are configured to communicate via a Peripheral Component Interconnect Express interface of the host computer device.

Example A3 may include the subject matter of one of the previous examples, wherein the one or more memory access devices are configured to protect the cryptographically protected volatile memory based on Software Guard Extensions.

Example A4 may include the subject matter of one of the previous examples, wherein the host computer device is configured to provide one or more direct memory access windows for access to the cryptographically protected volatile memory of the one or more memory extension devices to the one or more software applications.

Example A5 may include the subject matter of one of the previous examples, wherein the host computer device is configured to implement the write access to the cryptographically protected volatile memory based on a write combine policy.

Example A6 may include the subject matter of one of the previous examples, wherein the host computer device is configured to implement the read access to the cryptographically protected volatile memory based on a write through policy.

Example A7 may include the subject matter of one of the previous examples, wherein the host computer device is configured to provide an application-programming interface for access to the cryptographically protected volatile memory to the one or more software applications.

Example A8 may include the subject matter of one of the previous examples, wherein the host computer device is configured to provide transparent memory access to the cryptographically protected volatile memory to the one or more software applications.

Example A9 may include the subject matter of one of the previous examples, wherein the host computer device is configured to provide a local cache of data written to the cryptographically protected volatile memory to the one or more software applications.

Example A10 may include the subject matter of one of the previous examples, wherein the one or more memory windows comprise a first memory window and a second memory window, wherein the first memory window is associated with a first software application of the one or more software applications and wherein the second memory window is associated with a second software application of the one or more software applications, and wherein the first software application is blocked from access to the second memory window and wherein the second software application is blocked from access to the first memory window.

Example A11 may include the subject matter of one of the previous examples, wherein the host computer device comprises a general-purpose processor of a first processor type and wherein memory extension devices of the one or more memory extension devices comprises general-purpose processors of a second processor type, and wherein the first processor type is incapable of cryptographically securing the cryptographically protected volatile memory and wherein the second processor type is capable of cryptographically securing the cryptographically protected volatile memory.

Example A12 may include the subject matter of one of the previous examples, wherein the host computer device is configured to implement remote read and/or remote write access to the cryptographically protected volatile memory for the one or more software applications.

Example A13 may include the subject matter of one of the previous examples, wherein the host computer device is configured to provide the one or more memory windows with separate read and write access, wherein a cache semantic of the read access is different from a cache semantic of the write access.

Example A14 may include the subject matter of one of the previous examples, wherein the one or more memory extension devices are configured to provide write access to the cryptographically protected volatile memory based on a write combine policy.

Example A15 may include the subject matter of one of the previous examples, wherein the one or more memory extension devices are configured to provide read access to the cryptographically protected volatile memory based on a write through policy.

Example A16 may include the subject matter of one of the previous examples, wherein the one or more memory extension devices are configured to provide one or more software guard extension enclaves for the one or more applications, wherein the one or more software guard extension enclaves comprise the cryptographically protected volatile memory.

Example A17 relates to a host computer device for a computer system, the computer system further comprising one or more memory extension devices (or memory devices) configured to provide access to cryptographically protected volatile memory for the host computer device. The host computer device comprises an interface for communicating with the one or more memory extension devices. The host computer device further comprises a control module configured to execute one or more software applications. The control module is configured to provide one or more memory windows for access to the cryptographically protected volatile memory of the one or more memory extension devices to the one or more software applications. The control module is configured to implement read and/or write access to the cryptographically protected volatile memory for the one or more software applications.

Example A18 may include the subject matter of Example A17, wherein the control module is based on a processor incapable of cryptographically securing the cryptographically protected volatile memory.

Example A19 relates to a memory extension device (or memory device) for a computer system, the computer system further comprising a host computer device configured to execute one or more software applications. The memory extension device comprises an interface for communicating with the host computer device. The memory extension device comprises volatile memory. The memory extension device comprises a control module configured to cryptographically protect the volatile memory, and provide access to the cryptographically protected volatile memory for the one or more software applications of the host computer device via the interface.

Example A20 may include the subject matter of Example A19, wherein the control module comprises a general-purpose processor.

Example A21 relates to a method for providing access to cryptographically protected volatile memory for one or more software applications. The method comprises Executing one or more software applications on a host computer device. The method comprises Cryptographically protecting volatile memory of one or more memory extension devices (or memory devices). The method comprises Providing access to the cryptographically protected volatile memory for the host computer device. The method comprises Providing one or more memory windows for access to the cryptographically protected volatile memory of the one or more memory extension devices to the one or more software applications.

The method comprises Implementing read and/or write access to the cryptographically protected volatile memory for the one or more software applications.

Example A22 relates to a method for a host computer device for a computer system, the computer system further comprising one or more memory extension devices (or memory devices) configured to provide access to cryptographically protected volatile memory for the host computer device. The method comprises Executing one or more software applications. The method comprises Providing one or more memory windows for access to the cryptographically protected volatile memory of the one or more memory extension devices to the one or more software applications. The method comprises Implementing read and/or write access to the cryptographically protected volatile memory for the one or more software applications.

Example A23 relates to a method for a memory extension device (or memory device) for a computer system, the computer system further comprising a host computer device configured to execute one or more software applications. The memory extension device comprises Cryptographically protecting volatile memory of the memory extension device. The method comprises Providing access to the cryptographically protected volatile memory for the one or more software applications of the host computer device.

Example A24 relates to a non-transitory computer readable medium containing computer code that, when executed, performs the method of any of the previous examples.

The aspects and features mentioned and described together with one or more of the previously detailed examples and figures, may as well be combined with one or more of the other examples in order to replace a like feature of the other example or in order to additionally introduce the feature to the other example.

Examples may relate to enabling specific scalable and secure cloud applications based on SGX (Software Guard eXtensions) enabled accelerator hosted inside multi socket platforms.

Figure 17:
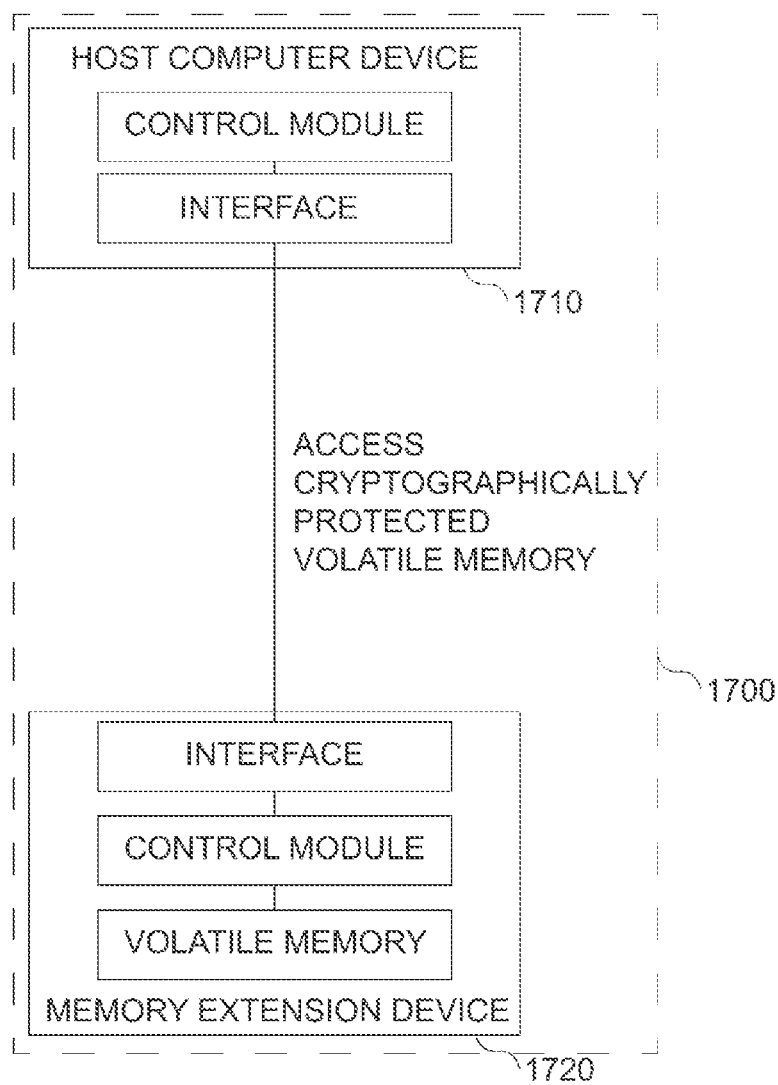
FIG. 17 shows a block diagram of a computer system comprising a host computer device and one or more memory devices.

FIG. 17 shows a block diagram of a computer system 1700 (e.g. the computer system 100 introduced in connection with FIGS. 1 to 3) comprising a host computer device 1710 (e.g. the host computer device 20 introduced in connection with FIGS. 1a and 1b) and one or more memory extension devices (or memory devices) 1720 (e.g. the one or more memory devices 30 introduced in connection with FIGS. 1a to 2c). The computer system 100 is suitable for providing access to cryptographically protected volatile memory to one or more software applications. The host computer device 1710 is configured to execute one or more software applications. The one or more memory extension devices 1720 are configured to cryptographically protected volatile memory of the one or more memory extension devices, and to provide access to the cryptographically protected volatile memory for the host computer device. The host computer device 1710 is configured to provide one or more memory windows for access to the cryptographically protected volatile memory of the one or more memory extension devices to the one or more software applications. The host computer device 1710 is configured to implement read and/or write access to the cryptographically protected volatile memory for the one or more software applications.

In some systems, security sensitive applications might not be able to run in the cloud with high security guarantees. Examples may enable a broad class of security critical applications to be able to run in an adversarial cloud environment using SGX enabled Intel® VCA accelerator cards.

Here is a list of such applications that may immediately benefit from the inventions:
Blockchain based applications
NFV based applications
In-mem DB and object stores
Key stores, key managers and soft HSMs (Hardware security Module)

Here we show what type of cloud applications (e.g. the one or more software applications) can now run securely and with higher trust inside an adversarial cloud/datacenter environment and also discuss all such application in details on how they can run more securely.

These applications may be very important cloud based SGX applications that can now run in an adversarial cloud and datacenter environment with high security and trust. CSPs (Cloud Service Providers) may offer secure versions of these services that customers can now attest, trust and use with higher confidence.

Blockchain based applications (smart contracts, distributed ledger, etc.) may use the SGX based secure execution environment provided by an Intel® VCA (Visual Compute Accelerator) card (e.g. the one or more memory devices) and the computer system to provide high performance and scalable crypto processing platform for the application. This way any Blockchain application may get a trusted and attested processing outcome that comes with confidentiality and integrity guarantees.

NFV (Network Function Virtualization) applications like intrusion detection systems, routers, firewalls, VPN (Virtual Private Network) gateways, DNS (Domain Name System) servers can immensely benefit from the SGX enabled Intel® VCA accelerator cards. Many NFV applications contain sensitive data and execution functions like hash tables, encryption keys, state machines, policy managers, filters etc. and protection of these sensitive parts of the application is extremely critical for cloud deployment of these applications. Examples may show that such applications can run on the SGX enabled VCA cards with high performance.

Key managers and soft HSMs (Hardware Security Module) are very popular in the cloud as they are cost effective alternatives to hard HSMs. However, soft HSM solutions may be vulnerable to root privilege attacks where a compromised OS (Operating System) or the VMM (Virtual Machine Monitor) can look into the memory of the soft HSM application and read all the secrets and keys out. With SGX enabled Intel® VCA accelerator cards (e.g. the computer system), the key managers and soft HSMs may run and keep all secrets and sensitive data safe (e.g. within the cryptographically protected memory) with high security guarantees and protect them from all malicious and privileged components on the platform.

Cloud In-memory databases and object stores is another class of application that are vulnerable to attacks from privileged malware as well as compromised OS and VMMs. These databases and object stores store huge amounts of data, mostly sensitive, belonging to different applications and users. This may be solved if the values are stored encrypted (with integrity, e.g. within the cryptographically protected memory) in untrusted memory and only decrypted inside an SGX enclave on the platform. SGX based Intel® VCA accelerator cards within the computer system may provide high performance and scalable crypto processing on current cloud platforms and In-memory databases and object stores can now run on these platforms with higher security and trust.

Example B1 relates to a computer system for providing access to cryptographically protected volatile memory for one or more software applications. The computer system comprises a host computer device configured to execute one or more software applications. The computer system comprises one or more memory extension devices (or memory devices) configured to cryptographically protect volatile memory of the one or more memory extension devices. The one or more memory extension devices are configured to provide access to the cryptographically protected volatile memory for the host computer device. The host computer device is configured to provide one or more memory windows for access to the cryptographically protected volatile memory of the one or more memory extension devices to the one or more software applications. The host computer device is configured to implement read and/or write access to the cryptographically protected volatile memory for the one or more software applications.

Example B2 may include the subject matter of Example B1, wherein the one or more software applications comprise one or more blockchain-based software applications.

Example B3 may include the subject matter of one of the previous examples, wherein the one or more software applications comprise one or more network function virtualization software applications.

Example B4 may include the subject matter of one of the previous examples, wherein the one or more software applications comprise one or more in-memory database software applications or one or more object stores of in-memory databases.

Example B5 may include the subject matter of one of the previous examples, wherein the one or more software applications comprise one or more elements of the group of a key store software application, a key manager software application or a soft hardware security module software application.

Example B6 may include the subject matter of one of the previous examples, wherein the cryptographically protected volatile memory comprises one or more evolved page caches for the one or more software applications.

Example B7 may include the subject matter of one of the previous examples, wherein the one or more memory extension devices are configured to provide one or more evolved page caches for the one or more software applications.

Example B8 may include the subject matter of one of the previous examples, wherein the host computer device is configured to use the cryptographically protected volatile memory to at least partially execute the one or more software applications.

Example B9 may include the subject matter of one of the previous examples, wherein the host computer device is configured to store code and data of the one or more software applications within the cryptographically protected volatile memory.

Example B10 may include the subject matter of one of the previous examples, wherein the host computer device and the one or more memory extension devices are configured to communicate via a Peripheral Component Interconnect Express interface of the host computer device.

Example B11 may include the subject matter of one of the previous examples, wherein the one or more memory access devices are configured to secure the cryptographically protected volatile memory based on Software Guard Extensions.

Example B12 may include the subject matter of one of the previous examples, wherein the host computer device is configured to provide one or more direct memory access windows for access to the cryptographically protected volatile memory of the one or more memory extension devices to the one or more software applications.

Example B13 may include the subject matter of one of the previous examples, wherein the host computer device is configured to implement the write access to the cryptographically protected volatile memory based on a write combine policy.

Example B14 may include the subject matter of one of the previous examples, wherein the host computer device is configured to implement the read access to the cryptographically protected volatile memory based on a write through policy.

Example B15 may include the subject matter of one of the previous examples, wherein the host computer device is configured to provide an application-programming interface for access to the cryptographically protected volatile memory to the one or more software applications.

Example B16 may include the subject matter of one of the previous examples, wherein the host computer device is configured to provide transparent memory access to the cryptographically protected volatile memory to the one or more software applications.

Example B17 may include the subject matter of one of the previous examples, wherein the host computer device is configured to provide a local cache of data written to the cryptographically protected volatile memory to the one or more software applications.

Example B18 may include the subject matter of one of the previous examples, wherein the one or more memory windows comprise a first memory window and a second memory window, wherein the first memory window is associated with a first software application of the one or more software applications and wherein the second memory window is associated with a second software application of the one or more software applications, and wherein the first software application is blocked from access to the second memory window and wherein the second software application is blocked from access to the first memory window.

Example B19 may include the subject matter of one of the previous examples, wherein the host computer device comprises a general-purpose processor of a first processor type and wherein memory extension devices of the one or more memory extension devices comprises general-purpose processors of a second processor type, and wherein the first processor type is incapable of cryptographically securing the cryptographically protected volatile memory and wherein the second processor type is capable of cryptographically securing the cryptographically protected volatile memory.

Example B20 may include the subject matter of one of the previous examples, wherein the host computer device is configured to implement remote read and/or remote write access to the cryptographically protected volatile memory for the one or more software applications.

Example B21 may include the subject matter of one of the previous examples, wherein the host computer device is configured to provide the one or more memory windows with separate read and write access, wherein a cache semantic of the read access is different from a cache semantic of the write access.

Example B22 may include the subject matter of one of the previous examples, wherein the one or more memory extension devices are configured to provide write access to the cryptographically protected volatile memory based on a write combine policy.

Example B23 may include the subject matter of one of the previous examples, wherein the one or more memory extension devices are configured to provide read access to the cryptographically protected volatile memory based on a write through policy.

Example B24 may include the subject matter of one of the previous examples, wherein the one or more memory extension devices are configured to provide one or more software guard extension enclaves for the one or more applications, wherein the one or more software guard extension enclaves comprise the cryptographically protected volatile memory.

Example B25 relates to a host computer device for a computer system, the computer system further comprising one or more memory extension devices (or memory devices) configured to provide access to cryptographically protected volatile memory for the host computer device. The host computer device comprises an interface for communicating with the one or more memory extension devices. The host computer device further comprises a control module configured to execute one or more software applications. The control module is configured to provide one or more memory windows for access to the cryptographically protected volatile memory of the one or more memory extension devices to the one or more software applications. The control module is configured to implement read and/or write access to the cryptographically protected volatile memory for the one or more software applications.

Example B26 may include the subject matter of Example B25, wherein the control module is based on a processor incapable of cryptographically securing the cryptographically protected volatile memory.

Example B27 relates to a memory extension device (or memory device) for a computer system, the computer system further comprising a host computer device configured to execute one or more software applications. The memory extension device comprises an interface for communicating with the host computer device. The memory extension device comprises volatile memory. The memory extension device comprises a control module configured to cryptographically protect the volatile memory, and provide access to the cryptographically protected volatile memory for the one or more software applications of the host computer device via the interface.

Example B28 may include the subject matter of Example B19, wherein the control module comprises a general-purpose processor.

Example B29 relates to a method for providing access to cryptographically protected volatile memory for one or more software applications. The method comprises Executing one or more software applications on a host computer device. The method comprises Cryptographically protecting volatile memory of one or more memory extension devices (or memory devices). The method comprises Providing access to the cryptographically protected volatile memory for the host computer device. The method comprises Providing one or more memory windows for access to the cryptographically protected volatile memory of the one or more memory extension devices to the one or more software applications. The method comprises Implementing read and/or write access to the cryptographically protected volatile memory for the one or more software applications.

Example B30 relates to a method for a host computer device for a computer system, the computer system further comprising one or more memory extension devices (or memory devices) configured to provide access to cryptographically protected volatile memory for the host computer device. The method comprises Executing one or more software applications. The method comprises Providing one or more memory windows for access to the cryptographically protected volatile memory of the one or more memory extension devices to the one or more software applications. The method comprises Implementing read and/or write access to the cryptographically protected volatile memory for the one or more software applications.

Example B31 relates to a method for a memory extension device (or memory device) for a computer system, the computer system further comprising a host computer device configured to execute one or more software applications. The memory extension device comprises Cryptographically protecting volatile memory of the memory extension device. The method comprises Providing access to the cryptographically protected volatile memory for the one or more software applications of the host computer device.

Example B32 relates to a non-transitory computer readable medium containing computer code that, when executed, performs the method of any of the previous examples.

The aspects and features mentioned and described together with one or more of the previously detailed examples and figures, may as well be combined with one or more of the other examples in order to replace a like feature of the other example or in order to additionally introduce the feature to the other example.

Examples may relate to an apparatus to host SGX (Software Guard eXtensions) enabled accelerators (e.g. memory (extension) devices) in a datacenter.

In some systems, cloud service providers and datacenters might not be able to run SGX enabled applications since SGX technology might not available be on current generation or next generation Xeon® E5 platforms. Although the SGX feature is available on the Xeon® E3 platforms, cloud and datacenter operators might not have the infrastructure to host E3 platforms separately. They may instead prefer to host dual socket E5 platforms in the same real estate and power budget.

This basic idea of examples may be to host SGX enabled Xeon® E3 platforms (e.g. as memory extension devices) in an existing cloud and datacenter infrastructure (e.g. a computer system device) without the need for additional real estate, rack or management stack.

Examples may be based on using SGX enabled VCA (Visual Compute Accelerator) accelerator cards (e.g. as one or more memory (extension) devices) in a Xeon® E5 centric datacenter (e.g. computer system) or cloud environment. Each SGX enabled VCA accelerator card may basically comprise or be 3 independent SGX enabled Xeon® E3 platforms (e.g. three memory extension devices) that can be exposed on the network as 3 independent physical hosts without requiring separate infrastructure or rack management stack.

Examples may enable Xeon® E3 class of SGX applications to be able to run in a cloud and datacenter environment and CSPs (Cloud Service Providers) may offer SGX hosts to customers to run their secure applications without any significant changes in the CSP's infrastructure. FIG. 14c shows a block diagram of a computer system with a host computer device and three memory extension devices. FIG. 7b shows a schematic diagram of a computer system with a host computer device and three memory extension devices.

Example C1 relates to a computer system for providing access to cryptographically protected volatile memory for one or more software applications. The computer system comprises a host computer device configured to execute one or more software applications. The computer system comprises one or more memory extension devices (or memory devices) configured to cryptographically protect volatile memory of the one or more memory extension devices. The one or more memory extension devices are configured to provide access to the cryptographically protected volatile memory for the host computer device. The host computer device is configured to provide one or more memory windows for access to the cryptographically protected volatile memory of the one or more memory extension devices to the one or more software applications. The host computer device is configured to implement read and/or write access to the cryptographically protected volatile memory for the one or more software applications.

Example C2 may include the subject matter of Example C1, wherein interfaces of the host computer device and of the one or more memory extension devices are configured to communicate via a local interconnect of the host computer device.

Example C3 may include the subject matter of one of the previous examples, wherein the host computer device and the one or more memory extension devices are configured to communicate via a Peripheral Component Interconnect Express interface of the host computer device.

Example C4 may include the subject matter of Example C3, wherein the one or more memory extension devices are arranged on a single Peripheral Component Interconnect Express card.

Example C5 may include the subject matter of Example C4, wherein the one or more memory extension devices are two or more memory extension devices.

Example C6 may include the subject matter of one of the previous examples, wherein the host computer device comprises a network connection interface for communicating via a local network connection, wherein the one or more memory extension devices are configured to communicate via the local network connection via the host computer device.

Example C7 may include the subject matter of Example C6, wherein the one or more memory extension devices are exposed as individual devices via the local network connection.

Example C8 may include the subject matter of one of the previous examples, wherein the one or more memory extension devices comprise general-purpose processors.

Example C9 may include the subject matter of one of the previous examples, wherein the host computer device comprises a general-purpose processor of a first processor type and wherein memory extension devices of the one or more memory extension devices comprises general-purpose processors of a second processor type, and wherein the first processor type is incapable of cryptographically securing the cryptographically protected volatile memory and wherein the second processor type is capable of cryptographically securing the cryptographically protected volatile memory.

Example C10 may include the subject matter of one of the previous examples, wherein the one or more memory access devices are configured to protect the cryptographically protected volatile memory based on Software Guard Extensions.

Example C11 may include the subject matter of one of the previous examples, wherein the host computer device is configured to implement write access to the cryptographically protected volatile memory based on a write combine policy.

Example C12 may include the subject matter of one of the previous examples, wherein the host computer device is configured to implement read access to the cryptographically protected volatile memory based on a write through policy.

Example C13 may include the subject matter of one of the previous examples, wherein the host computer device is configured to provide a local cache of data written to the cryptographically protected volatile memory to the one or more software applications.

Example C14 may include the subject matter of one of the previous examples, wherein the one or more memory windows comprise a first memory window and a second memory window, wherein the first memory window is associated with a first software application of the one or more software applications and wherein the second memory window is associated with a second software application of the one or more software applications, and wherein the first software application is blocked from access to the second memory window and wherein the second software application is blocked from access to the first memory window.

Example C15 may include the subject matter of one of the previous examples, wherein the host computer device comprises a general-purpose processor of a first processor type and wherein memory extension devices of the one or more memory extension devices comprises general-purpose processors of a second processor type, and wherein the first processor type is incapable of cryptographically securing the cryptographically protected volatile memory and wherein the second processor type is capable of cryptographically securing the cryptographically protected volatile memory.

Example C16 may include the subject matter of one of the previous examples, wherein the one or more memory extension devices are configured to provide one or more software guard extension enclaves for the one or more applications, wherein the one or more software guard extension enclaves comprise the cryptographically protected volatile memory.

Example C17 relates to a host computer device for a computer system, the computer system further comprising one or more memory extension devices (or memory devices) configured to provide access to cryptographically protected volatile memory for the host computer device. The host computer device comprises an interface for communicating with the one or more memory extension devices. The host computer device further comprises a control module configured to execute one or more software applications. The control module is configured to provide one or more memory windows for access to the cryptographically protected volatile memory of the one or more memory extension devices to the one or more software applications. The control module is configured to implement read and/or write access to the cryptographically protected volatile memory for the one or more software applications.

Example C18 may include the subject matter of Example C17, wherein the control module is based on a processor incapable of cryptographically securing the cryptographically protected volatile memory.

Example C19 relates to a memory extension device (or memory device) for a computer system, the computer system further comprising a host computer device configured to execute one or more software applications. The memory extension device comprises an interface for communicating with the host computer device. The memory extension device comprises volatile memory. The memory extension device comprises a control module configured to cryptographically protect the volatile memory, and provide access to the cryptographically protected volatile memory for the one or more software applications of the host computer device via the interface.

Example C20 may include the subject matter of Example C19, wherein the control module comprises a general-purpose processor.

Example C21 relates to a method for providing access to cryptographically protected volatile memory for one or more software applications. The method comprises Executing one or more software applications on a host computer device. The method comprises Cryptographically protecting volatile memory of one or more memory extension devices (or memory devices).

The method comprises Providing access to the cryptographically protected volatile memory for the host computer device. The method comprises Providing one or more memory windows for access to the cryptographically protected volatile memory of the one or more memory extension devices to the one or more software applications. The method comprises Implementing read and/or write access to the cryptographically protected volatile memory for the one or more software applications.

Example C22 relates to a method for a host computer device for a computer system, the computer system further comprising one or more memory extension devices (or memory devices) configured to provide access to cryptographically protected volatile memory for the host computer device. The method comprises Executing one or more software applications. The method comprises Providing one or more memory windows for access to the cryptographically protected volatile memory of the one or more memory extension devices to the one or more software applications. The method comprises Implementing read and/or write access to the cryptographically protected volatile memory for the one or more software applications.

Example C23 relates to a method for a memory extension device (or memory device) for a computer system, the computer system further comprising a host computer device configured to execute one or more software applications. The memory extension device comprises Cryptographically protecting volatile memory of the memory extension device. The method comprises Providing access to the cryptographically protected volatile memory for the one or more software applications of the host computer device.

Example C24 relates to a non-transitory computer readable medium containing computer code that, when executed, performs the method of any of the previous examples.

The examples as described herein may be summarized as follows:

Example 1 relates to a computer system 100 for executing one or more software applications. The computer system 100 includes a host computer device 20 configured to execute the one or more software applications. The computer system includes one or more memory devices 30 configured to cryptographically protect volatile memory of the one or more memory devices 30, and to provide access to the cryptographically protected volatile memory for the one or more software applications. The host computer device 20 is configured to execute the one or more software applications by executing a portion of the one or more software applications associated with the cryptographically protected volatile memory using a processor of the one or more memory devices 30.

In Example 2, the subject matter of Example 1 or any of the Examples described herein may further include, that software applications of the one or more software applications include a first software application portion and a second software application portion, wherein the first software application portion is associated with volatile memory of the host computer device 20 and wherein the second software application portion is associated with the cryptographically protected volatile memory of the one or more memory devices 30, wherein the host computer device 20 is configured to execute the second software application portion using the processor of the memory device including the cryptographically protected volatile memory associated with the second software application portion.

In Example 3, the subject matter of one of the Examples 1 or 2 or any of the Examples described herein may further include, that the host computer device 20 is configured to provide data of the one or more software applications to the one or more memory devices 30 by writing the data to the one or more memory devices 30 using direct memory access. Alternatively or additionally, the host one or more memory devices 30 are configured to provide data of the one or more software applications to the host computer device 20 by writing the data to the host computer device 20 using direct memory access.

In Example 4, the subject matter of one of the Examples 1 to 3 or any of the Examples described herein may further include, that the host computer device 20 is configured to provide further data of the one or more software applications to the one or more memory devices 30 by providing a direct memory access address of the further data to the one or more memory devices 30. Alternatively or additionally, the one or more memory devices 30 are configured to provide further data of the one or more software applications to the host computer device 20 by providing a direct memory access address of the further data to the host computer device 20.

In Example 5, the subject matter of Example 4 or any of the Examples described herein may further include, that the host computer device 20 is configured to provide the further data of the one or more software applications to the one or more memory devices 30 by providing the direct memory access address of the further data to the one or more memory devices 30 via an asynchronous buffer. Alternatively or additionally, the one or more memory devices 30 are configured to provide the further data of the one or more software applications to the host computer device 20 by providing the direct memory access address of the further data to the host computer device 20 via an asynchronous buffer.

In Example 4, the subject matter of one of the Examples 1 to 3 or any of the Examples described herein may further include, that the host computer device 20 is configured to implement read and/or write access to volatile memory of the one or more memory devices associated with the one or more software applications.

In Example 7, the subject matter of Example 6 or any of the Examples described herein may further include, that the host computer device 20 is configured to implement the write access to the volatile memory of the one or more memory devices associated with the one or more software applications based on a write combine cache policy.

In Example 8, the subject matter of one of the Examples 6 or 7 or any of the Examples described herein may further include, that the host computer device 20 is configured to implement the read access to the volatile memory of the one or more memory devices associated with the one or more software applications based on a write through cache policy.

In Example 9, the subject matter of one of the Examples 1 to 8 or any of the Examples described herein may further include, that the one or more memory devices 30 are configured to implement read and/or write access to volatile memory of the host computer device 20 for the portion of the one or more software applications being executed using the processor of the one or more memory devices 30.

In Example 10, the subject matter of Example 9 or any of the Examples described herein may further include, that the one or more memory devices 30 are configured to implement the write access to the volatile memory of the host computer device 20 based on a write combine cache policy.

In Example 11, the subject matter of one of the Examples 9 or 10 or any of the Examples described herein may further include, that the one or more memory devices 30 are configured to implement the read access to the volatile memory of the host computer device 20 based on a write through cache policy.

In Example 12, the subject matter of one of the Examples 1 to 11 or any of the Examples described herein may further include, that the host computer device 20 is configured to provide one or more memory windows for access to volatile memory of the one or more memory devices associated with the one or more software applications to a further portion of the one or more software applications executed by a processor of the host computer device 20.

In Example 13, the subject matter of Example 12 or any of the Examples described herein may further include, that the host computer device 20 is configured to provide the one or more memory windows with separate read and write access, wherein a cache semantic of the read access is different from a cache semantic of the write access.

In Example 14, the subject matter of one of the Examples 1 to 13 or any of the Examples described herein may further include, that the one or more memory devices 30 are configured to protect the cryptographically protected volatile memory based on Software Guard Extensions.

In Example 15, the subject matter of one of the Examples 1 to 14 or any of the Examples described herein may further include, that the host computer device 20 is configured to provide transparent memory access to volatile memory of the one or more memory devices associated with the one or more software applications to a further portion of the one or more software applications executed by a processor of the host computer device 20.

In Example 16, the subject matter of one of the Examples 1 to 15 or any of the Examples described herein may further include, that the host computer device 20 is configured to provide a local cache of data written to volatile memory of the one or more memory devices associated with the one or more software applications to a further portion of the one or more software applications executed by a processor of the host computer device 20.

In Example 17, the subject matter of one of the Examples 1 to 16 or any of the Examples described herein may further include, that the host computer device 20 includes a general-purpose processor of a first processor type and wherein memory devices of the one or more memory devices 30 include general-purpose processors of a second processor type, and wherein the first processor type is incapable of cryptographically securing volatile memory and wherein the second processor type is capable of cryptographically securing volatile memory.

In Example 18, the subject matter of one of the Examples 1 to 17 or any of the Examples described herein may further include, that the one or more memory devices 30 are configured to provide one or more software guard extension enclaves for the one or more applications, wherein the one or more software guard extension enclaves include the cryptographically protected volatile memory.

In Example 19, the subject matter of one of the Examples 1 to 18 or any of the Examples described herein may further include, that the host computer device 20 is configured to store code and data of the one or more software applications within volatile memory of the one or more memory devices associated with the one or more software applications.

In Example 20, the subject matter of one of the Examples 1 to 19 or any of the Examples described herein may further include, that the host computer device 20 and the one or more memory devices 30 are configured to communicate via a Peripheral Component Interconnect Express interface of the host computer device 20.

In Example 21, the subject matter of Example 20 or any of the Examples described herein may further include, that the one or more memory devices 30 are arranged on a single Peripheral Component Interconnect Express card.

In Example 22, the subject matter of one of the Examples 1 to 21 or any of the Examples described herein may further include, that the host computer device 20 includes a network connection interface for communicating via a local network connection, wherein the one or more memory devices 30 are configured to communicate via the local network connection via the host computer device 20.

In Example 23, the subject matter of Example 22 or any of the Examples described herein may further include, that the one or more memory devices 30 are exposed as individual devices via the local network connection.

Example 24 relates to a host computer device 20 for a computer system 100. The computer system 100 further includes one or more memory devices 30 configured to cryptographically protect volatile memory of the one or more memory devices 30, and to provide access to the cryptographically protected volatile memory for one or more software applications of the host computer device 20. The host computer device 20 includes an interface 22 for communicating with the one or more memory devices 30. The host computer device includes a control module 24 configured to execute the one or more software applications by executing a portion of the one or more software applications associated with the cryptographically protected volatile memory using a processor 38 of the one or more memory devices 30.

In Example 25, the subject matter of Example 24 or any of the Examples described herein may further include, that software applications of the one or more software applications include a first software application portion and a second software application portion, wherein the first software application portion is associated with volatile memory of the host computer device 20 and wherein the second software application portion is associated with the cryptographically protected volatile memory of the one or more memory devices 30, wherein the control module 24 is configured to execute the second software application portion using the processor of the memory device including the cryptographically protected volatile memory associated with the second software application portion.

In Example 26, the subject matter of one of the Examples 24 or 25 or any of the Examples described herein may further include, that the control module 24 is configured to provide data of the one or more software applications to the one or more memory devices 30 by writing the data to the one or more memory devices 30 using direct memory access.

In Example 27, the subject matter of one of the Examples 24 to 26 or any of the Examples described herein may further include, that the control module 24 is configured to provide further data of the one or more software applications to the one or more memory devices 30 by providing a direct memory access address of the further data to the one or more memory devices 30.

In Example 28, the subject matter of Example 27 or any of the Examples described herein may further include, that the control module 24 is configured to provide the further data of the one or more software applications to the one or more memory devices 30 by providing the direct memory access address of the further data to the one or more memory devices 30 via an asynchronous buffer.

In Example 29, the subject matter of one of the Examples 24 to 28 or any of the Examples described herein may further include, that the control module 24 is configured to implement read and/or write access to volatile memory of the one or more memory devices associated with the one or more software applications.

In Example 30, the subject matter of Example 24 or any of the Examples described herein may further include, that the control module 24 is configured to implement the write access to the volatile memory of the one or more memory devices associated with the one or more software applications based on a write combine cache policy.

In Example 31, the subject matter of one of the Examples 24 or 30 or any of the Examples described herein may further include, that the control module 24 is configured to implement the read access to the volatile memory of the one or more memory devices associated with the one or more software applications based on a write through cache policy.

In Example 32, the subject matter of one of the Examples 24 to 31 or any of the Examples described herein may further include, that the control module 24 is configured to provide one or more memory windows for access to volatile memory of the one or more memory devices associated with the one or more software applications to a further portion of the one or more software applications executed by a processor of the host computer device 20.

In Example 33, the subject matter of Example 32 or any of the Examples described herein may further include, that the control module 24 is configured to provide the one or more memory windows with separate read and write access, wherein a cache semantic of the read access is different from a cache semantic of the write access.

In Example 34, the subject matter of one of the Examples 24 to 33 or any of the Examples described herein may further include, that the control module 24 is configured to provide transparent memory access to volatile memory of the one or more memory devices associated with the one or more software applications to a further portion of the one or more software applications executed by a processor 26 of the host computer device 20.

In Example 35, the subject matter of one of the Examples 24 to 34 or any of the Examples described herein may further include, that the control module 24 is configured to provide a local cache of data written to volatile memory of the one or more memory devices associated with the one or more software applications to a further portion of the one or more software applications executed by a processor of the host computer device 20.

In Example 36, the subject matter of one of the Examples 24 to 35 or any of the Examples described herein may further include, that the host computer device 20 includes a general-purpose processor 26 incapable of cryptographically securing volatile memory.

In Example 37, the subject matter of one of the Examples 24 to 36 or any of the Examples described herein may further include, that the control module 24 is configured to store code and data of the one or more software applications within volatile memory of the one or more memory devices associated with the one or more software applications.

In Example 38, the subject matter of one of the Examples 24 to 37 or any of the Examples described herein may further include, that the interface 22 is configured to communicate via a Peripheral Component Interconnect Express interface of the host computer device 20 with the one or more memory devices 30.

In Example 39, the subject matter of one of the Examples 24 to 38 or any of the Examples described herein may further include, that the host computer device 20 includes a network connection interface for communicating via a local network connection, wherein the one or more memory devices 30 are exposed as individual devices via the local network connection.

Example 40 relates to a memory device 30 for a computer system 100. The computer system 100 further includes a host computer device 20 configured to execute one or more software applications. The memory device 30 includes an interface 32 for communicating with the host computer device 20. The memory device 30 includes volatile memory 34. The memory device includes a control module 36 configured to cryptographically protect the volatile memory 34, to provide access to the cryptographically protected volatile memory 34 for the one or more software applications, and to execute a portion of the one or more software applications associated with the cryptographically protected volatile memory 34 using a processor 38 of the memory device 30.

In Example 41, the subject matter of Example 40 or any of the Examples described herein may further include, that software applications of the one or more software applications include a first software application portion and a second software application portion, wherein the first software application portion is associated with volatile memory 34 of the host computer device 20 and wherein the second software application portion is associated with the cryptographically protected volatile memory 34 of the memory device 30, wherein the control module 36 is configured to execute the second software application portion.

In Example 42, the subject matter of one of the Examples 40 or 41 or any of the Examples described herein may further include, that the control module 36 is configured to provide data of the one or more software applications to the host computer device 20 by writing the data to the host computer device 20 using direct memory access.

In Example 43, the subject matter of one of the Examples 40 to 42 or any of the Examples described herein may further include, that the control module 36 is configured to provide further data of the one or more software applications to the host computer device 20 by providing a direct memory access address of the further data to the host computer device 20.

In Example 44, the subject matter of Example 43 or any of the Examples described herein may further include, that the control module 36 is configured to provide the further data of the one or more software applications to the host computer device 20 by providing the direct memory access address of the further data to the host computer device 20 via an asynchronous buffer.

In Example 45, the subject matter of one of the Examples 40 to 44 or any of the Examples described herein may further include, that the control module 36 is configured to implement read and/or write access to volatile memory 34 of the host computer device 20 for the portion of the one or more software applications being executed using the processor 38 of the memory device 30.

In Example 46, the subject matter of Example 45 or any of the Examples described herein may further include, that the control module 36 is configured to implement the write access to the volatile memory 34 of the host computer device 20 based on a write combine cache policy.

In Example 47, the subject matter of one of the Examples 45 or 46 or any of the Examples described herein may further include, that the control module 36 is configured to implement the read access to the volatile memory 34 of the host computer device 20 based on a write through cache policy.

In Example 48, the subject matter of one of the Examples 40 to 47 or any of the Examples described herein may further include, that the control module 36 is configured to protect the cryptographically protected volatile memory 34 based on Software Guard Extensions.

In Example 49, the subject matter of one of the Examples 40 to 48 or any of the Examples described herein may further include, that the processor 38 of the memory device 30 is capable of cryptographically securing volatile memory 34.

In Example 50, the subject matter of one of the Examples 40 to 49 or any of the Examples described herein may further include, that the control module 36 is configured to provide one or more software guard extension enclaves for the one or more applications, wherein the one or more software guard extension enclaves include the cryptographically protected volatile memory 34.

In Example 51, the subject matter of one of the Examples 40 to 50 or any of the Examples described herein may further include, that the interface 32 is configured to communicate with the host computer device 20 via a Peripheral Component Interconnect Express interface 32 of the host computer device 20.

In Example 52, the subject matter of one of the Examples 40 to 51 or any of the Examples described herein may further include, that the host computer device 20 includes a network connection interface 22 for communicating via a local network connection, wherein the control module 36 is configured to communicate via the local network connection via the host computer device 20.

In Example 53, the subject matter of Example 52 or any of the Examples described herein may further include, that the memory device is exposed as an individual device via the local network connection.

Example 54 relates to a Peripheral Component Interconnect Express, PCIe, card including a plurality of memory devices according to Example 41 or any of the Examples described herein.

Example 55 relates to a computer system including the host computer device 20 according to Example 24 or any of the Examples described herein.

Example 56 relates to a computer system 100 for executing one or more software applications. The computer system 100 includes a host computer apparatus 20 configured for executing the one or more software applications. The computer system includes one or more memory apparatuses 30 configured for cryptographically protecting volatile memory of the one or more memory apparatuses 30, and for providing access to the cryptographically protected volatile memory for the one or more software applications. The host computer apparatus 20 is configured for executing the one or more software applications by executing a portion of the one or more software applications associated with the cryptographically protected volatile memory using a processing means of the one or more memory apparatuses 30.

In Example 57, the subject matter of Example 56 or any of the Examples described herein may further include, that software applications of the one or more software applications include a first software application portion and a second software application portion, wherein the first software application portion is associated with volatile memory of the host computer apparatus 20 and wherein the second software application portion is associated with the cryptographically protected volatile memory of the one or more memory apparatuses 30, wherein the host computer apparatus 20 is configured for executing the second software application portion using the processing means of the memory apparatus including the cryptographically protected volatile memory associated with the second software application portion.

In Example 58, the subject matter of one of the Examples 56 or 57 or any of the Examples described herein may further include, that the host computer apparatus 20 is configured for providing data of the one or more software applications to the one or more memory apparatuses 30 by writing the data to the one or more memory apparatuses 30 using direct memory access. Alternatively or additionally, the host one or more memory apparatuses 30 are configured for providing data of the one or more software applications to the host computer apparatus 20 by writing the data to the host computer apparatus 20 using direct memory access.

In Example 59, the subject matter of one of the Examples 56 to 58 or any of the Examples described herein may further include, that the host computer apparatus 20 is configured for providing further data of the one or more software applications to the one or more memory apparatuses 30 by providing a direct memory access address of the further data to the one or more memory apparatuses 30. Alternatively or additionally, the one or more memory apparatuses 30 are configured for providing further data of the one or more software applications to the host computer apparatus 20 by providing a direct memory access address of the further data to the host computer apparatus 20.

In Example 60, the subject matter of Example 59 or any of the Examples described herein may further include, that the host computer apparatus 20 is configured for providing the further data of the one or more software applications to the one or more memory apparatuses 30 by providing the direct memory access address of the further data to the one or more memory apparatuses 30 via an asynchronous buffering means. Alternatively or additionally, the one or more memory apparatuses 30 are configured for providing the further data of the one or more software applications to the host computer apparatus 20 by providing the direct memory access address of the further data to the host computer apparatus 20 via an asynchronous buffering means.

In Example 61, the subject matter of one of the Examples 56 to 60 or any of the Examples described herein may further include, that the host computer apparatus 20 is configured for implementing read and/or write access to volatile memory of the one or more memory devices associated with the one or more software applications.

In Example 62, the subject matter of Example 61 or any of the Examples described herein may further include, that the host computer apparatus 20 is configured for implementing the write access to the volatile memory of the one or more memory devices associated with the one or more software applications based on a write combine cache policy.

In Example 63, the subject matter of one of the Examples 61 or 62 or any of the Examples described herein may further include, that the host computer apparatus 20 is configured for implementing the read access to the volatile memory of the one or more memory devices associated with the one or more software applications based on a write through cache policy.

In Example 64, the subject matter of one of the Examples 56 to 63 or any of the Examples described herein may further include, that the one or more memory apparatuses 30 are configured for implementing read and/or write access to volatile memory of the host computer apparatus 20 for the portion of the one or more software applications being executed using the processing means of the one or more memory apparatuses 30.

In Example 65, the subject matter of Example 64 or any of the Examples described herein may further include, that the one or more memory apparatuses 30 are configured for implementing the write access to the volatile memory of the host computer apparatus 20 based on a write combine cache policy.

In Example 66, the subject matter of one of the Examples 64 or 65 or any of the Examples described herein may further include, that the one or more memory apparatuses 30 are configured for implementing the read access to the volatile memory of the host computer apparatus 20 based on a write through cache policy.

In Example 67, the subject matter of one of the Examples 56 to 66 or any of the Examples described herein may further include, that the host computer apparatus 20 is configured for providing one or more memory windows for access to volatile memory of the one or more memory devices associated with the one or more software applications to a further portion of the one or more software applications executed by a processing means of the host computer apparatus 20.

In Example 68, the subject matter of Example 67 or any of the Examples described herein may further include, that the host computer apparatus 20 is configured for providing the one or more memory windows with separate read and write access, wherein a cache semantic of the read access is different from a cache semantic of the write access.

In Example 69, the subject matter of one of the Examples 56 to 68 or any of the Examples described herein may further include, that the one or more memory apparatuses 30 are configured for protecting the cryptographically protected volatile memory based on Software Guard Extensions.

In Example 70, the subject matter of one of the Examples 56 to 69 or any of the Examples described herein may further include, that the host computer apparatus 20 is configured for providing transparent memory access to volatile memory of the one or more memory devices associated with the one or more software applications to a further portion of the one or more software applications executed by a processing means of the host computer apparatus 20.

In Example 71, the subject matter of one of the Examples 56 to 70 or any of the Examples described herein may further include, that the host computer apparatus 20 is configured for providing a local cache of data written to volatile memory of the one or more memory devices associated with the one or more software applications to a further portion of the one or more software applications executed by a processing means of the host computer apparatus 20.

In Example 72, the subject matter of one of the Examples 56 to 71 or any of the Examples described herein may further include, that the host computer apparatus 20 includes a general-purpose processing means of a first processing means type and wherein memory apparatuses of the one or more memory apparatuses 30 include general-purpose processing means of a second processing means type, and wherein the first processing means type is incapable of cryptographically securing volatile memory and wherein the second processing means type is capable of cryptographically securing volatile memory.

In Example 73, the subject matter of one of the Examples 56 to 72 or any of the Examples described herein may further include, that the one or more memory apparatuses 30 are configured for providing one or more software guard extension enclaves for the one or more applications, wherein the one or more software guard extension enclaves include the cryptographically protected volatile memory.

In Example 74, the subject matter of one of the Examples 56 to 73 or any of the Examples described herein may further include, that the host computer apparatus 20 is configured for storing code and data of the one or more software applications within volatile memory of the one or more memory devices associated with the one or more software applications.

In Example 75, the subject matter of one of the Examples 56 to 74 or any of the Examples described herein may further include, that the host computer apparatus 20 and the one or more memory apparatuses 30 are configured for communicating via a Peripheral Component Interconnect Express interface of the host computer apparatus 20.

In Example 76, the subject matter of Example 75 or any of the Examples described herein may further include, that the one or more memory apparatuses 30 are arranged on a single Peripheral Component Interconnect Express card.

In Example 77, the subject matter of one of the Examples 56 to 76 or any of the Examples described herein may further include, that the host computer apparatus 20 includes a network connection means for communicating via a local network connection, wherein the one or more memory apparatuses 30 are configured for communicating via the local network connection via the host computer apparatus 20.

In Example 78, the subject matter of Example 77 or any of the Examples described herein may further include, that the one or more memory apparatuses 30 are exposed as individual devices via the local network connection.

Example 79 relates to a host computer apparatus 20 for a computer system 100. The computer system 100 further includes one or more memory apparatuses 30 configured for cryptographically protecting volatile memory of the one or more memory apparatuses 30, and for providing access to the cryptographically protected volatile memory for one or more software applications of the host computer apparatus 20. The host computer apparatus 20 includes a means for communicating 22 for communicating with the one or more memory apparatuses 30. The host computer apparatus 20 includes a means for controlling 24 configured for executing the one or more software applications by executing a portion of the one or more software applications associated with the cryptographically protected volatile memory using a processing means 38 of the one or more memory apparatuses 30.

In Example 80, the subject matter of Example 79 or any of the Examples described herein may further include, that software applications of the one or more software applications include a first software application portion and a second software application portion, wherein the first software application portion is associated with volatile memory of the host computer apparatus 20 and wherein the second software application portion is associated with the cryptographically protected volatile memory of the one or more memory apparatuses 30, wherein the means for controlling is configured for executing the second software application portion using the processing means of the memory apparatus including the cryptographically protected volatile memory associated with the second software application portion.

In Example 81, the subject matter of one of the Examples 79 or 80 or any of the Examples described herein may further include, that the means for controlling 24 is configured for providing data of the one or more software applications to the one or more memory apparatuses 30 by writing the data to the one or more memory apparatuses 30 using direct memory access.

In Example 82, the subject matter of one of the Examples 79 to 81 or any of the Examples described herein may further include, that the means for controlling 24 is configured for providing further data of the one or more software applications to the one or more memory apparatuses 30 by providing a direct memory access address of the further data to the one or more memory apparatuses 30.

In Example 83, the subject matter of Example 82 or any of the Examples described herein may further include, that the means for controlling 24 is configured for providing the further data of the one or more software applications to the one or more memory apparatuses 30 by providing the direct memory access address of the further data to the one or more memory apparatuses 30 via an asynchronous buffering means.

In Example 84, the subject matter of one of the Examples 79 to 83 or any of the Examples described herein may further include, that the means for controlling 24 is configured for implementing read and/or write access to volatile memory of the one or more memory apparatuses associated with the one or more software applications.

In Example 85, the subject matter of Example 84 or any of the Examples described herein may further include, that the means for controlling 24 is configured for implementing the write access to the volatile memory of the one or more memory apparatuses associated with the one or more software applications based on a write combine cache policy.

In Example 86, the subject matter of one of the Examples 84 or 85 or any of the Examples described herein may further include, that the means for controlling 24 is configured for implementing the read access to the volatile memory of the one or more memory apparatuses associated with the one or more software applications based on a write through cache policy.

In Example 87, the subject matter of one of the Examples 79 to 86 or any of the Examples described herein may further include, that the means for controlling 24 is configured for providing one or more memory windows for access to volatile memory of the one or more memory apparatuses associated with the one or more software applications to a further portion of the one or more software applications executed by a processing means of the host computer apparatus 20.

In Example 88, the subject matter of Example 87 or any of the Examples described herein may further include, that the means for controlling 24 is configured for providing the one or more memory windows with separate read and write access, wherein a cache semantic of the read access is different from a cache semantic of the write access.

In Example 89, the subject matter of one of the Examples 79 to 88 or any of the Examples described herein may further include, that the means for controlling 24 is configured for providing transparent memory access to volatile memory of the one or more memory apparatuses associated with the one or more software applications to a further portion of the one or more software applications executed by a processing means 26 of the host computer apparatus 20.

In Example 90, the subject matter of one of the Examples 79 to 89 or any of the Examples described herein may further include, that the means for controlling 24 is configured for providing a local cache of data written to volatile memory of the one or more memory apparatuses associated with the one or more software applications to a further portion of the one or more software applications executed by a processing means 26 of the host computer apparatus 20.

In Example 91, the subject matter of one of the Examples 79 to 90 or any of the Examples described herein may further include, that the host computer apparatus 20 includes a general-purpose processing means 26 incapable of cryptographically securing volatile memory.

In Example 92, the subject matter of one of the Examples 79 to 91 or any of the Examples described herein may further include, that the means for controlling 24 is configured for storing code and data of the one or more software applications within volatile memory of the one or more memory apparatuses associated with the one or more software applications.

In Example 93, the subject matter of one of the Examples 79 to 92 or any of the Examples described herein may further include, that the means for communicating 22 is configured for communicating via a Peripheral Component Interconnect Express interface of the host computer apparatus 20 with the one or more memory apparatuses 30.

In Example 94, the subject matter of one of the Examples 79 to 93 or any of the Examples described herein may further include, that the host computer apparatus 20 includes a network connection means for communicating 22 via a local network connection, wherein the one or more memory apparatuses 30 are exposed as individual apparatuses via the local network connection.

Example 95 relates to a memory apparatus 30 for a computer system 100. The computer system 100 further includes a host computer apparatus 20 configured for executing one or more software applications. The memory apparatus includes a means for communicating 32 for communicating with the host computer apparatus 20. The memory apparatus includes volatile memory 34. The memory apparatuses includes a means for controlling 36 configured for cryptographically protecting the volatile memory 34, providing access to the cryptographically protected volatile memory 34 for the one or more software applications, and executing a portion of the one or more software applications associated with the cryptographically protected volatile memory 34 using a processing means 38 of the memory apparatus 30.

In Example 96, the subject matter of Example 95 or any of the Examples described herein may further include, that software applications of the one or more software applications include a first software application portion and a second software application portion, wherein the first software application portion is associated with volatile memory 34 of the host computer apparatus 20 and wherein the second software application portion is associated with the cryptographically protected volatile memory 34 of the memory apparatus 30, wherein the means for controlling 36 is configured for executing the second software application portion.

In Example 97, the subject matter of one of the Examples 95 or 96 or any of the Examples described herein may further include, that the means for controlling 36 is configured for providing data of the one or more software applications to the host computer apparatus 20 by writing the data to the host computer apparatus 20 using direct memory access.

In Example 98, the subject matter of one of the Examples 95 to 97 or any of the Examples described herein may further include, that the means for controlling 36 is configured for providing further data of the one or more software applications to the host computer apparatus 20 by providing a direct memory access address of the further data to the host computer apparatus 20.

In Example 99, the subject matter of Example 98 or any of the Examples described herein may further include, that the means for controlling 36 is configured for providing the further data of the one or more software applications to the host computer apparatus 20 by providing the direct memory access address of the further data to the host computer apparatus 20 via an asynchronous buffering means.

In Example 100, the subject matter of one of the Examples 95 to 99 or any of the Examples described herein may further include, that the means for controlling 36 is configured for implementing read and/or write access to volatile memory 34 of the host computer apparatus 20 for the portion of the one or more software applications being executed using the processing means 38 of the memory apparatus 30.

In Example 101, the subject matter of Example 100 or any of the Examples described herein may further include, that the means for controlling 36 is configured for implementing the write access to the volatile memory 34 of the host computer apparatus 20 based on a write combine cache policy.

In Example 102, the subject matter of one of the Examples 100 or 101 or any of the Examples described herein may further include, that the means for controlling 36 is configured for implementing the read access to the volatile memory 34 of the host computer apparatus 20 based on a write through cache policy.

In Example 103, the subject matter of one of the Examples 95 to 102 or any of the Examples described herein may further include, that the means for controlling 36 is configured for protecting the cryptographically protected volatile memory 34 based on Software Guard Extensions.

In Example 104, the subject matter of one of the Examples 95 to 103 or any of the Examples described herein may further include, that the processing means 38 of the memory apparatus 30 is capable of cryptographically securing volatile memory 34.

In Example 105, the subject matter of one of the Examples 95 to 104 or any of the Examples described herein may further include, that the means for controlling 36 is configured for providing one or more software guard extension enclaves for the one or more applications, wherein the one or more software guard extension enclaves include the cryptographically protected volatile memory 34.

In Example 106, the subject matter of one of the Examples 95 to 105 or any of the Examples described herein may further include, that the means for communicating is configured for communicating with the host computer apparatus 20 via a Peripheral Component Interconnect Express interface of the host computer apparatus 20.

In Example 107, the subject matter of one of the Examples 95 to 106 or any of the Examples described herein may further include, that the host computer apparatus 20 includes a network connection means for communicating via a local network connection, wherein the means for controlling 36 is configured for communicating via the local network connection via the host computer apparatus 20.

In Example 108, the subject matter of Example 107 or any of the Examples described herein may further include, that the memory apparatus 30 is exposed as an individual apparatus via the local network connection.

Example 109 relates to a Peripheral Component Interconnect Express, PCIe, card including a plurality of memory apparatuses according to Example 95 or any of the Examples described herein.

Example 110 relates to a computer system method for executing one or more software applications in a computer system. The computer system includes a host computer device and one or more memory devices. The computer system method includes the one or more memory devices cryptographically protecting 110 volatile memory of the one or more memory devices. The computer system method includes the one or more memory devices providing access 120 to the cryptographically protected volatile memory for the one or more software applications. The computer system method includes the host computer device executing 130 the one or more software applications by executing a portion of the one or more software applications associated with the cryptographically protected volatile memory using a processor of the one or more memory devices.

Example 111 relates to a host computer method for a host computer device of a computer system. The computer system further includes one or more memory devices for cryptographically protecting volatile memory of the one or more memory devices, and for providing access to the cryptographically protected volatile memory for one or more software applications of the host computer device. The host computer method includes executing 210 the one or more software applications, wherein the one or more software applications are executed by executing a portion of the one or more software applications associated with the cryptographically protected volatile memory using a processor of the one or more memory devices.

In Example 112, the subject matter of Example 111 or any of the Examples described herein may further include, that software applications of the one or more software applications include a first software application portion and a second software application portion, wherein the first software application portion is associated with volatile memory of the host computer device and wherein the second software application portion is associated with the cryptographically protected volatile memory of the one or more memory devices, wherein the host computer method includes executing 210 the second software application portion using the processor of the memory device including the cryptographically protected volatile memory associated with the second software application portion.

In Example 113, the subject matter of one of the Examples 111 or 112 or any of the Examples described herein may further include, that the host computer method includes providing 220 data of the one or more software applications to the one or more memory devices by writing the data to the one or more memory devices using direct memory access.

In Example 114, the subject matter of one of the Examples 111 to 113 or any of the Examples described herein may further include, that the host computer method includes providing 230 further data of the one or more software applications to the one or more memory devices by providing a direct memory access address of the further data to the one or more memory devices.

In Example 115, the subject matter of Example 114 or any of the Examples described herein may further include, that the host computer method includes providing the further data of the one or more software applications to the one or more memory devices by providing the direct memory access address of the further data to the one or more memory devices via an asynchronous buffering means.

In Example 116, the subject matter of one of the Examples 111 to 115 or any of the Examples described herein may further include, that the host computer method includes implementing 240 read and/or write access to volatile memory of the one or more memory devices associated with the one or more software applications.

In Example 117, the subject matter of Example 116 or any of the Examples described herein may further include, that the host computer method includes implementing the write access to the volatile memory of the one or more memory devices associated with the one or more software applications based on a write combine cache policy.

In Example 118, the subject matter of one of the Examples 116 or 117 or any of the Examples described herein may further include, that the host computer method includes implementing the read access to the volatile memory of the one or more memory devices associated with the one or more software applications based on a write through cache policy.

In Example 119, the subject matter of one of the Examples 111 to 118 or any of the Examples described herein may further include, that the host computer method includes providing 250 one or more memory windows for access to volatile memory of the one or more memory devices associated with the one or more software applications to a further portion of the one or more software applications executed by a processor of the host computer device.

In Example 120, the subject matter of Example 119 or any of the Examples described herein may further include, that the host computer method includes providing the one or more memory windows with separate read and write access, wherein a cache semantic of the read access is different from a cache semantic of the write access.

In Example 121, the subject matter of one of the Examples 111 to 120 or any of the Examples described herein may further include, that the host computer method includes providing 260 transparent memory access to volatile memory of the one or more memory devices associated with the one or more software applications to a further portion of the one or more software applications executed by a processor of the host computer device.

In Example 122, the subject matter of one of the Examples 111 to 121 or any of the Examples described herein may further include, that the host computer method includes providing 270 a local cache of data written to volatile memory of the one or more memory devices associated with the one or more software applications to a further portion of the one or more software applications executed by a processor of the host computer device.

In Example 123, the subject matter of one of the Examples 111 to 122 or any of the Examples described herein may further include, that the host computer method includes storing 280 code and data of the one or more software applications within volatile memory of the one or more memory devices associated with the one or more software applications.

In Example 124, the subject matter of one of the Examples 111 to 123 or any of the Examples described herein may further include, that the host computer device includes a network connection interface for communicating via a local network connection, wherein the method includes exposing 290 the one or more memory devices as individual devices via the local network connection.

Example 125 relates to a memory method for a memory device of a computer system. The computer system further includes a host computer device for executing one or more software applications. The memory method includes cryptographically protecting 310 volatile memory of the memory device, providing 320 access to the cryptographically protected volatile memory for the one or more software applications, and executing 330 a portion of the one or more software applications associated with the cryptographically protected volatile memory using a processor of the memory device.

In Example 126, the subject matter of Example 125 or any of the Examples described herein may further include, that software applications of the one or more software applications include a first software application portion and a second software application portion, wherein the first software application portion is associated with volatile memory of the host computer device and wherein the second software application portion is associated with the cryptographically protected volatile memory of memory device, wherein the memory method includes executing 330 the second software application portion.

In Example 127, the subject matter of one of the Examples 125 or 126 or any of the Examples described herein may further include, that the memory method includes providing 340 data of the one or more software applications to the host computer device by writing the data to the host computer device using direct memory access.

In Example 128, the subject matter of one of the Examples 125 to 127 or any of the Examples described herein may further include, that the memory method includes providing 350 further data of the one or more software applications to the host computer device by providing a direct memory access address of the further data to the host computer device.

In Example 129, the subject matter of Example 128 or any of the Examples described herein may further include, that the method includes providing the further data of the one or more software applications to the host computer device by providing the direct memory access address of the further data to the host computer device via an asynchronous buffer.

In Example 130, the subject matter of one of the Examples 125 to 129 or any of the Examples described herein may further include, that the memory method includes implementing 360 read and/or write access to volatile memory of the host computer device for the portion of the one or more software applications being executed using the processor of the memory device.

In Example 131, the subject matter of Example 130 or any of the Examples described herein may further include, that the memory method includes implementing the write access to the volatile memory of the host computer device based on a write combine cache policy.

In Example 132, the subject matter of one of the Examples 130 or 131 or any of the Examples described herein may further include, that the memory method includes implementing the read access to the volatile memory of the host computer device based on a write through cache policy.

In Example 133, the subject matter of one of the Examples 125 to 132 or any of the Examples described herein may further include, that the memory method includes protecting 310 the cryptographically protected volatile memory based on Software Guard Extensions.

In Example 134, the subject matter of one of the Examples 125 to 133 or any of the Examples described herein may further include, that the memory method includes providing 370 one or more software guard extension enclaves for the one or more applications, wherein the one or more software guard extension enclaves include the cryptographically protected volatile memory.

Example 135 relates to a machine readable storage medium (e.g. a non-transitory computer readable medium) including program code, when executed, to cause a machine to perform the method of one of the Examples 110 to 134.

Example 136 relates to a computer program having a program code for performing the method of at least one of the Examples 110 to 134, when the computer program is executed on a computer, a processor, or a programmable hardware component.

Example 137 relates to a machine readable storage (e.g. a non-transitory computer readable medium) including machine readable instructions, when executed, to implement a method or realize an apparatus as claimed in any pending claim or detailed in any of the Examples.

Example 138 relates to a machine readable storage medium including program code, when executed, to cause a machine to perform: Execute one or more software applications on a host computer device of a computer system by Executing a portion of the one or more software applications associated with cryptographically protected volatile memory of one or more memory devices of the computer system using a processor of the one or more memory devices.

Example 139 relates to a machine readable storage medium including program code, when executed, to cause a machine to perform: cryptographically protect volatile memory of a memory device, provide access to the cryptographically protected volatile memory for one or more software applications of a host computer device, and execute a portion of the one or more software applications associated with the cryptographically protected volatile memory using a processor of the memory device.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A host computer device for a computer system, wherein the computer system includes one or more memory devices configured to cryptographically protect volatile memory of the one or more memory devices, and to provide access to the cryptographically protected volatile memory for one or more software applications of the host computer device, the host computer device comprising:
- an interface for communicating with the one or more memory devices; and
- a control module configured to:
  - execute the one or more software applications by executing a portion of the one or more software applications associated with the cryptographically protected volatile memory using a processor of the one or more memory devices,
  - wherein software applications of the one or more software applications comprise a first software application portion and a second software application portion,
  - wherein the first software application portion is associated with volatile memory of the host computer device and wherein the second software application portion is associated with the cryptographically protected volatile memory of the one or more memory devices,
  - wherein the control module is configured to execute the second software application portion using the processor of the memory device comprising the cryptographically protected volatile memory associated with the second software application portion.

2. The host computer device according to claim 1, wherein the control module is configured to provide data of the one or more software applications to the one or more memory devices by writing the data to the one or more memory devices using direct memory access.

3. The host computer device according to claim 1, wherein the control module is configured to provide further data of the one or more software applications to the one or more memory devices by providing a direct memory access address of the further data to the one or more memory devices.

4. The host computer device according to claim 3, wherein the control module is configured to provide the further data of the one or more software applications to the one or more memory devices by providing the direct memory access address of the further data to the one or more memory devices via an asynchronous buffer.

5. The host computer device according to claim 1, wherein the control module is configured to implement read and/or write access to the cryptographically protected volatile memory of the one or more memory devices associated with the one or more software applications.

6. The host computer device according to claim 1, wherein the control module is configured to implement the write access to the cryptographically protected volatile memory of the one or more memory devices associated with the one or more software applications based on a write combine cache policy.

7. The host computer device according to claim 1, wherein the control module is configured to implement the read access to the cryptographically protected volatile memory of the one or more memory devices associated with the one or more software applications based on a write through cache policy.

8. The host computer device according to claim 1, wherein the control module is configured to provide one or more memory windows for access to the cryptographically protected volatile memory of the one or more memory devices associated with the one or more software applications to a further portion of the one or more software applications executed by a processor of the host computer device.

9. The host computer device according to claim 8, wherein the control module is configured to provide the one or more memory windows with separate read and write access, wherein a cache semantic of the read access is different from a cache semantic of the write access.

10. The host computer device according to claim 1, wherein the control module is configured to provide transparent memory access to the cryptographically protected volatile memory of the one or more memory devices associated with the one or more software applications to a further portion of the one or more software applications executed by a processor of the host computer device.

11. The host computer device according to claim 1, wherein the control module is configured to provide a local cache of data written to volatile memory of the one or more memory devices associated with the one or more software applications to a further portion of the one or more software applications executed by a processor of the host computer device.

12. The host computer device according to claim 1, wherein the control module is configured to store code and data of the one or more software applications within volatile memory of the one or more memory devices associated with the one or more software applications.

13. The host computer device according to claim 1, wherein the host computer device comprises a network connection interface for communicating via a local network connection, wherein the one or more memory devices are exposed as individual devices via the local network connection.

14. A memory device for a computer system, wherein the computer system includes a host computer device configured to execute one or more software applications, the memory device comprising:
- an interface for communicating with the host computer device;
- volatile memory; and
- a control module configured to:
  - cryptographically protect the volatile memory, and
  - provide access to the cryptographically protected volatile memory for the one or more software applications,
  - execute a portion of the one or more software applications associated with the cryptographically protected volatile memory using a processor of the memory device,
  - wherein software applications of the one or more software applications comprise a first software application portion and a second software application portion,
  - wherein the first software application portion is associated with volatile memory of the host computer device and wherein the second software application portion is associated with the cryptographically protected volatile memory of the memory device,
  - wherein the control module is configured to execute the second software application portion.

15. The memory device according to claim 14, wherein the control module is configured to provide data of the one or more software applications to the host computer device by writing the data to the host computer device using direct memory access.

16. The memory device according to claim 14, wherein the control module is configured to provide further data of the one or more software applications to the host computer device by providing a direct memory access address of the further data to the host computer device.

17. The memory device according to claim 16, wherein the control module is configured to provide the further data of the one or more software applications to the host computer device by providing the direct memory access address of the further data to the host computer device via an asynchronous buffer.

18. The memory device according to claim 14, wherein the control module is configured to implement read and/or write access to volatile memory of the host computer device for the portion of the one or more software applications being executed using the processor of the memory device.

19. The memory device according to claim 18, wherein the control module is configured to implement the write access to the volatile memory of the host computer device based on a write combine cache policy.

20. The memory device according to claim 18, wherein the control module is configured to implement the read access to the volatile memory of the host computer device based on a write through cache policy.

21. The memory device according to claim 18, wherein the host computer device comprises a network connection interface for communicating via a local network connection, wherein the control module is configured to communicate via the local network connection via the host computer device.

22. A non-transitory machine readable storage medium including program code, when executed, to cause a machine to perform:
  Execute one or more software applications on a host computer device of a computer system by
  Executing a portion of the one or more software applications associated with cryptographically protected volatile memory of one or more memory devices of the computer system using a processor of the one or more memory devices,
  wherein software applications of the one or more software applications comprise a first software application portion and a second software application portion,
  wherein the first software application portion is associated with volatile memory of the host computer device and wherein the second software application portion is associated with the cryptographically protected volatile memory of the one or more memory devices,
  wherein the second software application portion is executed using the processor of the one or more memory devices comprising the cryptographically protected volatile memory associated with the second software application portion.

23. A non-transitory machine readable storage medium including program code, when executed, to cause a machine to perform:
  cryptographically protect volatile memory of a memory device,
  provide access to the cryptographically protected volatile memory for one or more software applications of a host computer device, and
    execute a portion of the one or more software applications associated with the cryptographically protected volatile memory using a processor of the memory device,
  wherein software applications of the one or more software applications comprise a first software application portion and a second software application portion,
  wherein the first software application portion is associated with volatile memory of the host computer device and wherein the second software application portion is associated with the cryptographically protected volatile memory of the memory device,
  wherein the second software application portion is executed by a control module of the memory device.

* * * * *